US012391525B2

(12) United States Patent
Shankar et al.

(10) Patent No.: US 12,391,525 B2
(45) Date of Patent: *Aug. 19, 2025

(54) ELECTRIC BOOM

(71) Applicant: Oshkosh Corporation, Oshkosh, WI (US)

(72) Inventors: Prabhu Shankar, Oshkosh, WI (US); Louis Bafile, Oshkosh, WI (US); Jihong Hao, Greencastle, PA (US); Eko Prasetiawan, Oshkosh, WI (US); Scott Riley, Oshkosh, WI (US); David Lombardo, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,996

(22) Filed: Sep. 12, 2023

(65) Prior Publication Data

US 2023/0416061 A1    Dec. 28, 2023

Related U.S. Application Data

(63) Continuation of application No. 17/881,322, filed on Aug. 4, 2022, now Pat. No. 11,802,031, which is a
(Continued)

(51) Int. Cl.
  *B66F 3/44* (2006.01)
  *B66F 11/04* (2006.01)
  *B60S 9/21* (2006.01)

(52) U.S. Cl.
  CPC .............. *B66F 3/44* (2013.01); *B66F 11/048* (2013.01); *B60S 9/21* (2013.01)

(58) Field of Classification Search
  CPC .......................... B66F 9/07513; B66F 9/0755; B66F 9/07559; B66F 9/061; B66F 9/0655;
(Continued)

(56) References Cited

U.S. PATENT DOCUMENTS 1,367,907 A    2/1921  Andrews
3,817,346 A    6/1974  Wehmeyer
(Continued)

FOREIGN PATENT DOCUMENTS

CN    203006872 U    6/2013
CN    203440844 U    2/2014
EP    3 112 312 A1    1/2017

OTHER PUBLICATIONS

International Search Report and Written Opinion for International Application No. PCT/US2020/021347 dated Sep. 1, 2020, 22 pages.
Office Action issued in connection with Canadian Appl. No. 3136194 dated Mar. 11, 2024.

*Primary Examiner* — Tyrone V Hall, Jr.
(74) *Attorney, Agent, or Firm* — FOLEY & LARDNER LLP

(57) ABSTRACT

A fully electric lift device includes a base assembly, a lift assembly, a platform assembly, tractive elements, an energy storage device, and a control system. The lift assembly is coupled with the base assembly and is driven by an electric linear actuator for a lifting function. The platform assembly is positioned at a top of the lift assembly and can be raised or lowered as the lift assembly performs the lifting function. The tractive elements are rotatably coupled with the base assembly and can be driven by an electric wheel motor to perform a driving function. The control system includes a controller that operates the electric wheel motor and the electric linear actuator to perform the driving function and the lifting function using power drawn from the energy storage device. The lift assembly and the tractive elements use only electrical energy to perform the lifting and driving functions.

9 Claims, 35 Drawing Sheets

Related U.S. Application Data continuation of application No. 16/811,180, filed on Mar. 6, 2020, now Pat. No. 11,492,239.

(60) Provisional application No. 62/829,972, filed on Apr. 5, 2019, provisional application No. 62/829,919, filed on Apr. 5, 2019, provisional application No. 62/829,960, filed on Apr. 5, 2019, provisional application No. 62/830,128, filed on Apr. 5, 2019, provisional application No. 62/829,976, filed on Apr. 5, 2019.

(58) Field of Classification Search
CPC ........ B66F 9/065; B66F 7/065; B66F 7/0658; B66F 7/0666; B66F 7/0691; B66F 3/22; B66F 3/44; B66F 3/16; B66F 3/20; B66F 3/35; B66F 3/40; B66F 11/00; B66F 11/04; B66F 11/042; B66F 11/044; B66F 11/046; B66F 11/048
See application file for complete search history.

(56) References Cited

U.S. PATENT DOCUMENTS

| | | |
|---|---|---|
| 5,639,119 A | 6/1997 | Plate et al. |
| 6,321,818 B1 | 11/2001 | Ethington |
| 9,890,024 B2 | 2/2018 | Hao et al. |
| 10,221,055 B2 | 3/2019 | Hao et al. |
| 10,407,288 B2 | 9/2019 | Hao et al. |
| 10,544,556 B2 | 1/2020 | Amin et al. |
| 2015/0246684 A1 | 9/2015 | Ahern et al. |
| 2017/0291802 A1* | 10/2017 | Hao .................. B60G 9/02 |
| 2018/0273361 A1 | 9/2018 | Fenner |
| 2019/0126460 A1 | 5/2019 | Mittelstadt et al. |
| 2019/0185301 A1 | 6/2019 | Hao et al. |
| 2019/0352157 A1 | 11/2019 | Hao et al. |
| 2020/0031643 A1 | 1/2020 | Iotti |
| 2020/0140249 A1 | 5/2020 | Hackenberg et al. |
| 2020/0262688 A1 | 8/2020 | Ryan |

* cited by examiner

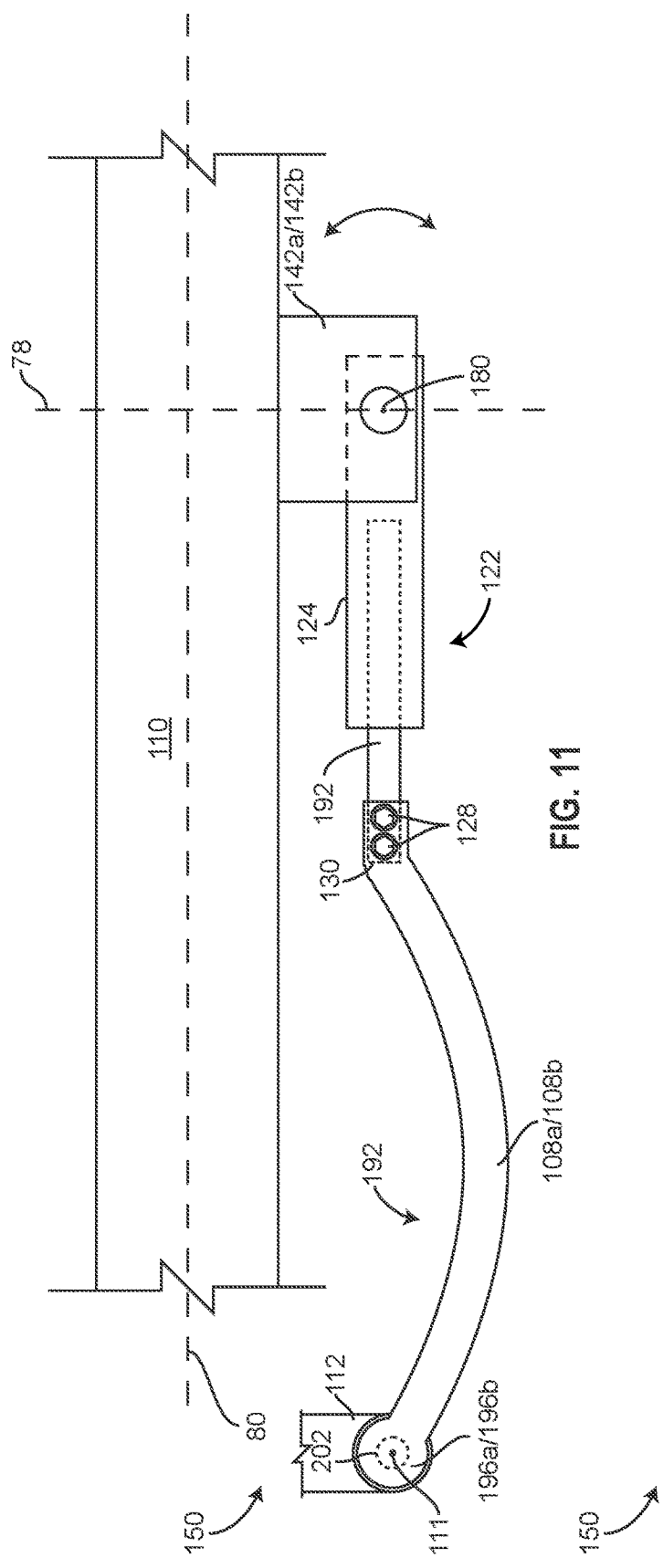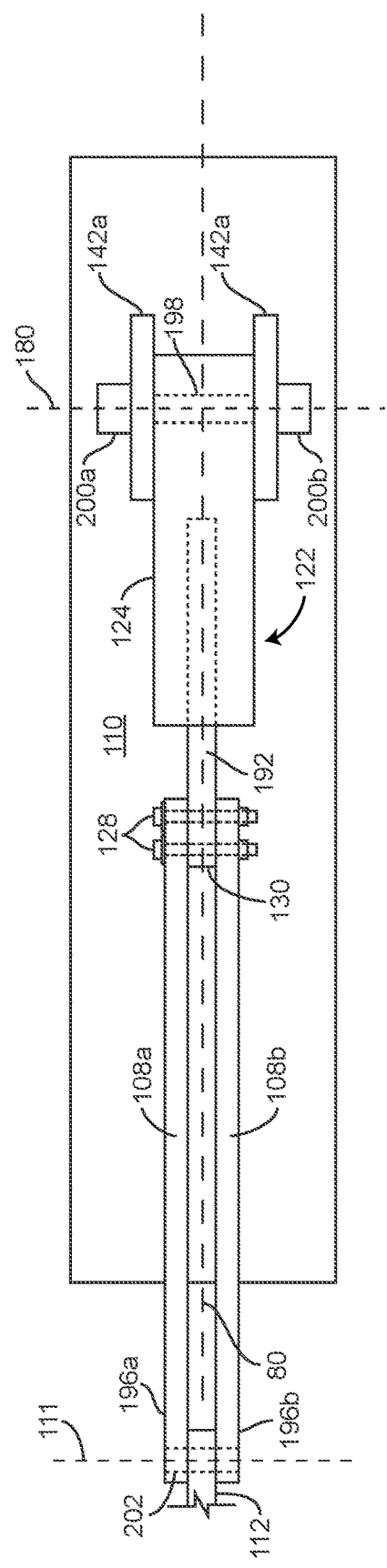

ELECTRIC BOOM

CROSS-REFERENCE TO RELATED PATENT APPLICATIONS

This application is a continuation of U.S. application Ser. No. 17/881,322, filed Aug. 4, 2022, which is a continuation of U.S. application Ser. No. 16/811,180, filed Mar. 6, 2020, now U.S. Pat. No. 11,492,239 which claims the benefit of and priority to U.S. Provisional Patent Application No. 62/829,919, filed Apr. 5, 2019, U.S. Provisional Patent Application No. 62/829,972, filed Apr. 5, 2019, U.S. Provisional Patent Application No. 62/829,960, filed Apr. 5, 2019, U.S. Provisional Patent Application No. 62/830,128, filed Apr. 5, 2019, and U.S. Provisional Patent Application No. 62/829,976, filed Apr. 5, 2019, the entire disclosures of which are incorporated by reference herein.

BACKGROUND

The present disclosure relates to boom lifting devices. More particularly, the present disclosure relates to electrical systems used in boom lifting devices.

SUMMARY

One implementation of the present disclosure is a fully electric boom lift, according to an exemplary embodiment. The fully electric boom lift includes a base assembly, a lift assembly, a platform assembly, multiple tractive elements, and a control system. The base assembly includes a base and a fully electric turntable configured to be driven to rotate relative to the base by an electric turntable motor. The lift assembly is coupled with the turntable. The lift assembly includes multiple articulated arms configured to be driven to increase and decrease in height by multiple electric linear actuators. The platform assembly is disposed at a top of the lift assembly and is configured to be raised and lowered as the lift assembly increases or decreases in height. The multiple tractive elements are rotatably coupled with the base assembly and configured to be driven by an electric wheel motor. The control system includes a controller and an energy storage device, wherein the controller is configured to operate the electric turntable motor, the plurality of electric linear actuators, and the electric wheel motor, the electric turntable motor, the plurality of electric linear actuators, and the electric wheel motor configured to consume electrical power from the energy storage device.

The fully electric boom lift can further include a steering system. The steering system is configured to drive the multiple tractive elements to pivot to indicate a turn of the fully electric boom.

The steering system may include a linear electric steering actuator, and a steering knuckle. The linear electric steering actuator is pivotally coupled to the base at a first end, and fixedly coupled with an arcuate steering member at a second end. The steering knuckle is rotatably coupled with one of the multiple tractive elements and pivotally coupled with the base. The arcuate steering member is pivotally coupled with the steering knuckle and is configured to drive the steering knuckle to pivot as the linear electric steering actuator extends and retracts. The arcuate steering member is shaped to provide clearance for a portion of the base as the linear electric steering actuator extends and retracts.

The controller can be configured to operate the electric wheel motors and the linear electric steering actuator to drive and steer the fully electric boom lift for transportation of the fully electric boom lift.

The fully electric turntable may include a ring gear, a reduction gear box, and an electric brake. The ring gear is rotatably coupled with the base through a slewing bearing. The ring gear is fixedly coupled with the lift assembly. The reduction gear box is configured to receive output rotational kinetic energy from the electric turntable motor and output rotational kinetic energy at an output torque to the ring gear to rotate the ring gear and the lift assembly relative to the base. The output torque is greater than the motor torque. The electric brake is configured to limit rotation of the ring gear when activated in response to receiving a control signal from the controller.

The fully electric boom lift may also include a platform rotator configured to pivot the platform assembly relative to the lift assembly. The platform rotator includes a barrel, a structural support member, an electric platform rotator motor, and an electric brake. The barrel is fixedly coupled with the platform assembly. The structural support member is fixedly coupled with the lift assembly and rotatably coupled with the barrel. The electric platform rotator motor is configured to drive a gear box using electrical energy provided by the energy storage device. The electric brake is configured to activate to prevent relative rotation between the barrel and the structural support member. The electric brake is configured to receive electrical energy from the energy storage device and control signals from the controller and activate in response to receiving the control signals from the controller. The gear box is configured to receive a rotational input from the motor and provide a rotational output to rotate the barrel and the platform assembly relative to the structural support member that fixedly couples with the lift assembly.

The lift assembly can include multiple lower members, multiple upper members, a jib arm, and an electric linear actuator. The multiple lower members pivotally couple at their first ends with the fully electric turntable and pivotally couple at their opposite ends with a first upright member. The multiple upper members pivotally couple at their first ends with the first upright member, and pivotally couple at their opposite ends with a second upright member. The jib arm is pivotally coupled at a first end with the second upright member and coupled at an opposite end with the platform assembly. The electric linear actuator is pivotally coupled at a first end with one of the lower members and pivotally coupled through a trunnion mount with one of the upper members. The electric linear actuator is configured to extend or retract to drive the one or more upper members to pivot relative to the first upright member. The electric linear actuator is configured to receive power from the energy storage device and control signals from the controller to operate to extend or retract to raise or lower the lift assembly.

The trunnion mount can include a collar, and a pair of protrusions. The collar is configured to clamp with an outer periphery of the electric linear actuator. The pair of protrusions extend outwards from opposite sides of the collar and pivotally couple with the upper members.

The base assembly further includes a laterally extending frame member, and multiple lockout electric linear actuators. The laterally extending frame member is pivotally coupled with the base. The base is configured to rotate about a longitudinal axis relative to the laterally extending frame member. The multiple lockout electric linear actuators are coupled to at least one of the laterally extending frame member or the base and configured to consume electrical energy supplied by the energy storage device to extend and retract. In a first mode of operation, the controller is configured to control the lockout electric linear actuators to permit rotation of the base relative to the laterally extending frame member through a first range of motion. In a second mode of operation, the controller is configured to control the lockout electric linear actuators to limit rotation of the base relative to the laterally extending frame member to a second range of motion smaller than the first range of motion. The lockout electric linear actuator includes a body slidably coupled to a rod and an electric lockout motor that controls movement of the rod relative to the body. In the second mode of operation, the controller is configured to control the electric lockout motor to extend the electric linear actuator until the lockout electric linear actuator engages the laterally extending frame member.

The electric linear actuator includes a motor controller configured to monitor a flow of electrical energy supplied to the electric motor. The controller is configured to determine that the electric linear actuator has engaged the laterally extending frame member when a current supplied to the electric motor exceeds a threshold current.

Another implementation of the present disclosure is a fully electric lift device, according to an exemplary embodiment. The fully electric lift device includes a base assembly, a lift assembly, a platform assembly, multiple tractive elements, an energy storage device, and a control system. The lift assembly is coupled with the base assembly and configured to be driven by an electric linear actuator to perform a lifting function. The platform assembly is positioned at a top of the lift assembly and is configured to be raised or lowered as the lift assembly performs the lifting function. The multiple tractive elements are rotatably coupled with the base assembly and configured to be driven by an electric wheel motor to perform a driving function. The control system includes a controller configured to operate the electric wheel motor and the electric linear actuator to perform the driving function and the lifting function using power drawn from the energy storage device. The lift assembly and the multiple tractive elements use only electrical energy as a power source to perform the lifting function and the driving function.

The fully electric lift device can be a fully electric telehandler or a fully electric boom lift.

The fully electric lift device can further include a steering system. The steering system is configured to drive the multiple tractive elements to pivot to indicate a turn of the fully electric lift device. The steering system includes a linear electric steering actuator, and a steering knuckle. The linear electric steering actuator is pivotally coupled to the base at a first end, and fixedly coupled with an arcuate steering member at a second end. The steering knuckle is rotatably coupled with one of the multiple tractive elements and pivotally coupled with the base. The arcuate steering member is pivotally coupled with the steering knuckle and is configured to drive the steering knuckle to pivot as the linear electric steering actuator extends and retracts. The arcuate steering member is shaped to provide clearance for a portion of the base as the linear electric steering actuator extends and retracts.

The base assembly may include a base and a fully electric turntable configured to be driven to rotate relative to the base by an electric turntable motor. The fully electric turntable can include a ring gear, a reduction gear box, and an electric brake. The ring gear is rotatably coupled with the base through a slewing bearing. The ring gear fixedly coupled with the lift assembly. The reduction gear box is configured to receive output rotational kinetic energy from the electric turntable motor and output rotational kinetic energy at an output torque to the ring gear to rotate the ring gear and the lift assembly relative to the base. The output torque is greater than the motor torque. The electric brake is configured to limit rotation of the ring gear when activated in response to receiving a control signal.

The fully electric lift device may further include a platform rotator configured to pivot the platform assembly relative to the lift assembly. The platform rotator includes a barrel, a structural support member, an electric platform rotator motor, and an electric motor. The barrel is fixedly coupled with the platform assembly. The structural support member is fixedly coupled with the lift assembly and rotatably coupled with the barrel. The electric platform rotator motor is configured to drive a gear box using electrical energy provided by the energy storage device. The electric brake is configured to activate to prevent relative rotation between the barrel and the structural support member. The electric brake is configured to receive electrical energy from the energy storage device and control signals from the controller and activate in response to receiving the control signals from the controller. The gear box is configured to receive a rotational input from the motor and provide a rotational output to rotate the barrel and the platform assembly relative to the structural support member that fixedly couples with the lift assembly.

The base assembly can further include a laterally extending frame member, and multiple lockout electric linear actuators. The laterally extending frame member is pivotally coupled with the base. The base is configured to rotate about a longitudinal axis relative to the laterally extending frame member. The multiple lockout electric linear actuators are coupled with at least one of the laterally extending frame member or the base and are configured to consume electrical energy supplied by the energy storage device to extend and retract. In a first mode of operation, the controller is configured to control the lockout electric linear actuators to permit rotation of the base relative to the laterally extending frame member through a first range of motion. In a second mode of operation, the controller is configured to control the lockout electric linear actuators to limit rotation of the base relative to the laterally extending frame member to a second range of motion smaller than the first range of motion. The lockout electric linear actuator includes a body slidably coupled to a rod and an electric lockout motor that controls movement of the rod relative to the body. In the second mode of operation, the controller is configured to control the electric lockout motor to extend the electric linear actuator until the lockout electric linear actuator engages the laterally extending frame member.

Another implementation of the present disclosure is a fully electric lift device, according to an exemplary embodiment. The fully electric lift device includes a base, a lift apparatus, an energy storage device, and a controller. The lift apparatus is coupled with the base assembly and includes multiple lower members, multiple upper members, and an electric linear actuator. The multiple lower members are pivotally coupled at their first ends with the base and pivotally coupled at their opposite ends with a first upright member. The multiple upper members are pivotally coupled at their first ends with the first upright member and at their opposite ends with a second upright member. The electric linear actuator is configured to extend or retract to raise or lower the lift apparatus. The energy storage device is configured to provide electrical energy to the electric linear actuator. The controller is configured to operate the electric linear actuator to raise or lower the lift apparatus.

The multiple lower members, the base, and the first upright member form a first four-bar linkage. The multiple upper members, the first upright member, and the second upright member form a second four-bar linkage. The first upright member and the second upright member maintain a particular orientation as the lift apparatus is raise or lowered.

The electric linear actuator is pivotally coupled at a lower end with one of the lower members and pivotally coupled with one of the upper members through a trunnion mount.

The trunnion mount can include a collar, and a pair of protrusions. The collar is configured to clamp with an outer periphery of the electric linear actuator. The pair of protrusions extend outwards from opposite sides of the collar and pivotally couple with the upper members.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which:

FIG. 11 is a top view of the steering system of the fully electric boom of FIG. 1, according to an exemplary embodiment.

FIG. 12 is a front view of the steering system of the fully electric boom of FIG. 1, according to an exemplary embodiment.

DETAILED DESCRIPTION

Figure 1:
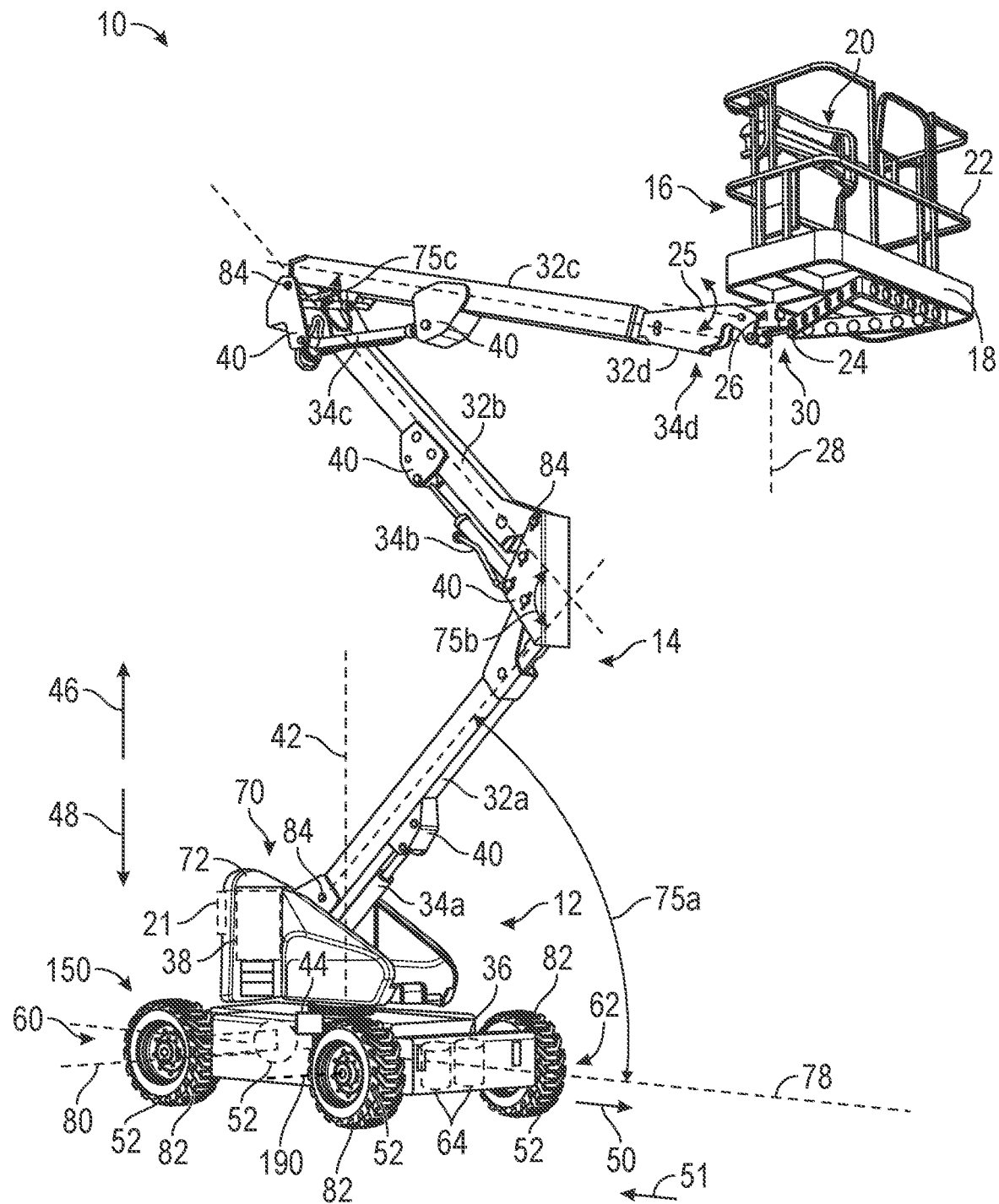
FIG. 1 is a perspective view of a fully electric boom, according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the FIGURES, a fully electric boom is shown, according to various exemplary embodiments. The fully electric boom includes a platform assembly, a lift assembly, and a base assembly. The base assembly supports the lift assembly and the platform assembly. The platform assembly is positioned at a top end of the lift assembly. The lift assembly can include one or more articulated arms that are hingedly coupled with each other. The one or more articulated arms are configured to be driven to pivot by electric linear actuators. As the articulated arms pivot, the lift assembly increases or decreases in height, thereby raising and lowering the platform assembly.

The base assembly include a turn table and a base. The turn table is rotatably coupled with the base. The lift assembly is rotatably coupled with the turn table. The turn table is driven to rotate relative to the base assembly by an electric turn table motor. The base assembly also includes one or more tractive elements. The tractive elements each include an electric motor configured to drive the corresponding tractive element. The tractive elements can be independently driven by the corresponding electric motor. The base assembly includes a steering system. The steering system includes an electric linear actuator that extends and retracts. An end of a rod of the electric linear actuator is fixedly coupled with an end of one or more arcuate/curved steering members. The one or more arcuate/curved steering members are pivotally coupled with a steering knuckle of the tractive element. An end of the housing of the electric linear actuator is pivotally/rotatably coupled with the base. The electric linear actuator can be extended or retracted to pivot the corresponding tractive element for a turn.

The electric turntable motor is rotatably coupled with a gear box. The gear box receives rotational kinetic energy from the electric turntable motor and outputs rotational kinetic energy with a higher torque. Depending on the orientation/configuration of the electric turntable motor and the gear box, a transmission can be used to transfer the rotational kinetic energy into an axis that is substantially parallel to an axis that a ring gear of the turntable rotates about (e.g., using bevel gears). In other embodiments, the transmission or the gear box includes a worm and the ring gear is a worm gear.

The fully electric boom can include energy storage devices (e.g., batteries). Any of the motors, electric linear actuators, etc., of the fully electric boom can receive electrical power from the energy storage devices. A controller is configured to receive user inputs from one or more human machine interfaces and operate any of the motors, electric linear actuators, etc., of the fully electric boom. The controller may generate control signals for any of the electric motors, electric linear actuators, etc. The controller can also monitor feedback (e.g., voltage feedback, current feedback, etc.) from any of the electric linear actuators, electric motors, etc.

The fully electric boom can include a boom arm and a jib arm. The boom arm is configured to lower and raise by one or more electric linear actuators. The jib arm is coupled to an end of the boom arm and is configured to rotate and pivot the platform assembly. The jib arm includes a platform rotator that pivotally couples the platform assembly with the jib arm.

The platform rotator pivotally couples the platform assembly with the jib arm. The platform rotator can include a barrel formed by two portions that couple with the platform assembly. The barrel can fixedly couple with one or more structural support members that protrude outwards from the platform assembly.

The barrel is supported on either side (e.g., an upper side and a lower side) by structural support members that extend from the end of the jib arm. The barrel can slidably interface with the structural support members. The barrel and the structural support members are configured to rotatably or pivotally couple with each other.

The platform rotator includes an electric motor, a brake, and one or more gear boxes. The electric motor is configured to drive the one or more gear boxes to pivot the barrel relative to the structural support members that support the barrel. The one or more gear boxes can be reduction gear boxes that increase the output torque provided to the barrel. The brake can be an electric brake that transitions between an activated state and a deactivated state. When in the activated state, the brake facilitates restricting relative rotation between the barrel and the structural support members that support the barrel.

The electric motor and the brake of the platform rotator can receive electrical energy from the batteries of the electric boom. The electric motor and the brake can be operated by a controller in response to the controller receiving a user input from a human machine interface. The controller can operate the electric motor to pivot/rotate the platform assembly in either direction. The controller may transition the brake into the activated state to facilitate locking a current angular position of the platform assembly.

The fully electric boom can include a boom arm and a jib arm. The boom arm can include lower members, upper members, and two upright members. The lower members are pivotally coupled with the turntable at a lower end. The lower members are pivotally coupled at an upper end with a first one of the upright members. The upper members are pivotally coupled at a lower end with the first upright member, and pivotally coupled with the second upright member at the upper end. The jib arm is pivotally coupled with the second upright member. The lower members can pivot about the lower end to raise and lower the first upright member. The upper members can pivot about their lower ends to raise and lower the second upright member and the jib arm.

An electric linear actuator is pivotally coupled at a lower end with one of the lower members. The electric linear actuator is mounted with a trunnion mount to one of the upper members at an upper end. The trunnion mount includes a collar that surrounds a cylinder of the electric linear actuator. The collar can be a single-piece clamping collar or a two-piece clamping collar. The collar includes protrusions that extend radially outwards and pivotally couple with apertures of one of the upper members. The trunnion mount facilitates using an electric linear actuator with a longer overall stroke length. The electric linear actuator can be operated to pivot the upper members about their bottom ends, and thereby raise/lower the second upright member.

Another electric linear actuator can be pivotally coupled at a lower end with the turntable and pivotally coupled with one of the lower members with a trunnion mount. The electric linear actuator can be operated to extend and retract to pivot the lower members about their lower ends.

The electric boom further includes an axle lock out system configured to selectively limit rotation of the axle assemblies relative to the chassis. The axle assemblies are configured to rotate relative to the chassis about a longitudinal axis. A pair of electric linear actuators (i.e., axle actuators) are coupled to the chassis on opposites sides of the longitudinal axis. The electric linear actuators extend downward from the chassis to engage the corresponding axle assembly. During a driving mode of operation, the axle actuators permit free rotation of the axle assembly. In some embodiments, during the driving mode, the axle actuators are held in a retracted configuration to permit the axle to rotate through a first range of motion without contacting the axle actuators. In other embodiments, during the driving mode, the axle actuators engage the axle assemblies, but are configured to extend and retract freely (e.g., with minimal resistance) such that the axle assembly can rotate through the first range of motion.

During an operating mode, the axle actuators limit rotation of the axle assemblies to a second range of motion smaller than the first range of motion. In embodiments where the axle actuators are held in the retracted position during the driving mode, the axle actuators are extended until they engage the axle assembly. A controller may determine that the axle actuators have engaged the axle assembly in response to the current supplied to each actuator reaching a threshold current. Once the axle actuators have engaged the axle assembly, the axle actuators may lock to a fixed length. In embodiments where the axle actuators extend and retract freely during the driving mode, the axle actuators may lock to a fixed length in response to entering the operating mode.

Advantageously, the fully electric boom does not use any hydraulic systems, hydraulic pumps, engines, internal combustion engines, etc. to perform the respective functions of the various motors and actuators. All of the motors and actuators are fully electric. Other systems use electric motors to rotate pumps of various hydraulic systems. The fully electric boom facilitates a quieter, more environmentally friendly, more efficient lift device.

Electric Boom

Referring to FIG. 1, an electric lifting apparatus, an electric telehandler, an electric boom lift, a towable electric boom lift, a lift device, a fully electric boom lift, etc., shown as electric boom 10 includes a base assembly 12 (e.g., a support assembly, a drivable support assembly, a support structure, etc.), a platform assembly 16 (e.g., a platform, a terrace, etc.), and a lift assembly 14 (e.g., a boom lift assembly, a lifting apparatus, an articulated arm, a scissors lift, etc.). If electric boom 10 is a telehandler, platform assembly 16 can be replaced with a fork apparatus, a bucket apparatus, a material lifting apparatus, a mechanical lifting apparatus attachment, etc. Electric boom 10 includes a front end (e.g., a forward facing end, a front portion, a front, etc.), shown as front 62, and a rear end (e.g., a rearward facing end, a back portion, a back, a rear, etc.,) shown as rear 60. Lift assembly 14 is configured to elevate platform assembly 16 in an upwards direction 46 relative to base assembly 12. Lift assembly 14 is also configured to translate platform assembly 16 in a downwards direction 48. Lift assembly 14 is also configured to translate platform assembly 16 in either a forwards direction 50 or a rearwards direction 51. Lift assembly 14 generally facilitates performing a lifting function to raise and lower platform assembly 16, as well as movement of platform assembly 16 in various directions.

Base assembly 12 defines a longitudinal axis 78 and a lateral axis 80. Longitudinal axis 78 defines forwards direction 50 of electric boom 10 and rearwards direction 51. Electric boom 10 is configured to translate in forwards direction 50 and to translate backwards in rearwards direction 51. Base assembly 12 includes one or more wheels, tires, wheel assemblies, tractive elements, rotary elements, treads, etc., shown as tractive elements 82. Tractive elements 82 are configured to rotate to drive (e.g., translate, steer, move, etc.) electric boom 10. Tractive elements 82 can each include an electric motor 52 (e.g., electric wheel motors) configured to drive tractive elements 82 (e.g., to rotate tractive elements 82 to facilitation motion of electric boom 10). In other embodiments, tractive elements 82 are configured to receive power (e.g., rotational mechanical energy) from electric motors 52 through a drive train (e.g., a combination of any number and configuration of a shaft, an axle, a gear reduction, a gear train, etc.). Tractive elements 82 and electric motors 52 can facilitate a driving and/or steering function of electric boom 10.

Platform assembly 16 is configured to provide a work area for an operator of electric boom 10 to stand/rest upon. Platform assembly 16 can be pivotally coupled to an upper end of lift assembly 14. Electric boom 10 is configured to facilitate the operator accessing various elevated areas (e.g., lights, platforms, the sides of buildings, building scaffolding, trees, power lines, etc.). Electric boom 10 uses various electrically powered motors and electrically powered linear actuators to facilitate elevation of platform assembly 16 (e.g., relative to base assembly 12, or to a ground surface that base assembly 12 rests upon).

Platform assembly 16 includes a base member, a base portion, a platform, a standing surface, a shelf, a work platform, a floor, a deck, etc., shown as deck 18. Deck 18 provides a space (e.g., a floor surface) for a worker to stand upon as platform assembly 16 is raised and lowered.

Platform assembly 16 includes various members, beams, bars, guard rails, rails, railings, etc., shown as rails 22. Rails 22 extend along substantially an entire perimeter of deck 18. Rails 22 provide one or more members for the operator of electric boom 10 to grasp while using electric boom 10 (e.g., to grasp while operating electric boom 10 to elevate platform assembly 16). Rails 22 can include members that are substantially horizontal to deck 18. Rails 22 can also include vertical structural members that couple with the substantially horizontal members. The vertical structural members can extend upwards from deck 18.

Platform assembly 16 can include a human machine interface (HMI) (e.g., a user interface), shown as HMI 20. HMI 20 is configured to receive user inputs from the operator at platform assembly 16 to facilitate operation of electric boom 10. HMI 20 can include any number of buttons, levers, switches, keys, etc., or any other user input device configured to receive a user input to operate electric boom 10. HMI 20 can be supported by one or more of rails 22.

Platform assembly 16 includes a frame 24 (e.g., structural members, support beams, a body, a structure, etc.) that extends at least partially below deck 18. Frame 24 can be integrally formed with deck 18. Frame 24 is configured to provide structural support for deck 18 of platform assembly 16. Frame 24 can include any number of structural members (e.g., beams, bars, I-beams, etc.) to support deck 18. Frame 24 couples platform assembly 16 with lift assembly 14. Frame 24 may rotatably or pivotally coupled with lift assembly 14 to facilitate rotation of platform assembly 16 about an axis 28 (e.g., a centerline). Frame 24 can also rotatably/pivotally couple with lift assembly 14 such that frame 24 and platform assembly 16 can pivot about an axis 25 (e.g., a centerline).

Lift assembly 14 includes one or more beams, articulated arms, bars, booms, arms, support members, boom sections, cantilever beams, etc., shown as lift arms 32. Lift arms 32 are hingedly or rotatably coupled with each other at their ends. Lift arms 32 can be hingedly or rotatably coupled to facilitate articulation of lift assembly 14 and raising/lowering of platform assembly 16. Electric boom 10 includes a lower lift arm 32a, a central or medial lift arm 32b, and an upper lift arm 32c. Lower lift arm 32a is configured to hingedly or rotatably couple at one end with base assembly 12 to facilitate lifting (e.g., elevation) of platform assembly 16. Lower lift arm 32a is configured to hingedly or rotatably couple at an opposite end with medial lift arm 32b. Likewise, medial lift arm 32b is configured to hingedly or rotatably couple with upper lift arm 32c. Upper lift arm 32c can be configured to hingedly interface/couple and/or telescope with an intermediate lift arm 32d. Upper lift arm 32c can be referred to as "the jib" of electric boom 10. Intermediate lift arm 32d may extend into an inner volume of upper lift arm 32c and extend/retract. Lower lift arm 32a and medial lift arm 32b may be referred to as "the boom" of electric boom 10. Intermediate lift arm 32d can be configured to couple (e.g., rotatably, hingedly, etc.), with platform assembly 16 to facilitate levelling of platform assembly 16.

Lift arms 32 are driven to hinge or rotate relative to each other by electric actuators 34 (e.g., electric linear actuators, linear electric arm actuators, etc.). Electric actuators 34 can be mounted between adjacent lift arms 32 to drive adjacent lift arms 32 to hinge or pivot (e.g., rotate some angular amount) relative to each other about pivot points 84. Electric actuators 34 can be mounted between adjacent lift arms 32 using any of a foot bracket, a flange bracket, a clevis bracket, a trunnion bracket, etc. Electric actuators 34 are configured to extend or retract (e.g., increase in overall length, or decrease in overall length) to facilitate pivoting adjacent lift arms 32 to pivot/hinge relative to each other, thereby articulating lift arms 32 and raising or lowering platform assembly 16.

Electric actuators 34 can be configured to extend (e.g., increase in length) to increase a value of angle 74 formed between adjacent lift arms 32. Angle 74 can be defined between centerlines of adjacent lift arms 32 (e.g., centerlines that extend substantially through a center of lift arms 32). For example, electric actuator 34a is configured to extend/retract to increase/decrease angle 74a defined between a centerline of lower lift arm 32a and longitudinal axis 78 (angle 74a can also be defined between the centerline of lower lift arm 32a and a plane defined by longitudinal axis 78 and lateral axis 80) and facilitate lifting of platform assembly 16 (e.g., moving platform assembly 16 at least partially along upwards direction 46). Likewise, electric actuator 34b can be configured to retract to decrease angle 74a to facilitate lowering of platform assembly 16 (e.g., moving platform assembly 16 at least partially along downwards direction 48). Similarly, electric actuator 34b is configured to extend to increase angle 74b defined between centerlines of lower lift arm 32a and medial lift arm 32b and facilitate elevating of platform assembly 16. Similarly, electric actuator 34b is configured to retract to decrease angle 74b to facilitate lowering of platform assembly 16. Electric actuator 34c is similarly configured to extend/retract to increase/decrease angle 74c, respectively, to raise/lower platform assembly 16.

Electric actuators 34 can be mounted (e.g., rotatably coupled, pivotally coupled, etc.) to adjacent lift arms 32 at mounts 40 (e.g., mounting members, mounting portions, attachment members, attachment portions, etc.). Mounts 40 can be positioned at any position along a length of each lift arm 32. For example, mounts 40 can be positioned at a midpoint of each lift arm 32, and a lower end of each lift arm 32.

Intermediate lift arm 32d and frame 24 are configured to pivotally interface/couple at a platform rotator 30 (e.g., a rotary actuator, a rotational electric actuator, a gear box, etc.). Platform rotator 30 facilitates rotation of platform assembly 16 about axis 28 relative to intermediate lift arm 32d. In some embodiments, platform rotator 30 is between frame 24 and upper lift arm 32c and facilitates pivoting of platform assembly 16 relative to upper lift arm 32c. Axis 28 extends through a central pivot point of platform rotator 30. Intermediate lift arm 32d is also configured to extend/retract along upper lift arm 32c. Intermediate lift arm 32d can also be configured to pivotally/rotatably couple with upper lift arm 32c such that intermediate lift arm 32d pivots/rotates about axis 25. Intermediate lift arm 32d can be driven to rotate/pivot about axis 25 by extension and retraction of electric actuator 34d.

Platform assembly 16 is configured to be driven to pivot about axis 28 (e.g., rotate about axis 28 in either a clockwise or a counter-clockwise direction) by an electric motor 26 (e.g., a rotary electric actuator, a stepper motor, a platform rotator, a platform electric motor, an electric platform rotator motor, etc.). Electric motor 26 can be configured to drive frame 24 to pivot about axis 28 relative to upper lift arm 32c (or relative to intermediate lift arm 32d). Electric motor 26 can be configured to drive a gear train to pivot platform assembly 16 about axis 28.

Lift assembly 14 is configured to pivotally or rotatably couple with base assembly 12. Base assembly 12 include a rotatable base member, a rotatable platform member, a fully electric turntable, etc., shown as turntable 70. Lift assembly 14 is configured to rotatably/pivotally couple with base assembly 12. Turntable 70 is rotatably coupled with a base, frame, structural support member, carriage, etc., of base assembly 12, shown as base 36. Turntable 70 is configured to rotate or pivot relative to base 36. Turntable 70 can pivot/rotate about central axis 42 relative to base 36. Turntable 70 facilitates accessing various elevated and angularly offset locations at platform assembly 16. Turntable 70 is configured to be driven to rotate or pivot relative to base 36 by an electric motor, an electric turntable motor, an electric rotary actuator, etc., shown as turntable motor 44. Turntable motor 44 can be configured to drive a ring gear that is rotatably coupled with base 36 to produce relative rotation of turntable 70 relative to base 36. Lower lift arm 32a is pivotally coupled with turntable 70 (or with a turntable member 72 of turntable 70) such that lift assembly 14 and platform assembly 16 rotate as turntable 70 rotates about central axis 42. In some embodiments, turntable 70 is configured to rotate a complete 360 degrees about central axis 42 relative to base 36. In other embodiments, turntable 70 is configured to rotate an angular amount less than 360 degrees about central axis 42 relative to base 36 (e.g., 270 degrees, 120 degrees, etc.).

Base assembly 12 includes one or more energy storage devices (e.g., capacitors, batteries, Lithium-Ion batteries, Nickel Cadmium batteries, etc.), shown as batteries 64. Batteries 64 are configured to store energy in a form (e.g., in the form of chemical energy) that can be converted into electrical energy for the various electric motors and electric actuators of electric boom 10. Batteries 64 can be stored within base 36. Electric boom 10 includes a controller 38 configured to operate any of the electric motors, electric actuators, etc., of electric boom 10. Controller 38 can be configured to receive sensory input information from various sensors of electric boom 10, user inputs from HMI 20 (or any other user input device such as a key-start or a push-button start), etc. Controller 38 can be configured to generate control signals for the various electric motors, electric actuators, etc., of electric boom 10 to operate any of the electric motors, electric actuators, electrically powered movers, etc., of electric boom 10. Batteries 64 are configured to power any of the electrical motors, sensors, actuators, electric linear actuators, electrical devices, electrical movers, stepper motors, etc., of electric boom 10. Base assembly 12 can include a power circuit including any necessary transformers, resistors, transistors, thermistors, capacitors, etc., to provide appropriate power (e.g., electrical energy with appropriate current and/or appropriate voltage) to any of the electric motors, electric actuators, sensors, electrical devices, etc., of electric boom 10.

Batteries 64 are configured to deliver power to electric motors 52 to drive tractive elements 82. A rear set of tractive elements 82 can be configured to pivot to steer electric boom 10. In other embodiments, a front set of tractive elements 82 are configured to pivot to steer electric boom 10. In still other embodiments, both the front and the rear set of tractive elements 82 are configured to pivot (e.g., independently) to steer electric boom 10.

Base assembly 12 can include one or more laterally extending frame members (e.g., laterally extending structural members) and one or more longitudinally extending frame members (e.g., longitudinally extending structural members).

Base assembly 12 includes a steering system 150. Steering system 150 is configured to drive tractive elements 82 to pivot for a turn of electric boom 10. Steering system 150 can be configured to pivot tractive elements 82 in pairs (e.g., to pivot a front pair of tractive elements 82), or can be configured to pivot tractive elements 82 independently (e.g., four-wheel steering for tight-turns).

Base assembly 12 can include an HMI 21 (e.g., a user interface, a user input device, a display screen, etc.). In some embodiments, HMI 21 is coupled with base 36. In other embodiments, HMI 21 is positioned on turntable 70. HMI 21 can be positioned on any side or surface of base assembly 12 (e.g., on the front 62 of base 36, on the rear 60 of base 36, etc.)

Figure 2:
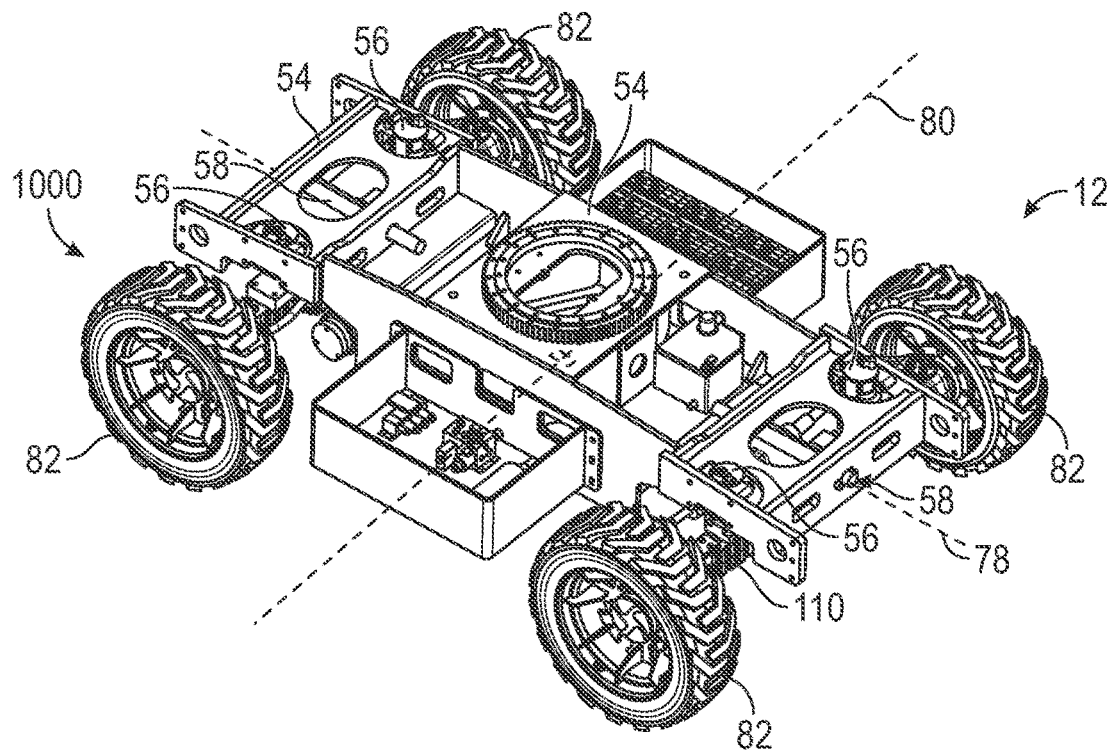
FIG. 2 is a perspective view of a portion of a base assembly of the fully electric boom of FIG. 1, according to an exemplary embodiment.
Figure 3:
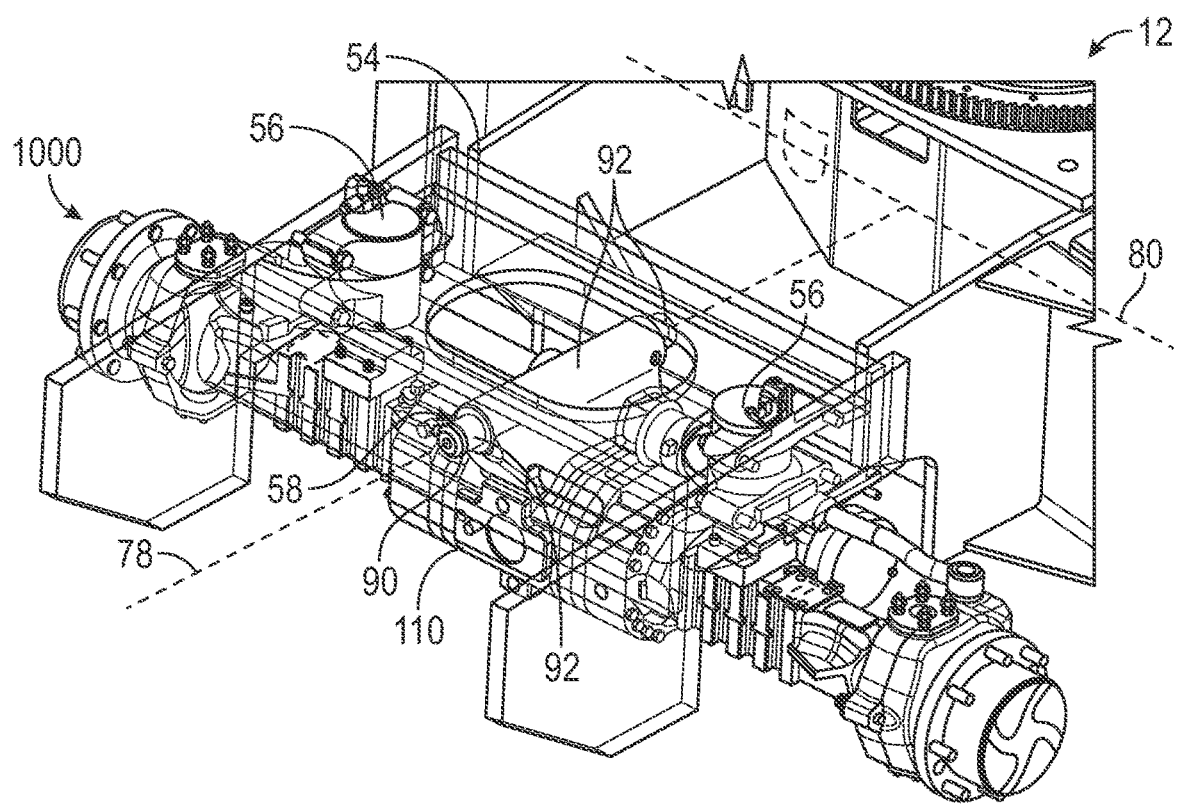
FIG. 3 is a perspective view of a portion of a base assembly of the fully electric boom of FIG. 1, according to an exemplary embodiment.
Figure 4:
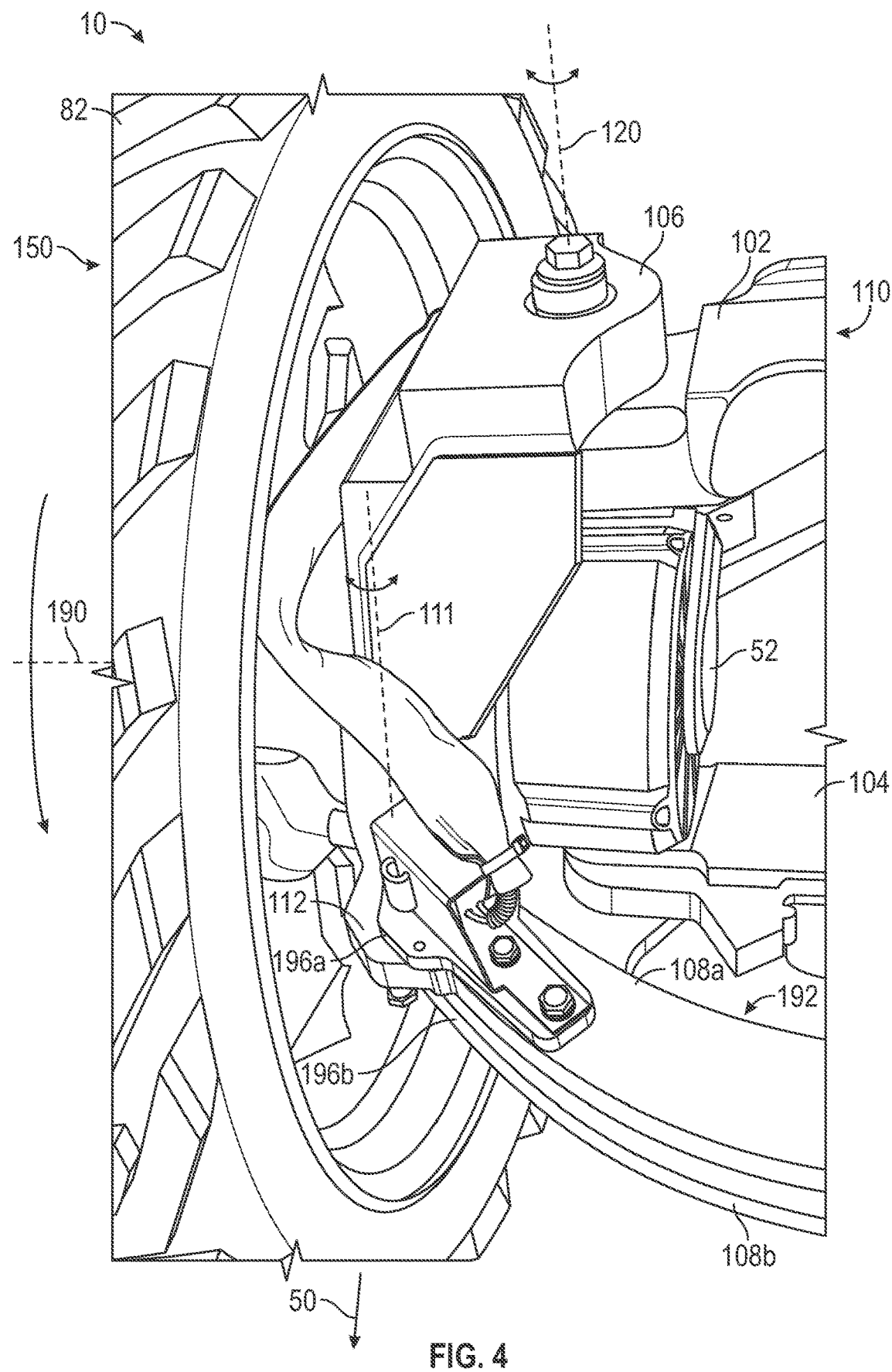
FIG. 4 is a perspective view of a steering system of the fully electric boom of FIG. 1, according to an exemplary embodiment.
Figure 5:
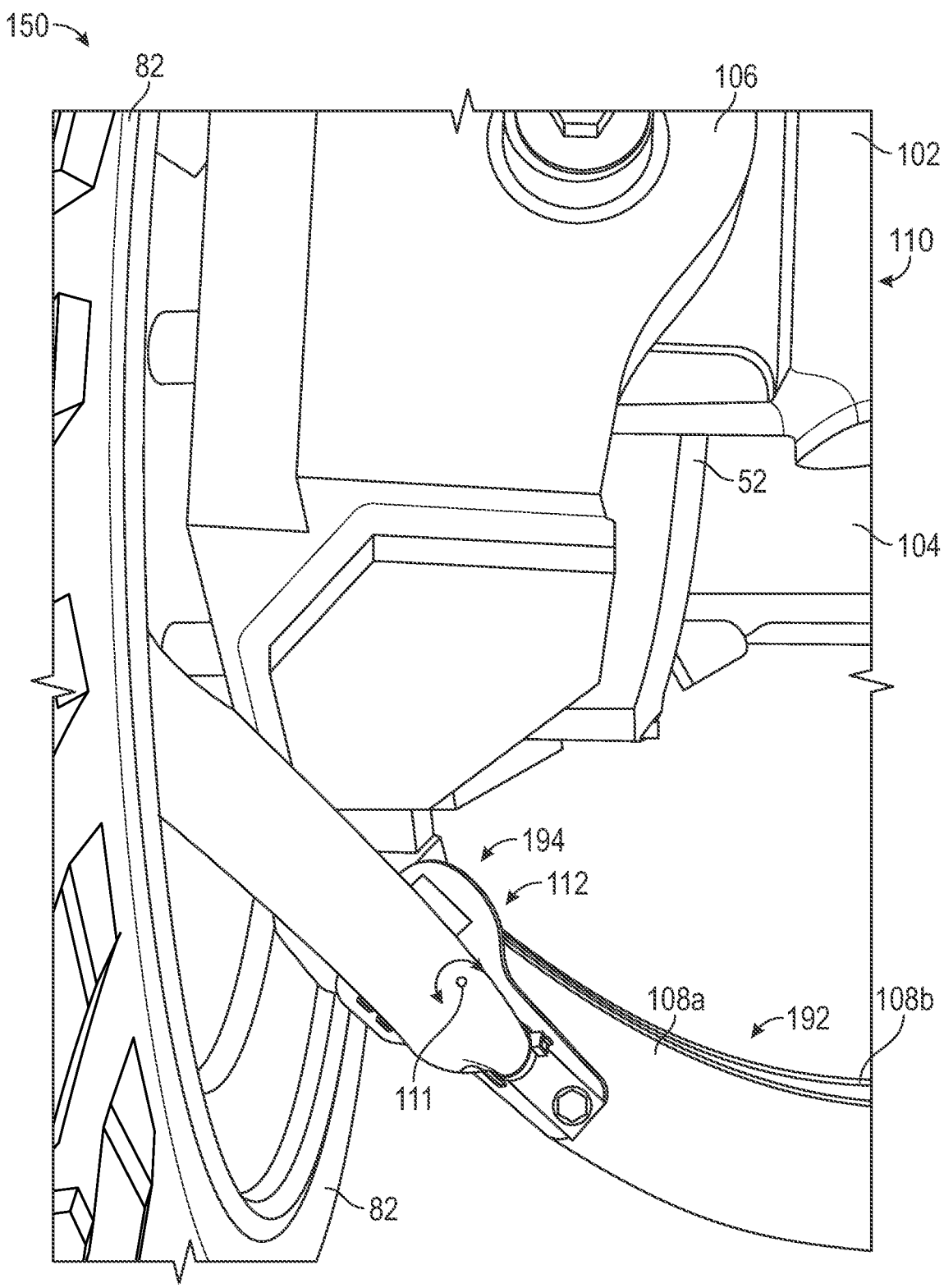
FIG. 5 is a perspective view of the steering system of the fully electric boom of FIG. 1, according to an exemplary embodiment.

Referring now to FIGS. 2-3, base assembly 12 includes a longitudinally extending frame member 54 (e.g., a rigid member, a structural support member, an axle, a base, a frame, a carriage, etc.). Longitudinally extending frame member 54 provides structural support for turntable 70 as well as tractive elements 82. Longitudinally extending frame member 54 is pivotally coupled with lateral frame members 110 (e.g., axles, frame members, beams, bars, etc.) at opposite longitudinal ends of longitudinally extending frame member 54. For example, lateral frame members 110 may be pivotally coupled with longitudinally extending frame member 54 at a front end and a rear end of longitudinally extending frame member 54. Lateral frame members 110 can be configured to pivot about a pivot joint 58. Pivot joint 58 can include a pin and a receiving portion (e.g., a bore, an aperture, etc.). The pin of pivot joint 58 is coupled to one of lateral frame member 110 (e.g., a front lateral frame member 110 or a rear lateral frame member 110) or longitudinally extending frame member 54 and the receiving portion is coupled to the other of longitudinally extending frame member 54 and lateral frame member 110. For example, the pin may be coupled with longitudinally extending frame member 54 and the receiving portion can be coupled with one of lateral frame members 110 (e.g., integrally formed with the front lateral frame member 110).

In some embodiments, longitudinally extending frame member 54 and lateral frame members 110 are integrally formed or coupled (e.g., fastened, welded, riveted, etc.) to define base 36. In still other embodiments, base 36 is integrally formed with longitudinally extending frame member 54 and/or lateral frame members 110. In still other embodiments, base 36 is coupled with longitudinally extending frame member 54 and/or lateral frame members 110.

Base assembly 12 includes one or more axle actuators 56 (e.g., electric linear actuators, electric axle actuators, electric levelling actuators, etc.). Axle actuators 56 can be linear actuators configured to receive power from batteries 64. Axle actuators 56 can be configured to extend or retract to contact a top surface of a corresponding one of lateral frame members 110. When axle actuators 56 extend, an end of a rod of electric levelling actuators can contact the surface of lateral frame member 110 and prevent relative rotation between lateral frame member 110 and longitudinally extending frame member 54. In this way, the relative rotation/pivoting between lateral frame member 110 and longitudinally extending frame member 54 can be locked (e.g., to prevent rolling of longitudinally extending frame member 54 relative to lateral frame members 110 during operation of lift assembly 14). Axle actuators 56 can receive power from batteries 64. Axle actuators 56 receive control signals from controller 38. Axle actuators 56 receive electrical power (e.g., to extend or retract) from batteries 64.

Steering System

Referring now to FIGS. 4-12, steering system 150 is shown in greater detail, according to an exemplary embodiment. Steering system 150 is configured to pivot tractive elements 82 to perform a turn. Steering system 150 includes one or more frame members, control arm assemblies, hub assemblies, knuckles, etc., shown as steering knuckle 106. Tractive elements 82 are rotatably coupled with steering knuckle 106. Tractive elements 82 are configured to rotate relative to steering knuckle 106 about axis 190. Tractive elements 82 can frictionally interface with a ground surface and thereby drive electric boom 10 as they are driven to rotate by electric motors 52.

Steering knuckle 106 is configured to rotate/pivot relative to laterally extending frame members 102/104 about axis 120 to facilitate steering of electric boom 10. Steering knuckle 106 can rotatably couple with laterally extending frame members 102/104 with a bearing. Electric motor 52 can be configured to pivot with steering knuckle 106 as steering knuckle 106 rotates about axis 120. Steering knuckle 106 is driven to pivot about axis 120 by a tie rod, a control arm, a rigid member, etc., shown as steering member 192. Steering member 192 includes a first arcuate member 108*a* and a second arcuate member 108*b* (e.g., curved members, bowed members, arching members, etc.). Arcuate members 108 can have a generally arcuate shape, a curved shape, a constant-radius curved shape, a non-constant radius curved shape, an angled shape (e.g., two straight or curved portions angularly offset), etc. Steering member 192 is configured to pivotally couple with a connecting portion 112 of steering knuckle 106 about axis 111. Steering member 192 can be coupled with an elongated member, a cylinder, a pin, a rod, etc., shown as pin 202 that extends between first arcuate member 108*a* and second arcuate member 108*b* through a corresponding aperture of connecting portion 112. In some embodiments, pin 202 is fixedly coupled with arcuate members 108 and is rotatably coupled with an aperture/bore of steering knuckle 106. In other embodiments, pin 202 is fixedly coupled with steering knuckle 106 and is rotatably coupled with apertures/bores of arcuate members 108. First arcuate member 108*a* and second arcuate member 108*b* each include a connecting end 196, respectively. Connecting end 196 can include an aperture, bore, hole, etc., that extends therethrough and is configured to couple with pin 202. In some embodiments, a bearing (e.g., a sleeve bearing, a ball bearing, etc.) is disposed in the aperture of connecting portion 112 and is configured to couple with pin 202 that extends between first arcuate member 108*a* and second arcuate member 108*b*. The pivotal/rotatable interface between steering knuckle 106 and first and second arcuate members 108*a* and 108*b* facilitates relative rotation between steering knuckle 106 and steering member 192 about axis 111.

Electric motor 52 is configured to drive tractive element 82. Electric motor 52 can be mounted between laterally extending frame member 102 and laterally extending frame member 104. Laterally extending frame members 102/104 are end portions of one of (e.g., a front, a rear) lateral frame member 110. Lateral frame member 110 can extend along substantially an entire lateral width of electric boom 10. Lateral frame member 110 provide structural support between tractive elements 82 and base assembly 12. Lateral frame member 110 extends along lateral axis of electric boom 10.

Steering member 192 has a generally arcuate shape and extends between electric actuator 122 (e.g., an electric linear actuator, a linear electric steering actuator, etc.) and steering knuckle 106. Steering member 192 is configured to couple with a rod, a cylinder, an extension member, a push rod, etc., of electric actuator 122, shown as rod 126. Steering member 192 can be fixedly coupled with an end portion, a connecting portion, a clevis, an attachment portion, etc., of rod 126, shown as end portion 130. Rod 126 is configured to extend and retract relative to a body, a housing, a frame, a main member, an outer member, etc., of electric actuator 122, shown as body 124. Rod 126 can be received therewithin body 124 of electric actuator 122 and driven to extend and retract by electric motor 132. Electric motor 132 may be configured to interface with a gear that drives a drive nut (not shown). The drive nut may drive rod 126 to extend or retract.

End portion 130 of rod 126 is configured to be received therebetween first arcuate member 108*a* and second arcuate member 108*b*. First arcuate member 108*a* and second arcuate member 108*b* can be substantially parallel to each other and extend outwards between electric actuator 122 and tractive element 82. End portion 130 can be fixedly coupled with first arcuate member 108*a* and second arcuate member 108*b*. In some embodiments, end portion 130 is fixedly coupled with first arcuate member 108*a* and second arcuate member 108*b* with fasteners 128 (e.g., bolts, rivets, screws, etc.) that extend therethrough. In some embodiments, two or more fasteners 128 are used to fixedly couple end portion 130 of rod 126 with steering member 192 (i.e., with first arcuate member 108*a* and second arcuate member 108*b*). In other embodiments, end portion 130 of rod 126 and steering member 192 are integrally formed, welded, etc., or otherwise fixedly attached.

The fixed connection between end portion 130 of rod 126 and steering member 192 prevents rotation between rod 126 and steering member 192. Advantageously, this facilitates reducing transverse loads being applied to electric actuator 122. This can reduce the likelihood of any of the internal components of electric actuator 122 failing due to excessive transverse loads/forces.

Electric actuator 122 is configured to pivotally couple with longitudinally extending frame members 142. Longitudinally extending frame members 142 extend longitudinally outwards from lateral frame member 110. Longitudinally extending frame members 142 can extend from a centerpoint of lateral frame member 110. Longitudinally extending frame members 142 can extend outwards (e.g., in forwards direction 50) from lateral frame member 110. Longitudinally extending frame members 142 can be removably coupled with lateral frame member 110 (e.g., with fasteners), integrally formed with lateral frame member 110, or otherwise connected/coupled with lateral frame member 110. Electric actuator 122 is disposed between longitudinally extending frame member 142*a* and longitudinally extending frame member 142*b*. Body 124 of electric actuator 122 can be positioned between longitudinally extending frame member 142*a* and longitudinally extending frame member 142*b*.

A pin 198 may extend at least partially (or entirely) through an aperture of electric actuator 122 and corresponding apertures of longitudinally extending frame members 142. Electric actuator 122 is configured to pivot, swivel, rotate, etc., about axis 180 relative to longitudinally extending frame members 142. As electric actuator 122 extends and retracts, electric actuator 122 may pivot about axis 180 in either direction. Axis 180 can be defined as extending through pin 198. Pin 198 can be fixedly coupled with electric actuator 122 and configured to rotatably couple with bearings, mounting members, rotatable coupling members, etc., shown as coupling members 200. Coupling members 200 can be disposed on outer sides of longitudinally extending frame members 142. For example, coupling member 200*a* may be disposed on an upper or outer surface of longitudinally extending frame member 142*a*, while coupling member 200*b* is disposed on a bottom or outer surface of longitudinally extending frame member 142*b*. Pin 198 can be slidably coupled with an aperture, bore, hole, etc., of body 124 of electric actuator 122. In other embodiments, pin 198 is fixedly coupled with the bore of body 124. In still other embodiments, pin 198 is slip fit with an inner surface of the bore of body 124. Pin 198 can be rotatably coupled with coupling members 200. Coupling members 200 can each include a bearing (e.g., a ball bearing, a roller bearing, a sleeve bearing, etc.) configured to couple with pin 198. Coupling members 200 can be coupled with longitudinally extending frame members 142.

Longitudinally extending frame member 142*a* and longitudinally extending frame member 142*b* can be substantially parallel to each other and define a receiving area therebetween. The receiving area is configured to receive body 124 of electric actuator 122 therebetween. Pin 198 may extend through at least a portion or substantially an entirety of the receiving area defined between longitudinally extending frame member 142*a* and longitudinally extending frame member 142*b*.

As electric actuator 122 extends (e.g., rod 126 extends relative to body 124), electric actuator 122 may rotate about axis 180. Likewise, steering knuckle 106 and steering member 192 rotate relative to each other about axis 111. Similarly, when electric actuator 122 retracts (e.g., rod 126 retracts relative to body 124), electric actuator 122 may rotate about axis 180 and steering knuckle 106 and steering member 192 rotate relative to each other about central axis 111. In this way, extension and retraction of electric actuator 122 can drive the rotation/pivoting of steering knuckle 106 about axis 120 to turn tractive element 82. Electric actuator 122 can receive power for extending and retracting from batteries 64. Electric actuator 122 can receive control signals that indicate a degree of extension or retraction (and thereby indicate a degree of turn of tractive elements 82) from controller 38. Controller 38 may provide electric actuator 122 with the control signals that indicate the degree of extension or retraction in response to receiving a user input from HMI 20, or any other user input device of electric boom 10. Controller 38 operates electric actuator 122 to extend or retract to indicate a direction of turn of electric boom 10.

Electric motors 52 can also receive power from batteries 64 to drive tractive elements 82. Electric motors 52 can receive a control signal from controller 38 to operate (e.g., a desired speed).

Arcuate members 108 have a curved shape such that when tractive elements 82 are pivoted to their angular extremes (e.g., a sharpest turn possible, when electric actuator 122 is fully extended, etc.), steering member 192 does not contact electric motors 52. This facilitates sharper turns of electric boom 10 without steering member 192 contacting electric motors 52.

Figure 8:
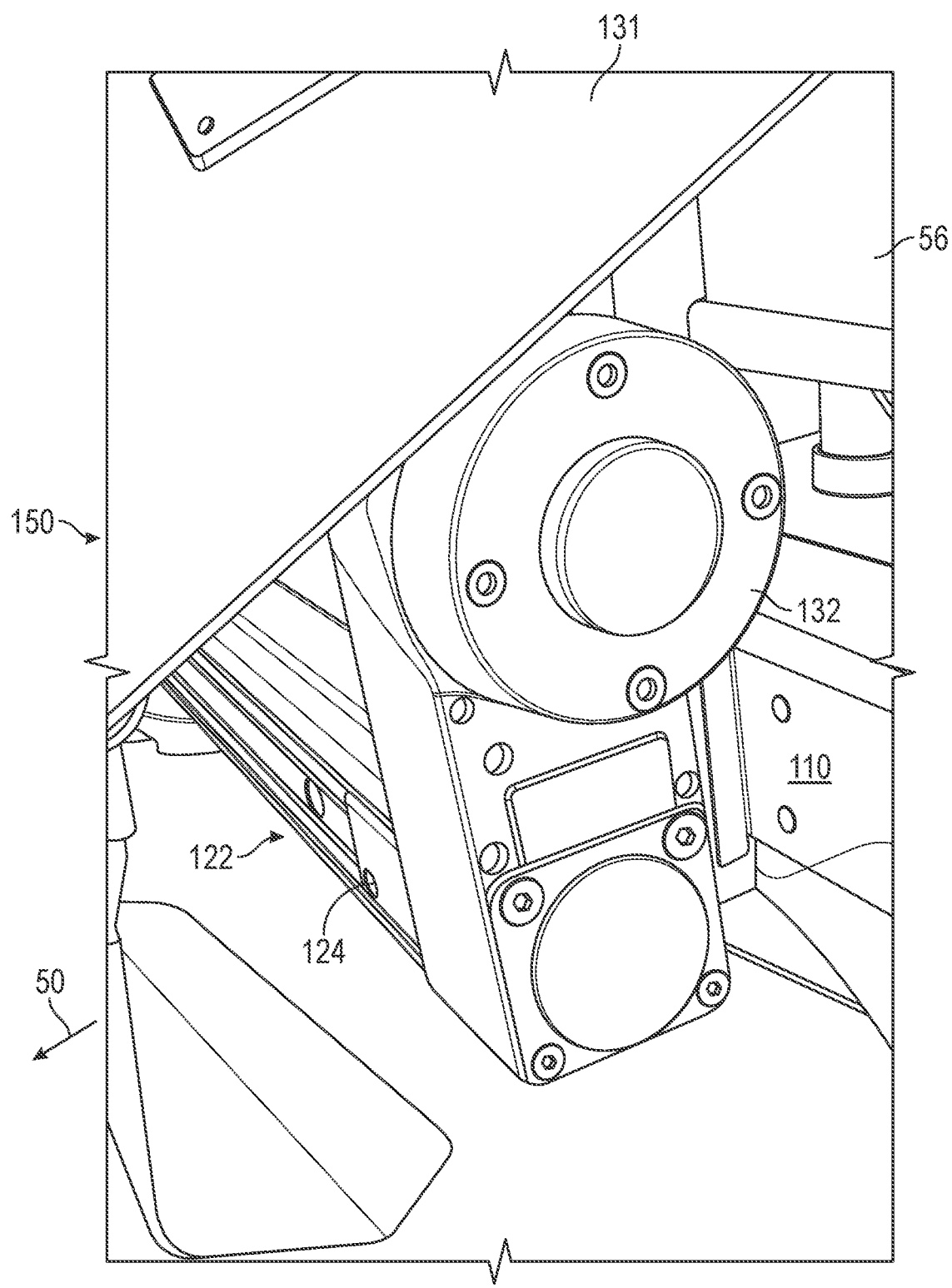
FIG. 8 is a perspective view of a portion of the steering system of the fully electric boom of FIG. 1, according to an exemplary embodiment.
Figure 9:
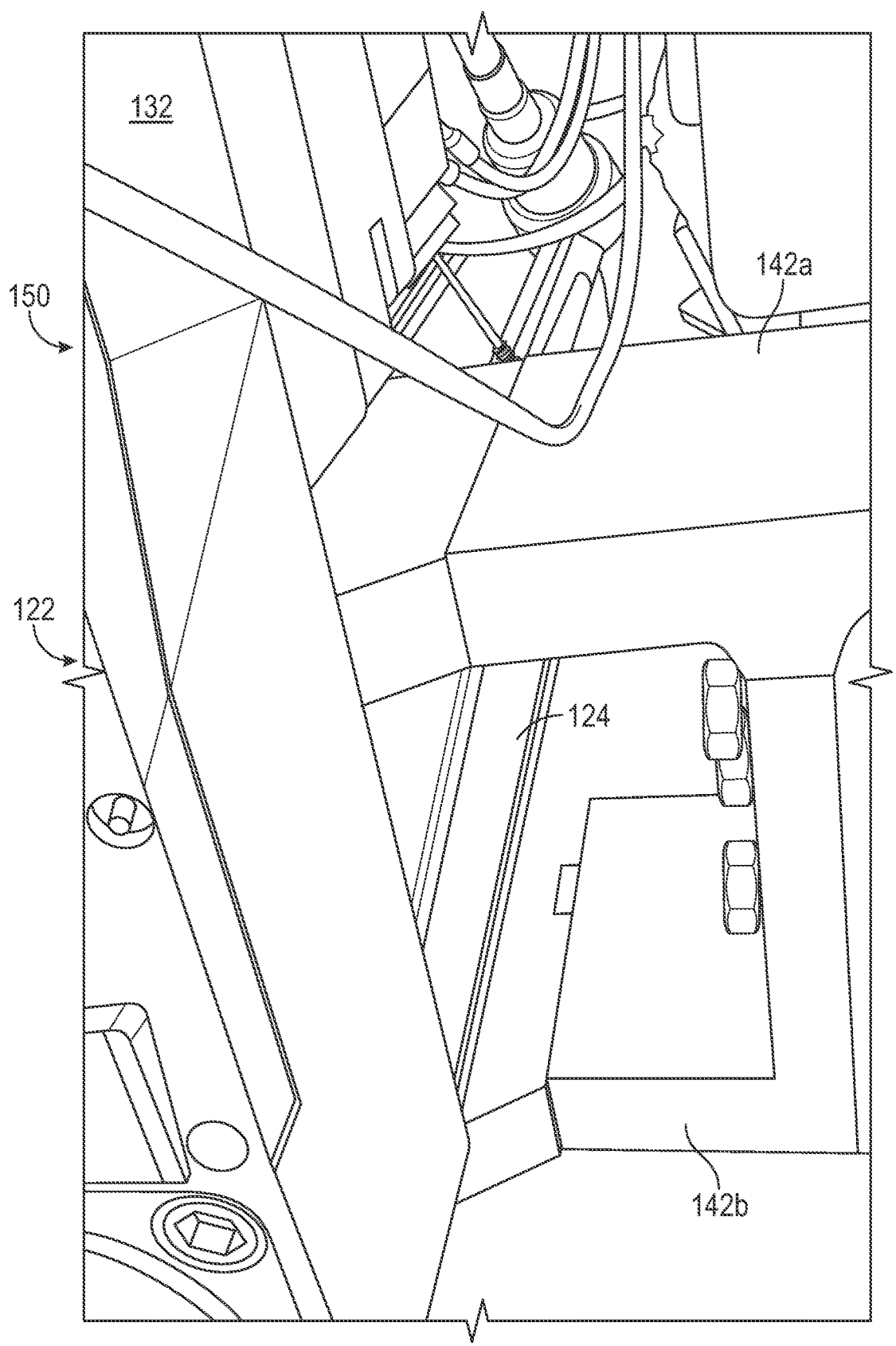
FIG. 9 is a perspective view of a portion of the steering system of the fully electric boom of FIG. 1, according to an exemplary embodiment.
Figure 10:
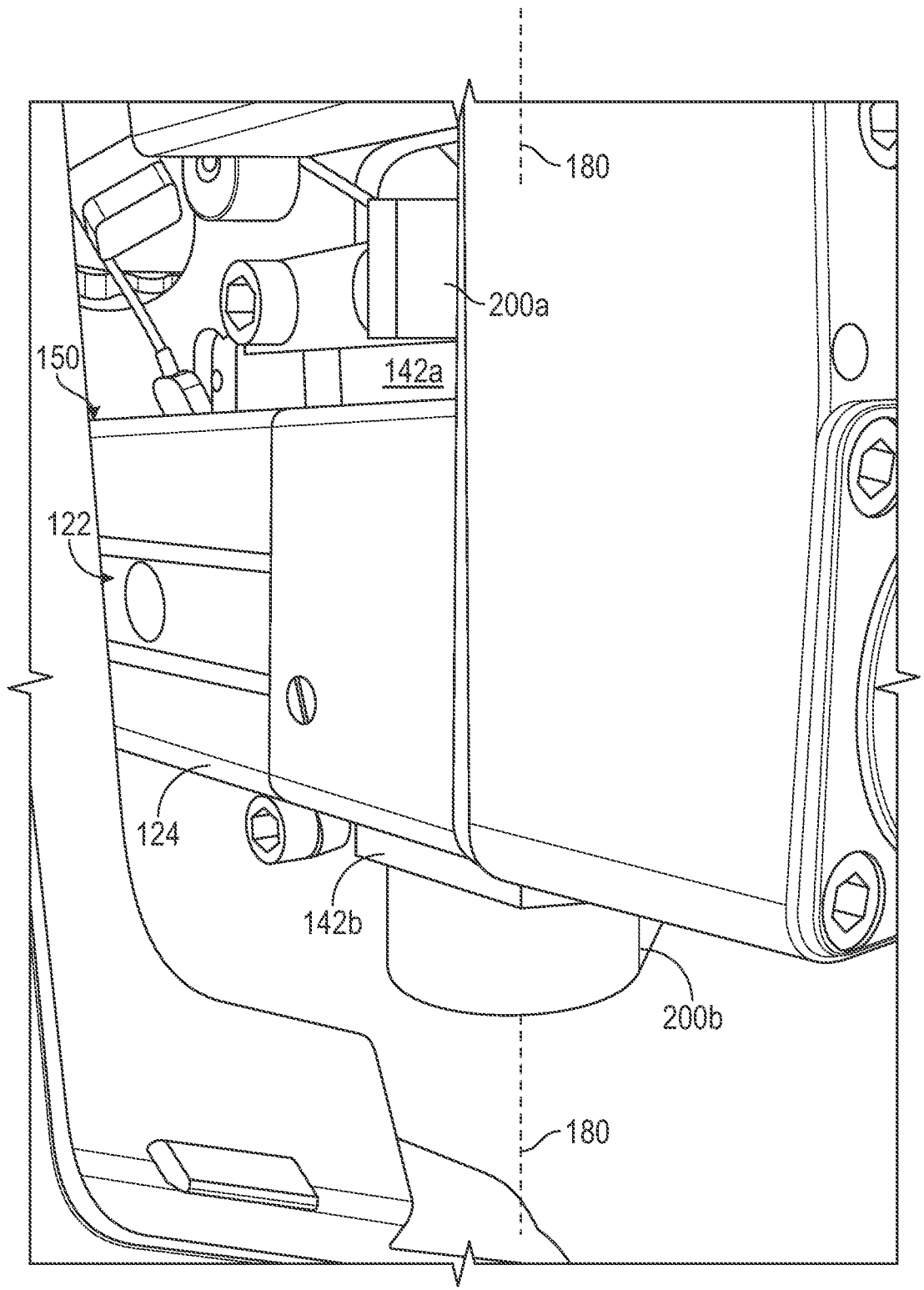
FIG. 10 is a perspective view of a portion of the steering system of the fully electric boom of FIG. 1, according to an exemplary embodiment.

Referring particularly to FIG. 8, electric boom 10 can include a shield, a guard, a planar member, etc., shown as guard member 131. Guard member 131 can protrude outwards from electric boom 10 in a direction of travel of electric boom 10. Guard member 131 provides a barrier for objects in front of electric boom 10 such that electric actuator 122 does not contact the objects as electric boom 10 is driven. Electric boom 10 can include a front guard member 131 and a rear guard member 131 disposed at opposite ends of electric boom 10. Guard members 131 can protrude outwards along longitudinal axis 78 in either forwards direction 50 or rearwards direction 51. For example, a front guard member 131 may protrude outwards in forwards direction 50 from front 62 of base assembly 12. Likewise, a rear guard member 131 may protrude in rearwards direction 51 from rear 60 of base assembly 12.

It should be noted that while only one tractive element 82 is shown pivoted/rotated by steering system 150, any or all of tractive elements 82 of electric boom 10 can be similarly configured. For example, steering system 150 can include a similar and symmetric electric actuator 122 at an opposite side (e.g., a right/left side) of base assembly 12 that steers tractive element 82 at the opposite side. In some embodiments, steering system 150 is positioned on an outwards facing side of lateral members 110 (e.g., a forwards facing side of a front lateral frame member 110, a rearwards facing side of a rear lateral frame member 110). In other embodiments, steering system 150 is positioned in an inwards facing side of lateral members 110 (e.g., an inwards facing side of a front lateral frame member 110, a front facing side of a rear lateral frame member 110).

Turn Table

Figure 13:
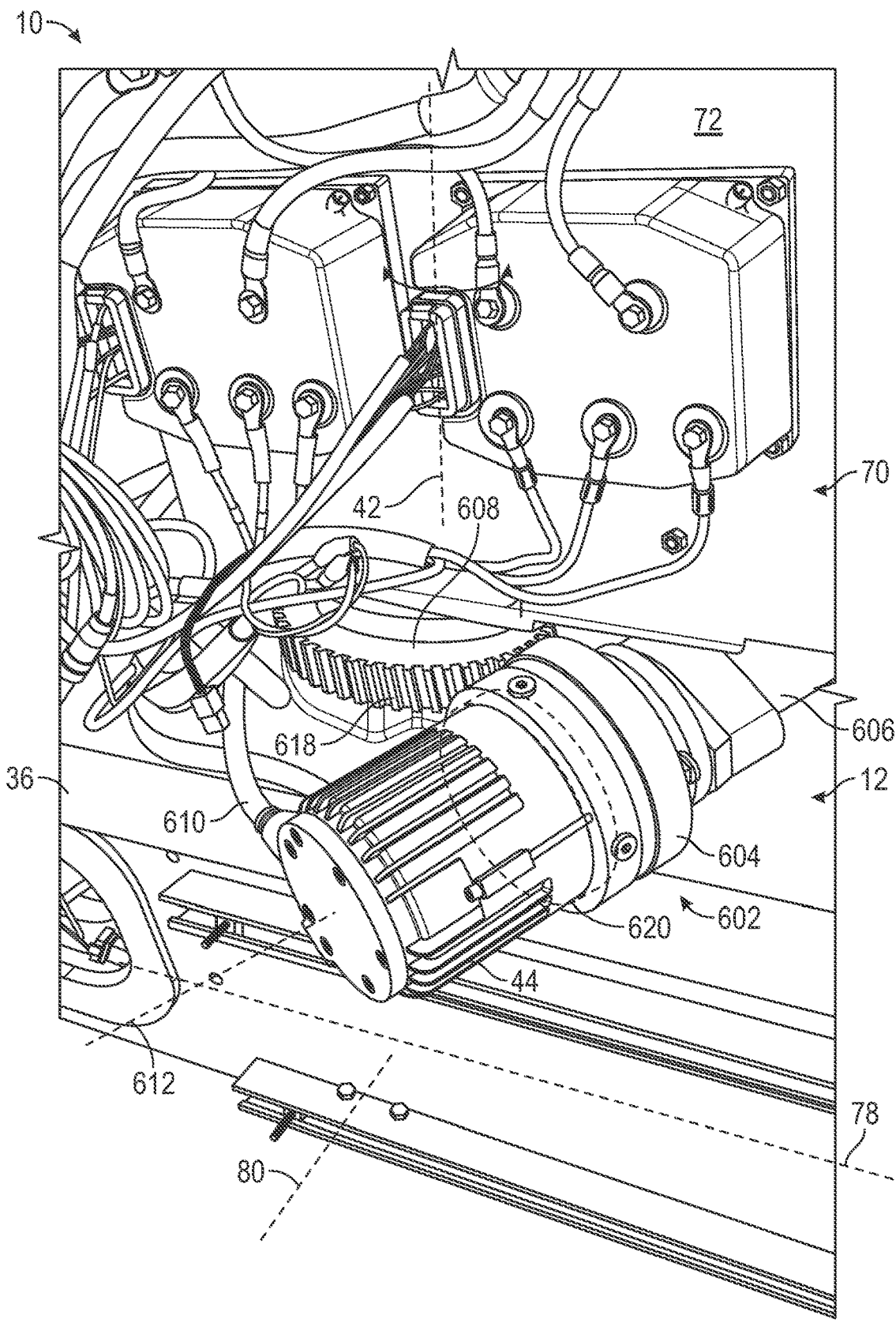
FIG. 13 is a perspective view of a turntable of the fully electric boom of FIG. 1 including an electric turntable motor, a gear box, a transmission, and a ring gear, according to an exemplary embodiment.

Referring now to FIG. 13, turntable 70 (e.g., a swing drive) is shown in greater detail, according to an exemplary embodiment. Turntable 70 includes a gear, shown as ring gear 608. Ring gear 608 includes a bearing, shown as slewing bearing 614. Slewing bearing 614 is configured to interface with a cylindrical protrusion 616 of base 36. Cylindrical protrusion 616 and base 36 are integrally formed with each other. Cylindrical protrusion 616 is configured to couple with an inner surface (e.g., an inner race) of slewing bearing 614. Slewing bearing 614 can be press fit, slip fit, fastened (e.g., with a keyed interface) with cylindrical protrusion 616 of base 36. Ring gear 608 includes teeth 618 along an entire perimeter of an outer surface. Ring gear 608 can be a spur gear, a helical gear, etc., or any other gear.

Ring gear 608 can couple with turntable member 72. Ring gear 608 can be removably coupled with turntable member 72 (e.g., with fasteners, rivets, bolts, etc.) of turntable 70. Turntable member 72 rotates as ring gear 608 is driven to rotate by turntable motor 44. Turntable motor 44 can be a stepper motor, a reversible motor, a brushless motor, etc. Turntable motor 44 can operate in forwards or reverse (e.g., operate to provide rotational kinetic energy in a clockwise direction or a counter-clockwise direction).

Turntable motor 44 is an electric motor configured to receive electrical power from batteries 64. Turntable motor 44 can be a component of motor assembly 602. Motor assembly 602 can be mounted (e.g., coupled, removably coupled, connected, fastened, etc.) to base 36 or to turntable member 72. If motor assembly 602 is coupled to (e.g., mounted on) base 36, turntable motor 44 is configured to provide rotational kinetic energy to ring gear 608 to rotate ring gear 608 relative to base 36. Similarly, if motor assembly 602 is coupled to turntable member 72, motor assembly 602 rotates with turntable member 72 as turntable member 72 rotates. Motor assembly 602 can be mounted to either turntable member 72 (or any other member that rotates with ring gear 608), or can be mounted to base 36 (or any other member that is coupled to base 36).

Motor assembly 602 includes a gear box 604 (e.g., a speed reducing gear box, a reduction gear box, a torque increasing gearbox, etc.). Gear box 604 can include any gears (e.g., planetary gears, helical gears, spur gears, bevel gears, etc.) that transform the torque provided by turntable motor 44. Turntable motor 44 includes a drive shaft (not shown) that is rotatably coupled with one of the gears of gear box 604. Gear box 604 is configured to increase the torque provided by turntable motor 44 before the rotational kinetic energy is provided to ring gear 608. For example, turntable motor 44 may output rotational kinetic energy having a torque $T_1$ and a rotational velocity $\omega_1$. Gear box 604 is configured to be driven by the driveshaft of turntable motor 44 and output rotational kinetic energy at a torque $T_2$ and a rotational velocity $\omega_2$ where $T_2 > T_1$ and $\omega_2 < \omega_1$. Gear box 604 either outputs the rotational kinetic energy with torque $T_2$ and rotational velocity ω2 directly to ring gear 608 or to another gearbox, shown as transmission 606 (depending on the configuration/orientation of motor assembly 602). Transmission 606 is configured to receive the rotational kinetic from gear box 604 and transfer the rotational kinetic energy into another axis. For example, if turntable motor 44 outputs rotational kinetic energy at the driveshaft about axis 612 (where axis 612 passes through the center of the driveshaft of turntable motor 44) and ring gear 608 is configured to rotate about axis 42 (where axis 42 and axis 612 are perpendicular to each other), transmission 606 can transfer the rotational kinetic energy from axis 612 to axis 42.

In other embodiments (as described in greater detail below), axis 612 and axis 42 are substantially parallel to each other and transmission 606 is not needed. In such configurations, gear box 604 can include an output gear mounted to an output shaft (e.g., press fit, mounted with a keyed interface, etc.) that meshes with teeth 618 of ring gear 608. In such a configuration, the output gear can be any of a spur gear, a helical gear, etc.

Transmission 606 can include any gear configuration to transfer the rotational kinetic energy output by turntable motor 44 to a perpendicular axis. For example, transmission 606 can include bevel gears or a worm (e.g., a screw). If transmission 606 includes a worm, ring gear 608 can include worm gear teeth (e.g., ring gear 608 is a worm wheel).

Turntable motor 44 can receive electrical power from batteries 64 through an electrical connection, wires, an electrical harness, etc., shown as power wires 610. In some embodiments, wires 610 includes a wired connection between turntable motor 44 and controller 38 such that controller 38 can provide turntable motor 44 with control signals (e.g., to operate turntable motor 44).

Motor assembly 602 can include a turntable brake 620 (e.g., an electric brake). Turntable brake 620 can be positioned at the output driveshaft of turntable motor 44 between turntable motor 44 and gear box 604. Turntable brake 620 can lock the output driveshaft of turntable motor 44 by frictionally restricting the output driveshaft of turntable motor 44 from rotating. Turntable brake 620 can include electric actuators and a brake pad (e.g., drum brakes) that lock the output driveshaft of turntable motor 44 from rotating. In other embodiments, turntable brake 620 is a magnetic brake.

Turntable brake 620 can be configured to lock the output driveshaft of turntable motor 44. In other embodiments, turntable brake 620 is configured to lock an output driveshaft of gear box 604. Turntable brake 620 can receive electrical power from batteries 64 and control signals from controller 68. In other embodiments, turntable brake 620 is configured to directly interface (e.g., mesh) with ring gear 608 to restrict rotation of ring gear 608 when activated.

In some embodiments, turntable motor 44 and gear box 604 are configured to interface with a gear box for a turntable of a hydraulically powered boom. For example, gear box 604 can increase the torque output by turntable motor 44 such that the primary mover for turntable 70 of a boom that is not fully electric can be replaced with turntable motor 44 and gear box 604.

Figure 14:
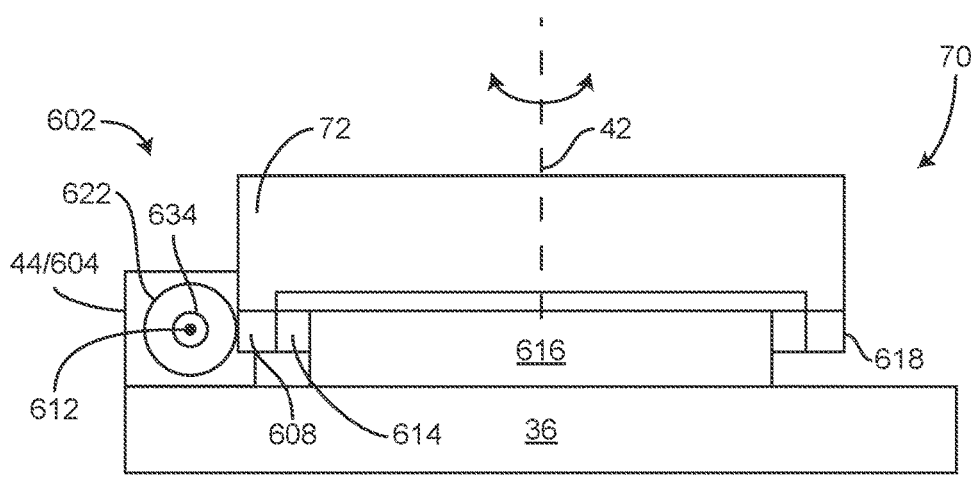
FIG. 14 is a side view of a gear interface between an output shaft of the gear box and the ring gear of the turntable of FIG. 14, according to an exemplary embodiment.
Figure 15:
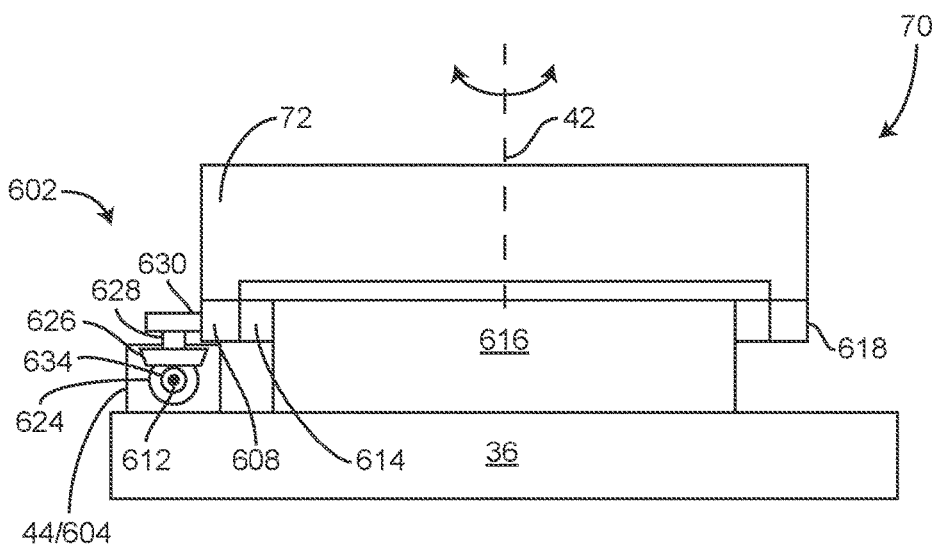
FIG. 15 is a side view of a gear interface between an output shaft of the gear box and the ring gear of the turntable of FIG. 14, according to an exemplary embodiment.
Figure 16:
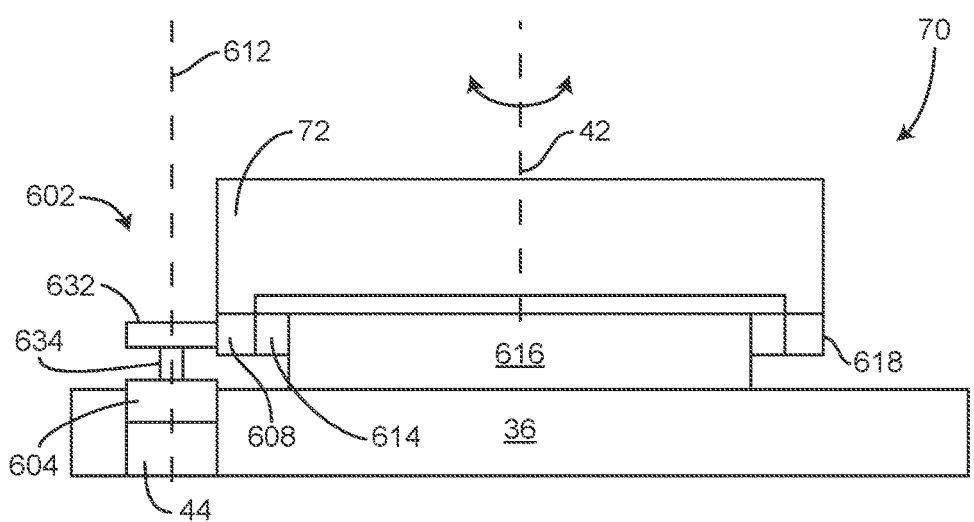
FIG. 16 is a side view of a gear interface between an output shaft of the gear box and the ring gear of the turntable of FIG. 14, according to an exemplary embodiment.

Referring now to FIGS. 14-16, various embodiments and possible configurations of turntable motor 44 and gear box 604 are shown. FIGS. 14-16 show various embodiments of transmission 606 to transfer rotational kinetic energy from gear box 604 to ring gear 608. It should be understood that the present disclosure is not limited to the configurations and embodiments shown, and that other configurations of turntable motor 44 and gear box 604 are possible to drive ring gear 608. Output driveshaft 634 is the output driveshaft of gear box 604.

In one embodiment, output driveshaft 634 of gear box 604 includes a worm 622 (FIG. 14). Worm 622 is configured to mesh with a worm gear (e.g., a worm wheel). Ring gear 608 can be a worm gear and mesh with worm 622. Output driveshaft 634 rotates about axis 612 and the rotational kinetic energy is transferred to ring gear 608 which rotates about axis 42. Turntable motor 44 can be operated to rotate in either direction, thereby rotating ring gear 608 in either direction (e.g., clockwise, counter-clockwise) about axis 42. Motor assembly 602 can be mounted (e.g., removably coupled, fixedly coupled, etc.) to base 36.

In another embodiment (FIG. 15), output driveshaft 634 is rotatably coupled with a bevel gear 624. Bevel gear 624 meshes with another bevel gear 626. Bevel gear 626 is mounted to a shaft 628 that includes a gear 630 (e.g., a spur gear, a helical gear, etc.). Gear 630 meshes with teeth 618 of ring gear 608. While not shown, shaft 628 can mount with base 36 (e.g., at a bearing). It should be understood that any other configuration of bevel gears can be used to transfer the rotational kinetic energy of turntable motor 44 from axis 612 to axis 42.

In another embodiment (FIG. 16), axis 612 of output driveshaft 634 is substantially parallel with axis 42 of ring gear 608. A gear 632 (e.g., a spur gear, a helical gear, etc.) can be rotatably coupled with output driveshaft and mesh with teeth 618 of ring gear 608.

Advantageously, turntable 70 can be driven to rotate by turntable motor 44 without using any hydraulic systems or internal combustion engines. Turntable motor 44 is a fully electric motor and can provide sufficient torque to rotate turntable 70.

Platform Rotator

Figure 17:
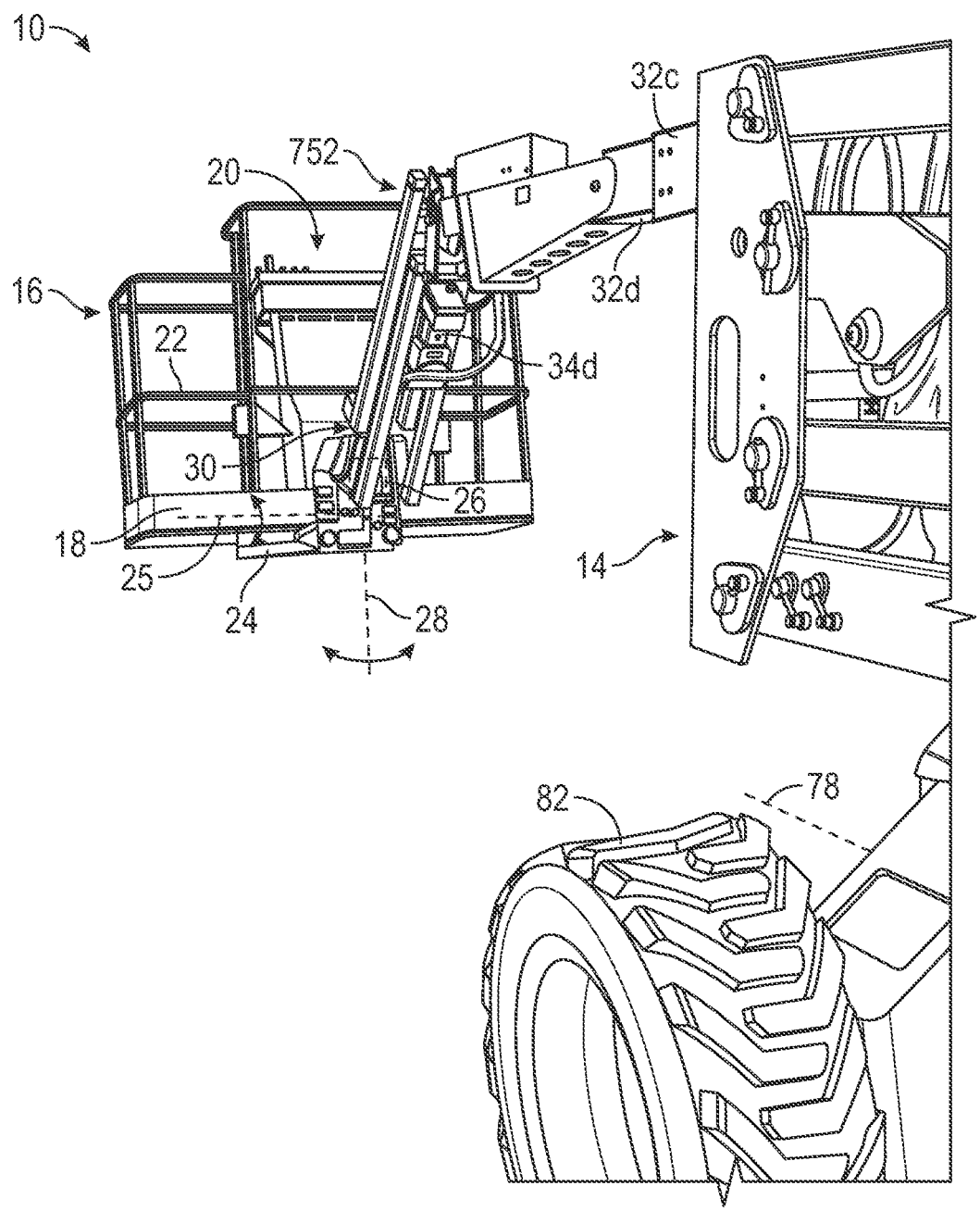
FIG. 17 is a perspective view of a lift assembly of the fully electric boom of FIG. 1, according to an exemplary embodiment.
Figure 18:
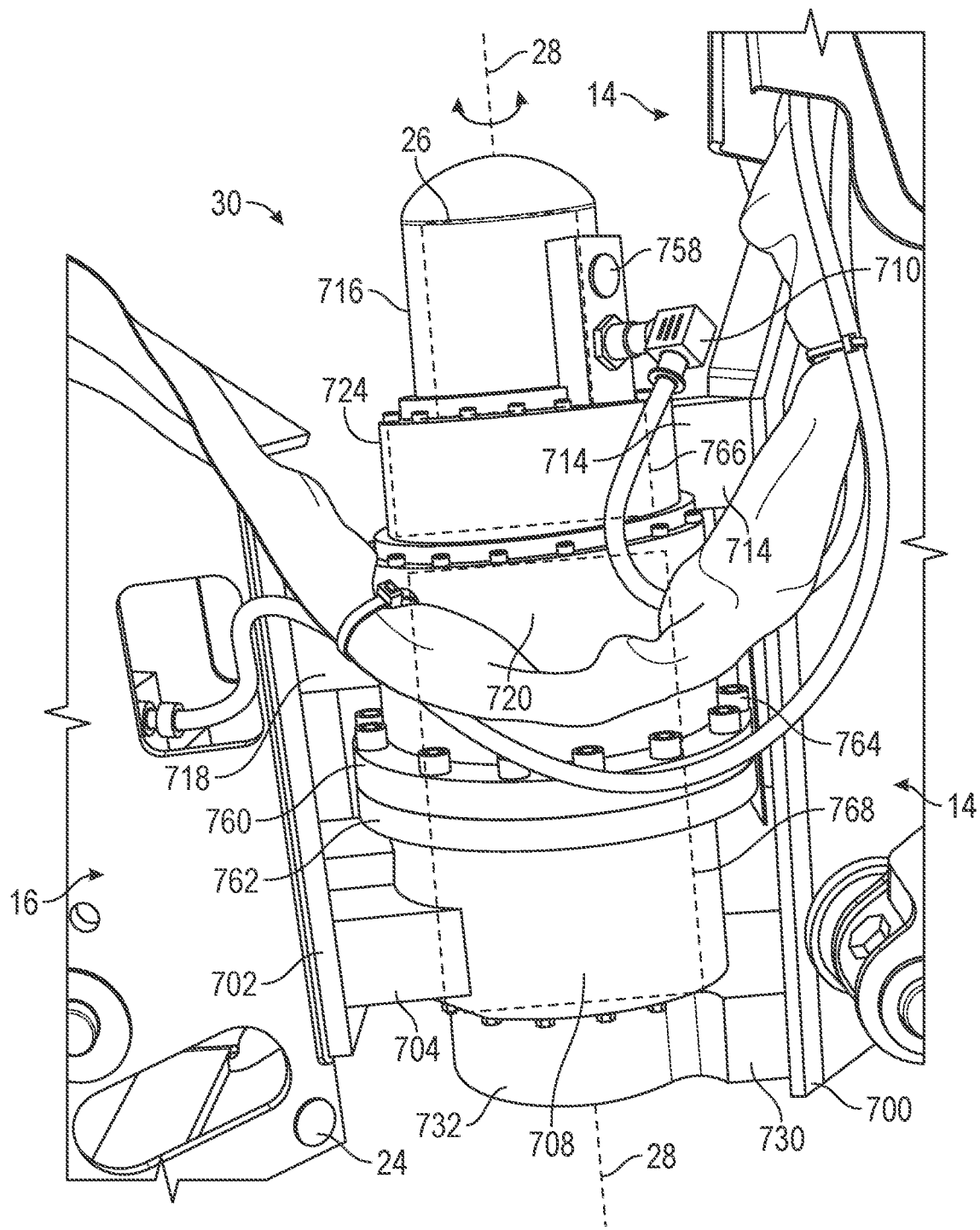
FIG. 18 is a perspective view of a platform rotator of the fully electric boom of FIG. 1, according to an exemplary embodiment.
Figure 19:
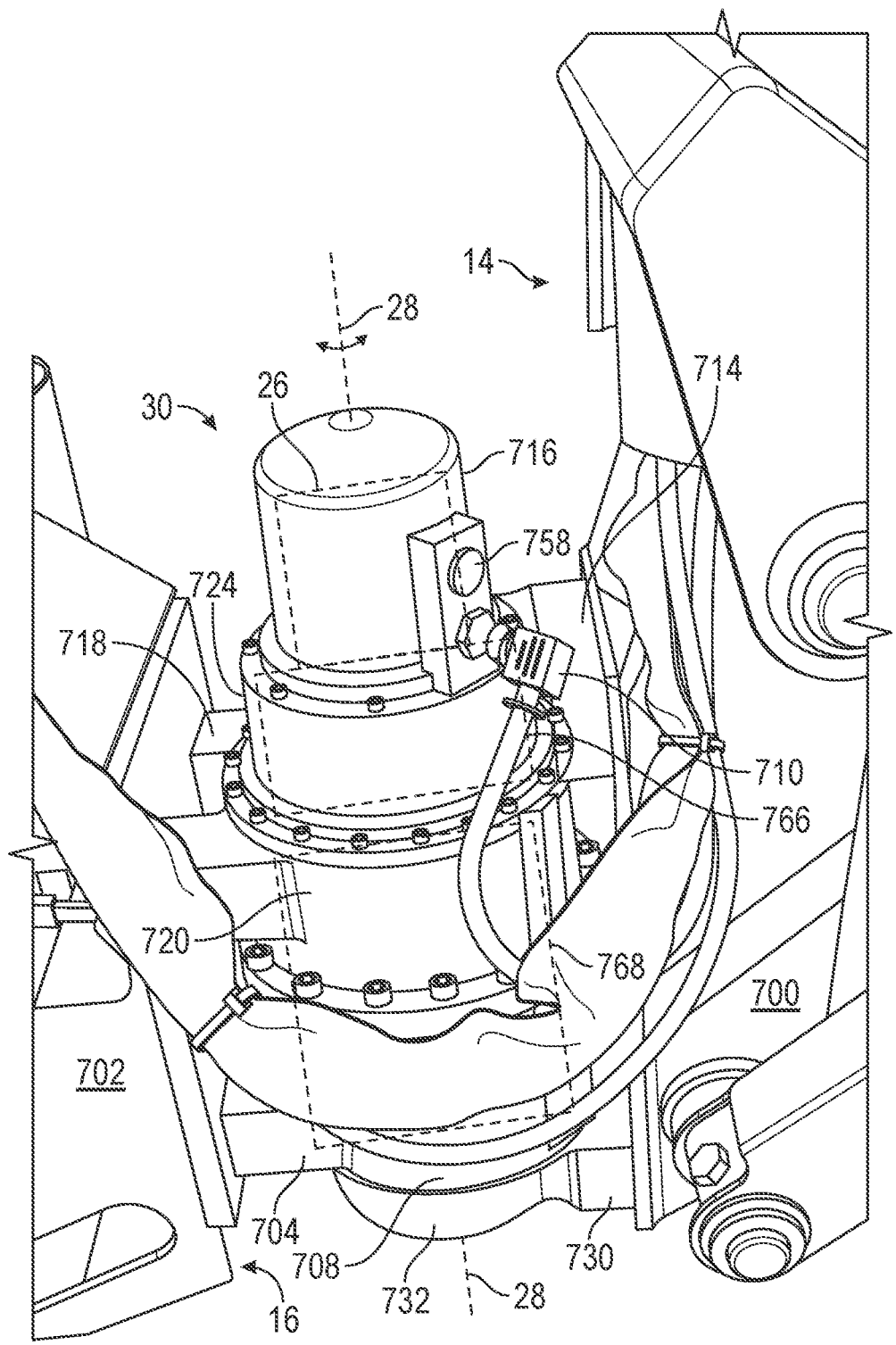
FIG. 19 is a perspective view of the platform rotator of FIG. 18.
Figure 20:
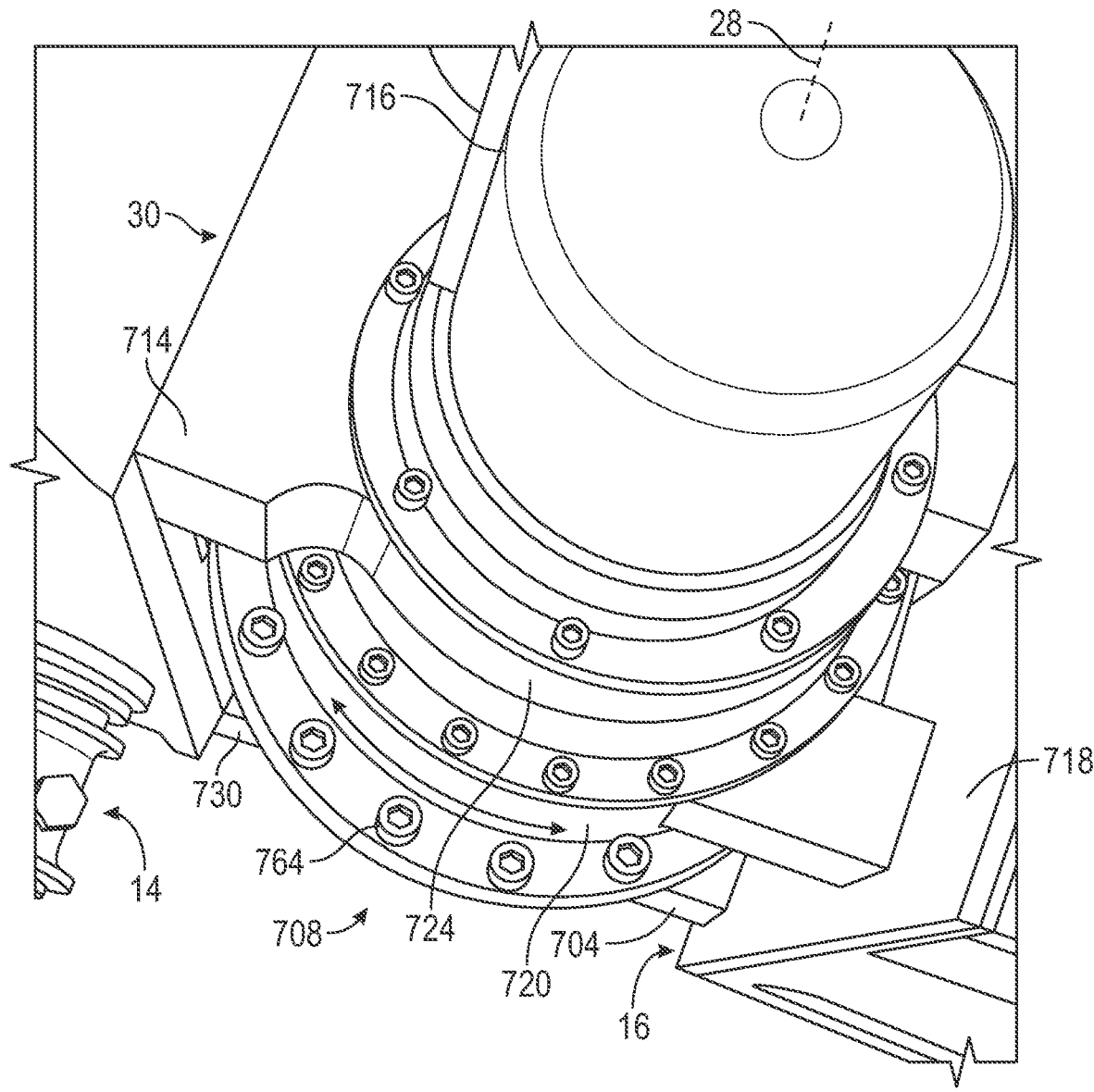
FIG. 20 is a perspective view of the platform rotator of FIG. 18.
Figure 21:
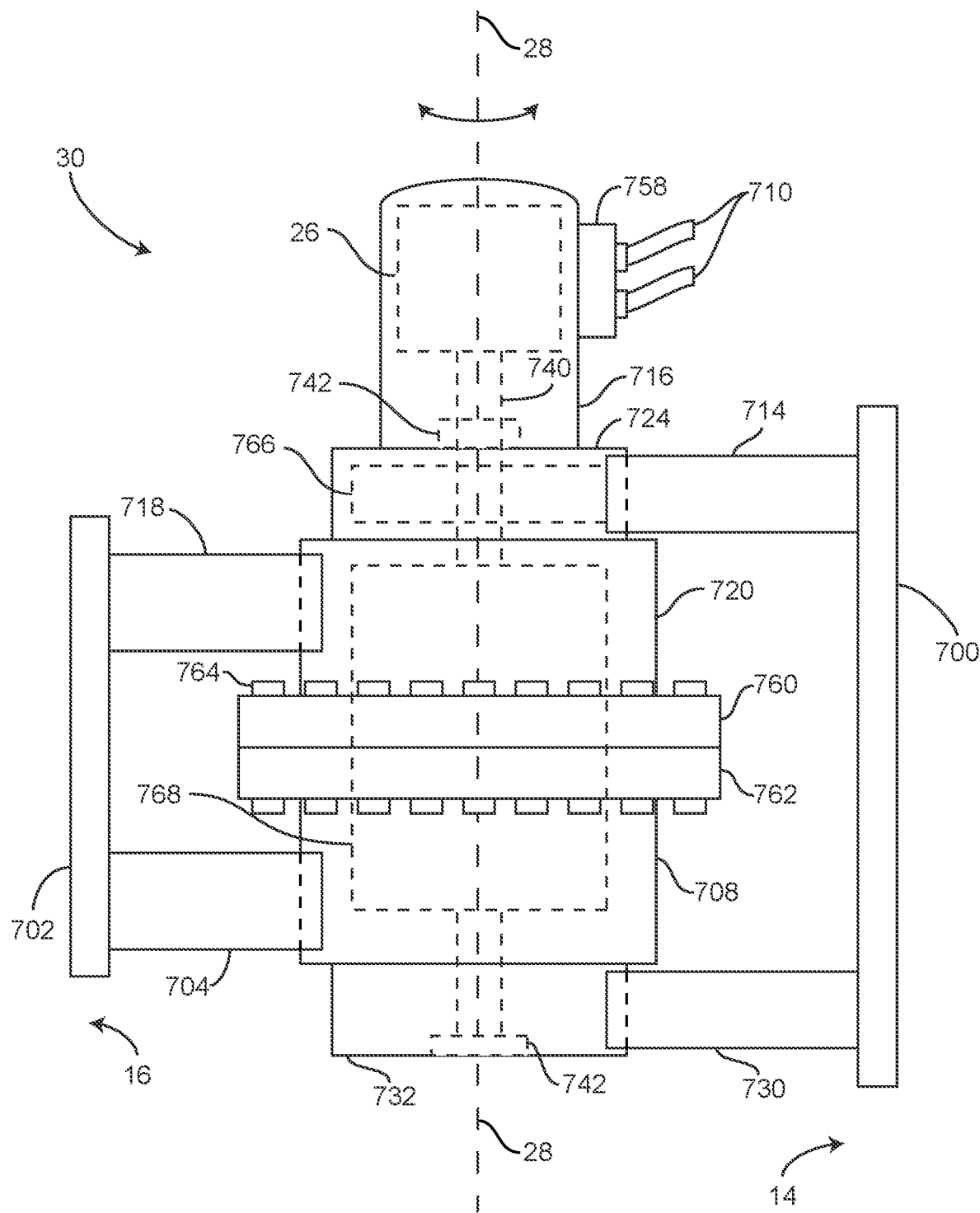
FIG. 21 is a side view of the platform rotator of FIG. 18.

Referring now to FIG. 17, upper lift arm 32c (e.g., the jib arm) can be a telescoping arm that receives intermediate lift arm 32d therewithin. Intermediate lift arm 32d is configured to extend or retract relative to upper lift arm 32c to increase or decrease an overall length of the jib arm.

Intermediate lift arm 32d can be pivotally coupled with a four bar linkage, a member, a bar, etc., shown as support assembly 754. Support assembly 754 is pivotally coupled with intermediate lift arm 32d at a first end and supports platform assembly 16 at an opposite end. Support assembly 754 of lift assembly 14 can be configured to rotate platform assembly 16 about axis 25. Support assembly 754 can be coupled with platform assembly 16 through platform rotator 30. Platform rotator 30 is configured to pivot/rotate platform assembly 16 about axis 25. Support assembly 754 can be driven by electric actuator 34d to pivot/rotate platform assembly 16 about axis 25.

Referring now to FIGS. 18-21, platform rotator 30 is configured to couple with a support member 702 of platform assembly 16, and a support member 700 of lift assembly 14. Platform rotator 30 is configured to rotate support member 702 (and therefore platform assembly 16) about axis 28 relative to support member 700 of lift assembly 14. Support member 702 can be a portion of frame 24. In other embodiments, support member 702 is integrally formed or removably coupled (e.g., with fasteners) with frame 24 of platform assembly 16. Support member 700 can be an end portion of support assembly 754 or an end member of the jib arm.

A support member, protrusion, structural support member, support portion, etc., shown as structural member 704 extends from support member 702 of platform assembly 16. Structural member 704 is coupled with a housing portion, barrel, casing, cylinder, shell, structural member, etc., shown as housing member 708. Housing member 708 can function as both a housing member that encloses internal components of platform rotator 30 (e.g., gears, shafts, bearings, etc.) and also provides structural support to pivotally couple platform assembly 16 with lift assembly 14. Housing member 708 can be a tubular member. Housing member 708 may be integrally formed with structural member 704. Structural member 704 couples (e.g., fixedly) housing member 708 with support member 702 of platform assembly 16.

Another support member, protrusion, member, structural support member, support portion, coupling member, etc., shown as structural member 718 extends from support member 702 of platform assembly 16. Structural member 718 is coupled with a housing portion, barrel, casing, cylinder, shell, structural member, tubular member, etc., shown as housing member 720. Structural member 718 may be the same as or symmetric to structural member 704. Likewise, housing member 720 may be the same as or symmetric to housing member 708. Housing member 720 can be integrally formed with structural member 718. Structural member 704 may extend from a lower portion of support member 702, while structural member 718 extends from an upper portion of support member 702.

Housing member 720 and housing member 708 can include an inner volume, a space, etc., therewithin for containing internal components (e.g., gears, bearings, shafts, etc.) of platform rotator 30. Housing member 720 and housing member 708 can be removably coupled with each other to define an inner volume therewithin. Housing member 720 and housing member 708 can include a rim, ledge, protrusion, periphery, annular protrusion, etc., shown as annular member 760 and annular member 762. Annular member 760 can be integrally formed with housing member 720. Likewise, annular member 762 can be integrally formed with housing member 708. Annular member 762 and annular member 760 can extend along an entire perimeter of housing member 708 and housing member 720, respectively.

Housing member 720 and housing member 708 can couple with each other at annular member 760 and annular member 762. Annular member 760 and annular member 762 can include corresponding apertures, holes, bores, openings, etc., that extend along an entire perimeter of annular member 760 and annular member 762. The apertures can be spaced apart along the perimeter of annular member 760 and annular member 762. The apertures of annular member 760 and the apertures of annular member 762 can be aligned with each other and receive fasteners 764 therethrough. In this way, housing member 720 and housing member 708 can be removably coupled by fasteners 764.

A support member, protrusion, structural support member, support portion, coupling member, etc., shown as structural member 714 extends from support member 700 of lift assembly 14. Structural member 714 can be integrally formed with support member 700 of lift assembly 14. In other embodiments, structural member 714 is removably coupled with support member 700 of lift assembly 14. Structural member 714 can extend from an upper portion of support member 700.

Structural member 714 is coupled with a housing portion, barrel, casing, cylinder, shell, structural member, tubular member, etc., shown as upper support member 724. Upper support member 724 can be integrally formed with structural member 714. Upper support member 724 can have a generally circular outer periphery or a generally cylindrical shape. A bottom surface of upper support member 724 can slidably couple with an upper/top surface of housing member 720. Upper support member 724 and housing member 720 are configured to pivot/rotate relative to each other about axis 28. Upper support member 724 and housing member 720 may be co-axial with each other about axis 28.

Upper support member 724 can define an inner volume, an inner space, an inner area, etc., for partially or completely enclosing internal components of platform rotator 30. Upper support member 724 can be adjacent and above housing member 720. Upper support member 724 is coupled with a housing, casing, shell, etc., shown as motor housing 716. Motor housing 716 can be removably coupled with upper support member 724 (e.g., via fasteners).

Motor housing 716 includes an inner volume, inner space, inner area, etc., for containing and enclosing electric motor 26. Motor housing 716 can function as both a housing member (e.g., enclosing electric motor 26 therewithin) as well as a structural member (e.g., electric motor 26 can be fixedly coupled/mounted to an inner wall of motor housing 716).

A support member, protrusion, structural support member, support portion, coupling member, etc., shown as structural member 730 extends from support member 700 of lift assembly 14. Structural member 730 can be integrally formed with support member 700 or can be removably coupled with support member 700 (e.g., with fasteners).

Structural member 730 is coupled with a housing portion, barrel, casing, cylinder, shell, structural member, tubular member, etc., shown as bottom support member 732. Bottom support member 732 can be a structural support member that is adjacent (e.g., below) housing member 708 and provides structural support to housing member 708. Bottom support member 732 can slidably interface with housing member 708. Bottom support member 732, housing member 708, housing member 720, and upper support member 724 may all be co-axial with each other about axis 28.

Housing member 720 and housing member 708 can be supported therebetween upper support member 724 and bottom support member 732. Housing member 720 and housing member 708 are configured to pivot/rotate together about axis 28 relative to upper support member 724 and bottom support member 732.

Motor housing 716 includes a connecting portion, a port, an electrical connecting portion, etc., shown as connector 758. Connector 758 is configured to couple with an electrical wire, a hardness, a cord, etc., shown as electrical cord 710. Electrical cord 710 can be coupled with connector 758 and provide electrical power to electric motor 26 therewithin motor housing 716. Electrical cord 710 can also provide electrical power to brake 766. Electrical cord 710 also facilitates communicable connection between electric motor 26, brake 766, and controller 38.

Electric motor 26 is configured to receive electrical energy through electrical cord 710 from batteries 64. Electric motor 26 can be a rotary actuator, a stepper motor, a reversible motor, etc. Electric motor 26 is configured to drive housing members 720 and 708 to pivot/rotate about axis 28 relative to upper support member 724 and lower support member 732, thereby rotating/pivoting platform assembly 16 about axis 28. Electric motor 26 drives a shaft, shown as output driveshaft 740. Output driveshaft 740 can be rotatably coupled with inner races of one or more bearings 742. Bearings 742 can be any ball bearings, roller bearings, etc. Bearings 742 can be disposed at any location along output driveshaft 740. For example, one of bearings 742 can be mounted in a bore, hole, aperture, opening, etc., of lower support member 732. Another one of bearings 742 can be mounted in a bore, hole, aperture, opening, etc., of upper support member 724. Likewise, another bearing 742 can be mounted in an aperture, bore, hole, opening, etc., of motor housing 716.

Platform rotator 30 can include a brake 766. Brake 766 is configured to transition between an activated state and a de-activated state. When brake 766 is in the activated state, platform assembly 16 is restricted from pivoting about axis 28 relative to lift assembly 14. For example, brake 766 can transition into the activated state to facilitate preventing relative rotation/pivoting between housing members 720 and 708, and upper/lower support members 724 and 732. Brake 766 can be any of an electro-magnetic brake, a frictional brake, etc. Brake 766 can be configured to facilitate restricting rotation of output driveshaft 740 of electric motor 26. For example, brake 766 can receive electrical power from batteries 64 and control signals from controller 38 and use the electrical power received from batteries 64 to transition between the activated and the deactivated state. Brake 766 can transition between the activated state and the deactivated state in response to receiving control signals from controller 38.

Brake 766 can be mounted within an inner volume of any of motor housing 716, upper support member 724, housing member 720, housing member 708, lower support member 732, etc. Brake 766 is an electrical brake that uses electrical energy/power from batteries 64 to transition between the activated state and the deactivated state.

Electric motor 26 can provide rotational kinetic energy to pivot/rotate platform assembly 16 relative to lift assembly 14 through output driveshaft 740. Platform rotator 30 can include internal gearing, shown as gear box 768. Gear box 768 can be a reduction gearbox. For example, gear box 768 can receive an input torque $T_1$ at an angular velocity $\omega_1$ and output a torque $T_2$ at an angular velocity $\omega_2$ where $T_2 > T_1$ and $\omega_2 < \omega_1$. Output driveshaft 740 can be co-axial with axis 28. In other embodiments, output driveshaft 740 is offset from axis 28. Gear box 768 can provide the torque $T_2$ about axis 28 to any of housing member 708, housing member 720, structural member 718, structural member 704, etc., to drive platform assembly 16 to pivot about axis 28 relative to lift assembly 14. In some embodiments, gear box 768 provides the torque $T_2$ to a gearbox driveshaft that drives any of housing member 720, housing member 708, structural member 718, structural member 704, etc., to pivot about axis 28 relative to upper support member 724, lower support member 732, etc.

Gear box 768 can include any gearing configuration/shafts to increase the torque provided from electric motor 26 before it is used to pivot platform assembly 16 relative to lift assembly 14. In some embodiments, gear box 768 includes one or more planetary gear sets. In some embodiments, multiple planetary gear sets are used in gear box 768 with the output of one planetary gear set being provided as the input to another planetary gear set. Gear box 768 can be disposed within the inner volume formed by housing member 720 and housing member 708. In other embodiments, gear box 768 is at least partially disposed within motor housing 716.

In other embodiments, multiple gear boxes 768 are used. For example, a first gear box can be disposed within motor housing 716, while a second gear box is disposed within housing member 720 and housing member 708.

Brake 766 can be positioned between electric motor 26 and gear box 768. In other embodiments, brake 766 is configured to interface with any gears, shafts, etc., of gear box 768. For example, brake 766 can be configured to activate to facilitate preventing rotation/pivoting of an output shaft of gear box 768 that drives platform assembly 16 to rotate/pivot relative to lift assembly 14.

Figure 22:
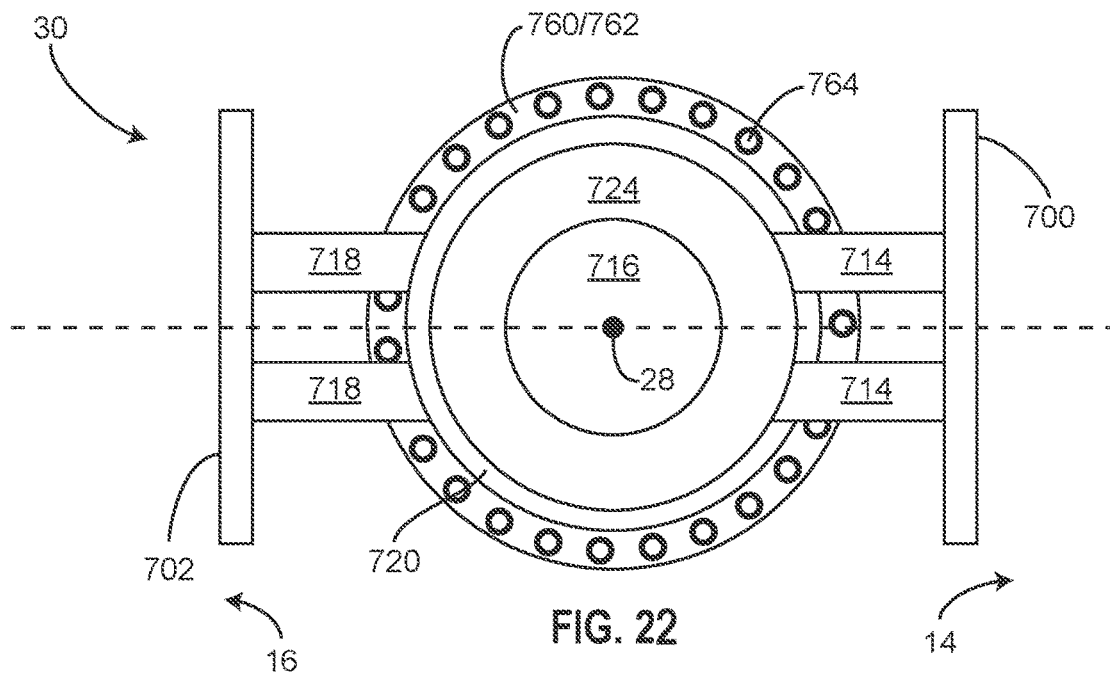
FIG. 22 is a top view of the platform rotator of FIG. 18.
Figure 23:
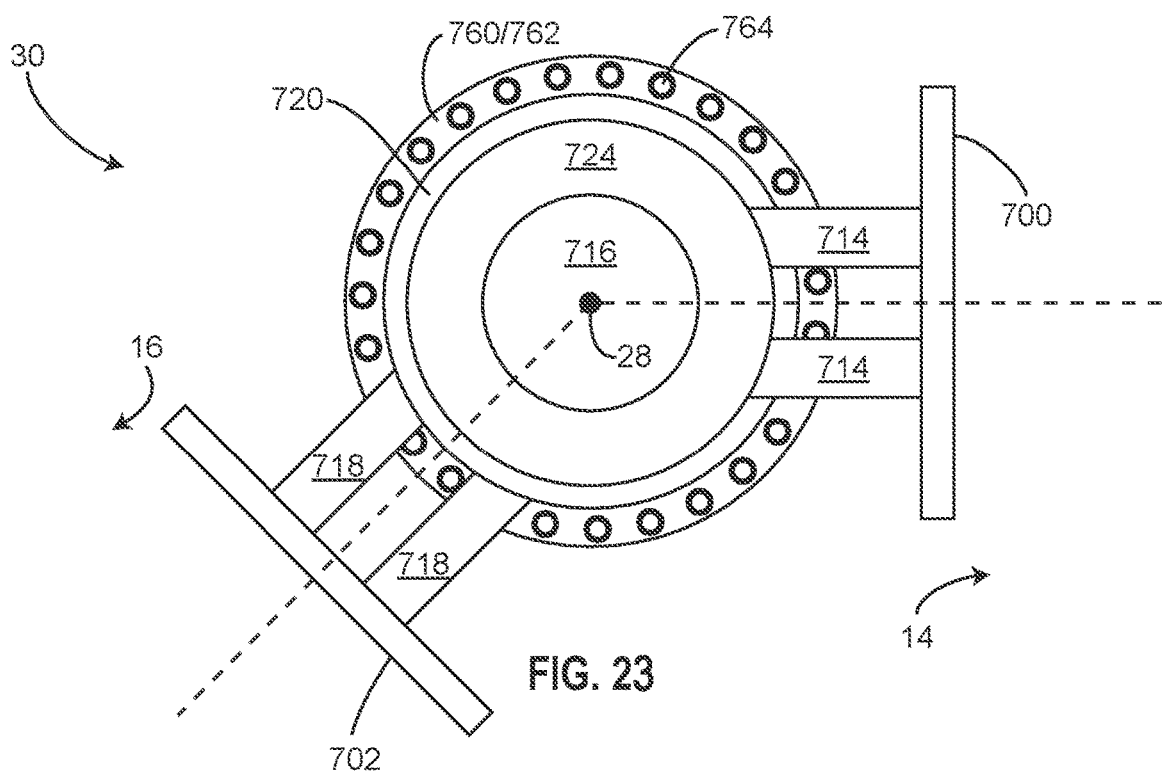
FIG. 23 is a top view of the platform rotator of FIG. 18.

Referring now to FIGS. 22 and 23, the operation of platform rotator 30 is shown in greater detail, according to an exemplary embodiment. Platform rotator 30 can operate (e.g., by operating electric motor 26) to pivot platform assembly 16 about axis 28 relative to lift assembly 14. Advantageously, platform rotator 30 is a fully-electric rotary actuator that does not require any hydraulic systems, engines, pumps, etc., to operate. Platform rotator 30 can operate using electrical power from batteries 64. Platform rotator 30 can operate in response to receiving a control signal from controller 38. Controller 38 may provide platform rotator 30 with control signals to pivot platform assembly 16 about axis 28 in either a clockwise direction or a counter-clockwise direction based on a user input received from HMI 20 and/or HMI 21. Controller 38 can provide control signals to brake 766 to lock a current angular position of platform assembly 16 relative to lift assembly 14. For example, an operator can provide a user input at HMI 20 and/or HMI 21 to rotate platform assembly 16 from the angular orientation as shown in FIG. 22 to the angular orientation as shown in FIG. 23. The operator can then provide a user input at HMI 20 and/or HMI 21 to lock the current angular position of platform assembly 16 (e.g., to lock platform rotator 30 in the angular position shown in FIG. 23).

Boom and Electric Actuators

Figure 24:
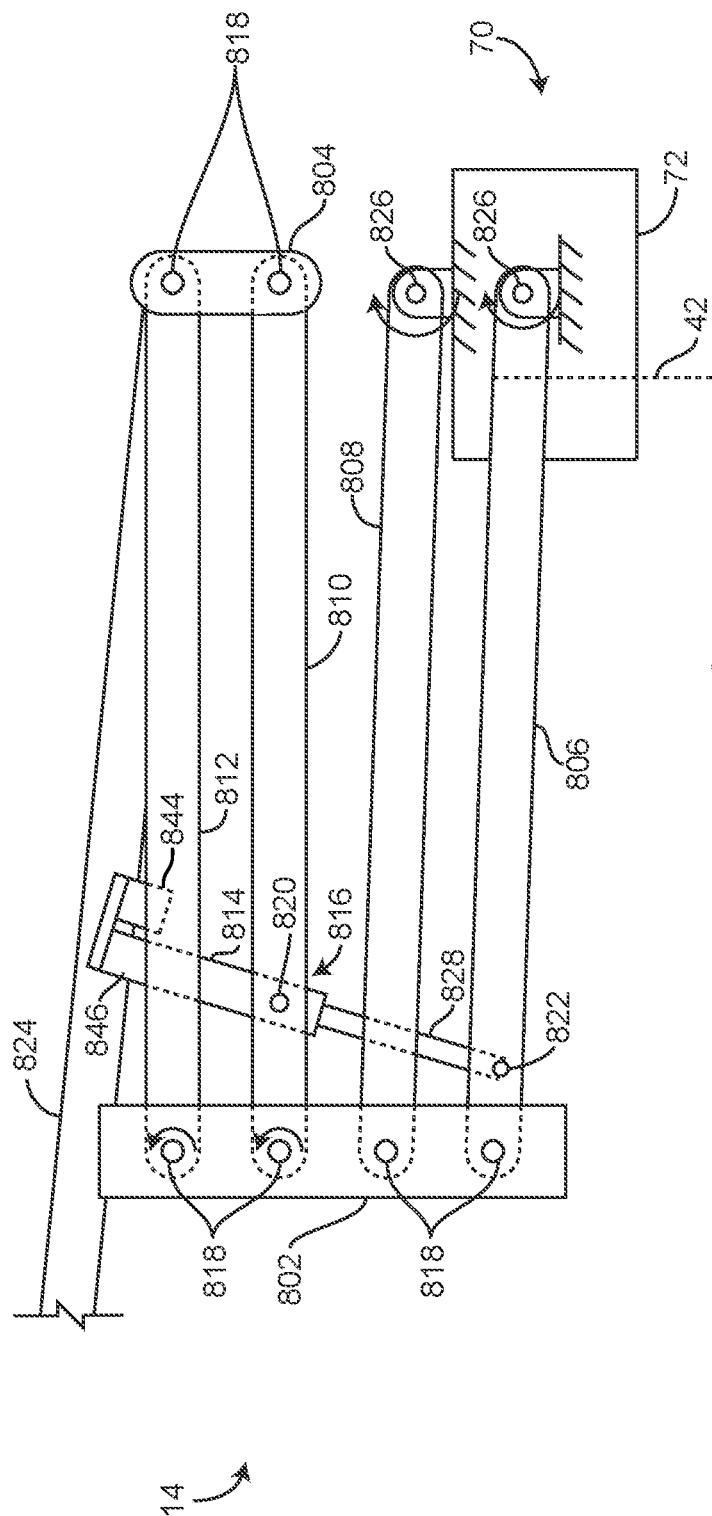
FIG. 24 is a diagram of a side view of a boom arm of the fully electric boom of FIG. 1, according to an exemplary embodiment.

Referring now to FIG. 24, a portion of lift assembly 14 is shown, according to an exemplary embodiment. The portion shown in FIG. 24 (excluding jib arm 824) may be referred to as "the boom" of electric boom 10. The boom of lift assembly 14 includes an upright member, a coupling member, a linkage, etc., shown as upright member 802. Upright member 802 is pivotally coupled with various members, boom arms, etc., shown as members 806-812. Lower members 806 and 808 are pivotally coupled at a lower end with turntable 70 (e.g., at turntable member 72). Lower members 806 and 808 can be substantially parallel with each other. Lower members 806 and 808 can be supported at one end by turntable member 72 and are pivotally coupled with turntable member 72. Lower members 806 and 808 can be pivotally coupled with turntable member 72 at pins 826 and are configured to rotate about pins 826. Lower member 806 and 808 are pivotally coupled with upright member 802 at an upper end with pins 818.

Upper members 810 and 812 can also be substantially parallel to each other. Upper members 810 and 812 are each pivotally coupled at a first end (e.g., a lower end) to upright member 802 with pins 818. Upper members 810 and 812 are each pivotally coupled with upright member 804 (e.g., a connecting portion, a coupling bar, etc.) at an opposite end (e.g., an upper end) with pins 818.

Lift assembly 14 includes an electric linear actuator, shown as electric actuator 814. Electric actuator 814 is configured to receive electrical energy from batteries 64 and extend or retract to raise and lower lift assembly 14. Electric actuator 814 is configured to pivotally couple at a bottom end with one of lower members 806 and 808. In FIG. 24, electric actuator 814 is shown pivotally coupling with lower member 806 with pin 822. In other embodiments, electric actuator 814 is pivotally coupled at the bottom end with lower member 808. Electric actuator 814 includes an outer cylinder 846 and an inner cylinder 828 (e.g., a rod, an inner member, etc.). Inner cylinder 828 is configured to extend/retract (e.g., linearly translate) relative to outer cylinder 846. Outer cylinder 846 can receive inner cylinder 828 therewithin. Pivotally coupling electric actuator 814 with lower member 806 facilitates using an electric actuator with a longer stroke length.

Electric actuator 814 is pivotally coupled with upper member 810 by trunnion mount 816. In other embodiments, electric actuator 814 is pivotally coupled with upper member 812 using a trunnion mount similar to trunnion mount 816. Electric actuator 814 extends beyond trunnion mount 816. Advantageously, using trunnion mount 816 facilitates using an electric actuator with a longer extendable range. For example, trunnion mount 816 facilitates additional length of electric actuator 814 extending beyond trunnion mount 816. The additional length corresponds to a longer range of extension/retraction (e.g., a greater stroke length), thereby facilitating a larger range over which upright member 804 can be raised/lowered.

Electric actuator 814 can be extended to rotate upper members 810 and 812 about pins 818 at upright member 802. Extending electric actuator 814 drives upper members 810 and 812 to rotate in a counter clockwise direction about pins 818 at upright member 802, thereby raising upright member 804. A member, an arm, a jib, an elongated member, etc., shown as jib arm 824 is coupled with upright member 804. Therefore, as electric actuator 814 extends, jib arm 824 is raised with upright member 804. Likewise, retracting electric actuator 814 drives upper member 810 and 812 to rotate in a clockwise direction about pins 818 at upright member 802, thereby lowering upright member 804. Jib arm 824 can be the same as or similar to upper lift arm 32c. Jib arm 824 can be pivotally or rotatably coupled with upright member 804.

Lower members 806 and 808 are configured to pivot about pins 826 to raise and lower upright member 802. Lower members 806 and 808 rotate about pins 826 in a clockwise direction to raise upright member 802. Likewise, lower members 806 and 808 rotate in a counter clockwise direction to lower upright member 802. A mechanical stop can be used at pins 826 to restrict lower members 806 and 808 from rotating beyond a particular angular position in the clockwise direction. For example, lower members 806 and 808 may be prevented from rotating about pins 826 below a horizontal axis by the mechanical stop.

Lower members 806 and 808 can be driven to rotate about pins 826 in either direction due to the extension and retraction of electric actuator 814. In other embodiments, an electric actuator similar to electric actuator 814 (e.g., a linear electric actuator) is pivotally coupled with one of lower members 806 and 808 and is pivotally coupled with turntable 70. The electric actuator can then be driven to extend and retract to rotate lower members 806 and 808 about pins 826 in a clockwise and a counter clockwise direction, respectively. The electric actuator can be mounted to one of lower members 806 and 808 using a trunnion mount similar to trunnion mount 816.

Any of members 806-812 can include multiple members spaced a distance apart. Electric actuator 814 can extend therebetween the multiple members. Upper members 810 and 812, upright member 802, and upright member 804 form a four-bar linkage, with upper members 810 and 812 being pivotally coupled with upright member 802 and upright member 804 at their ends. Likewise, lower members 806 and 808, upright member 802, and turntable 70 form a four bar linkage, with lower members 806 and 808 being pivotally coupled with upright member 802 and turntable 70 at their ends.

Figure 25:
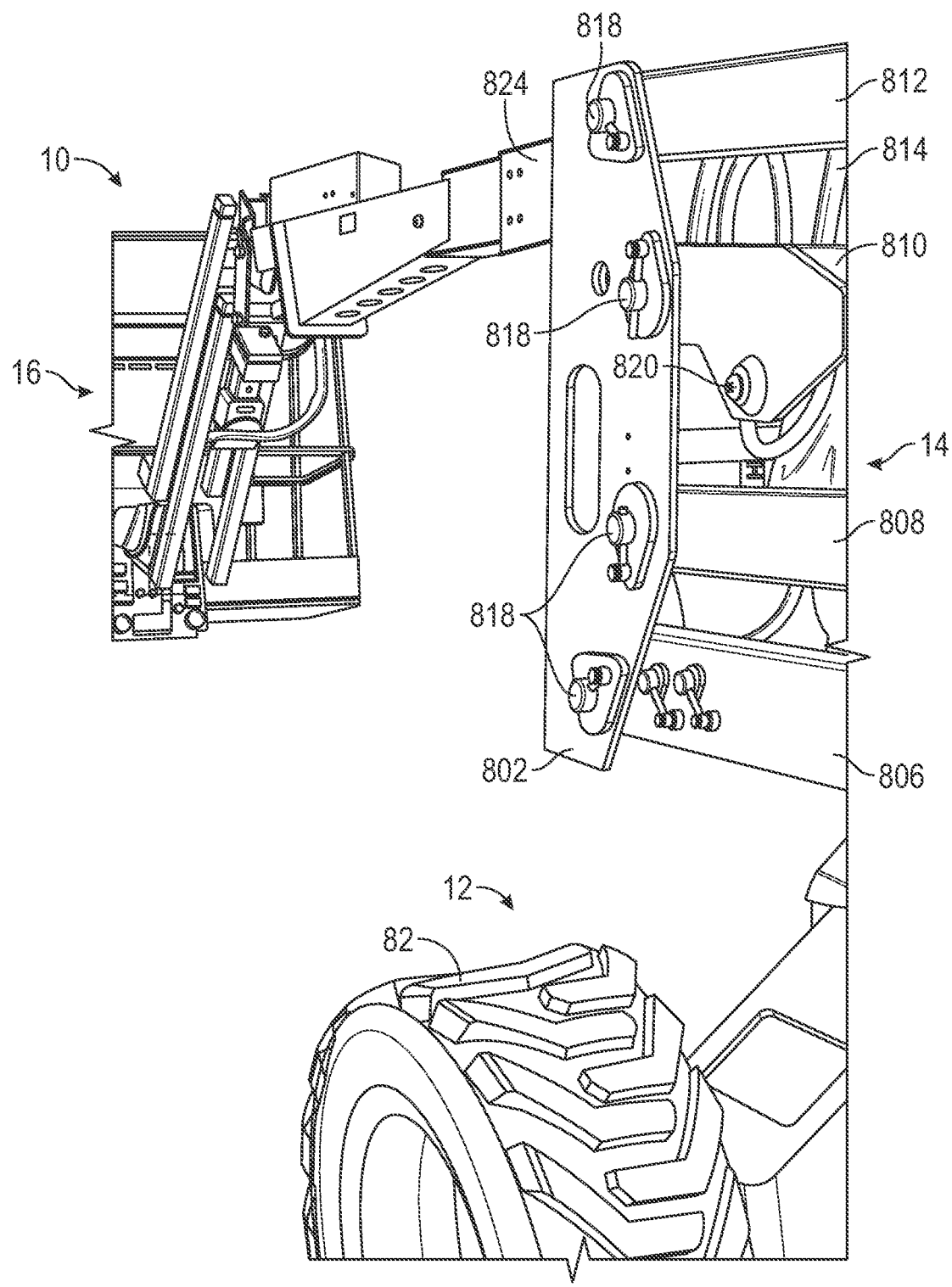
FIG. 25 is a perspective view of the boom arm of the fully electric boom of FIG. 1, according to an exemplary embodiment.
Figure 26:
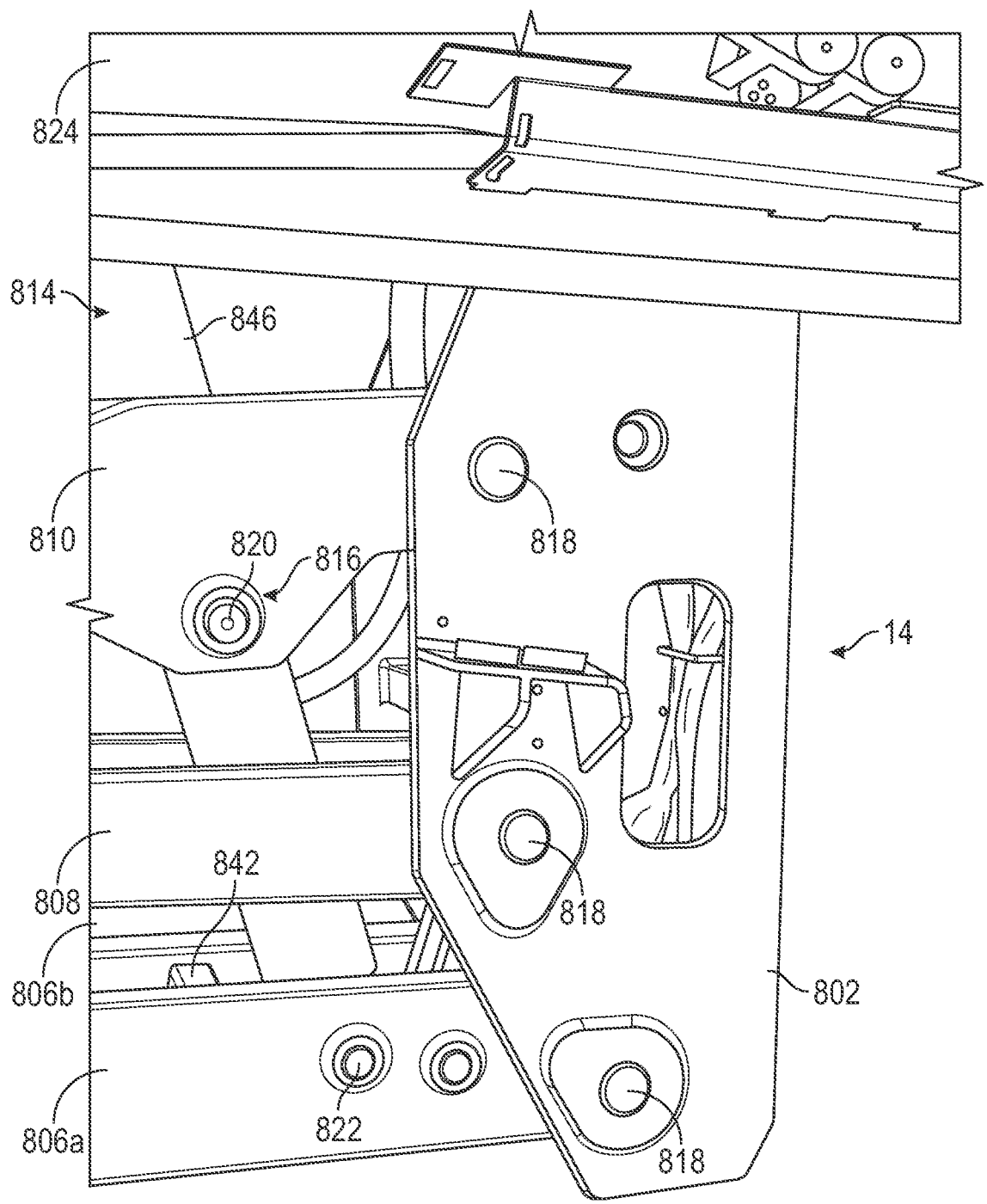
FIG. 26 is a perspective view of a portion of the boom arm of the fully electric boom of FIG. 1, according to an exemplary embodiment.
Figure 27:
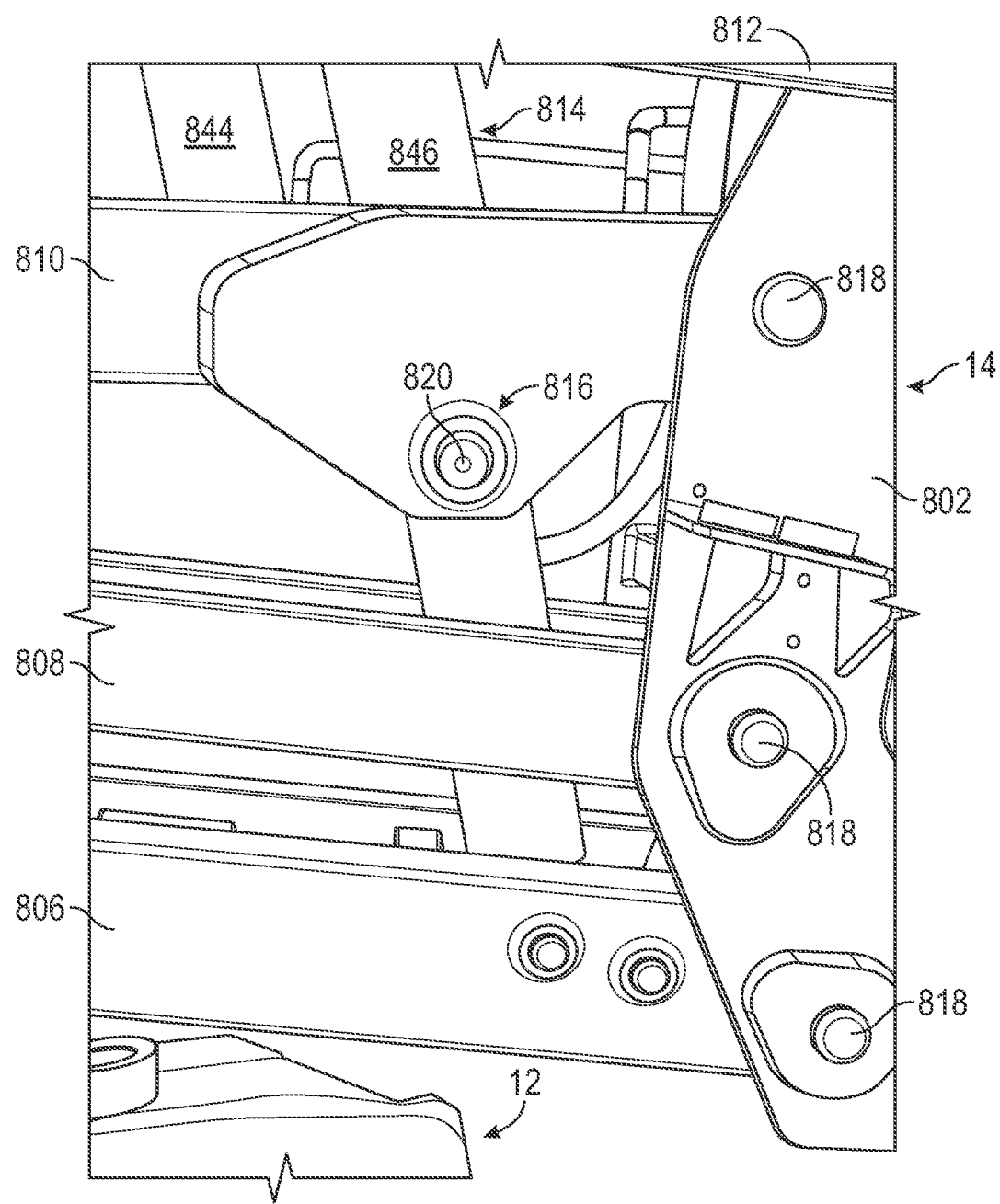
FIG. 27 is a perspective view of a portion of the boom arm of the fully electric boom of FIG. 1, according to an exemplary embodiment.
Figure 28:
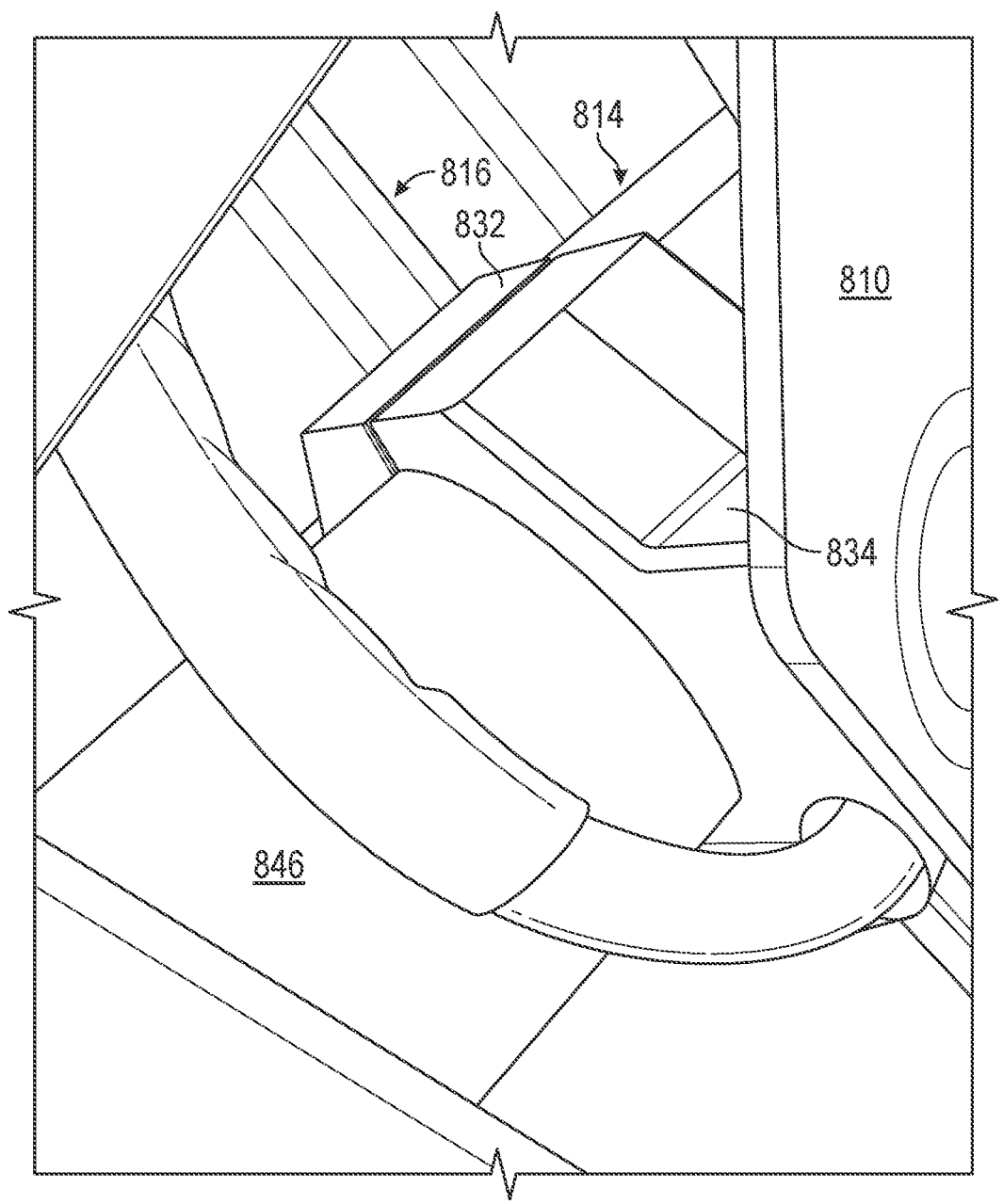
FIG. 28 is a perspective view of a trunnion mount of an electric linear actuator of the boom arm of FIG. 24, according to an exemplary embodiment.
Figure 29:
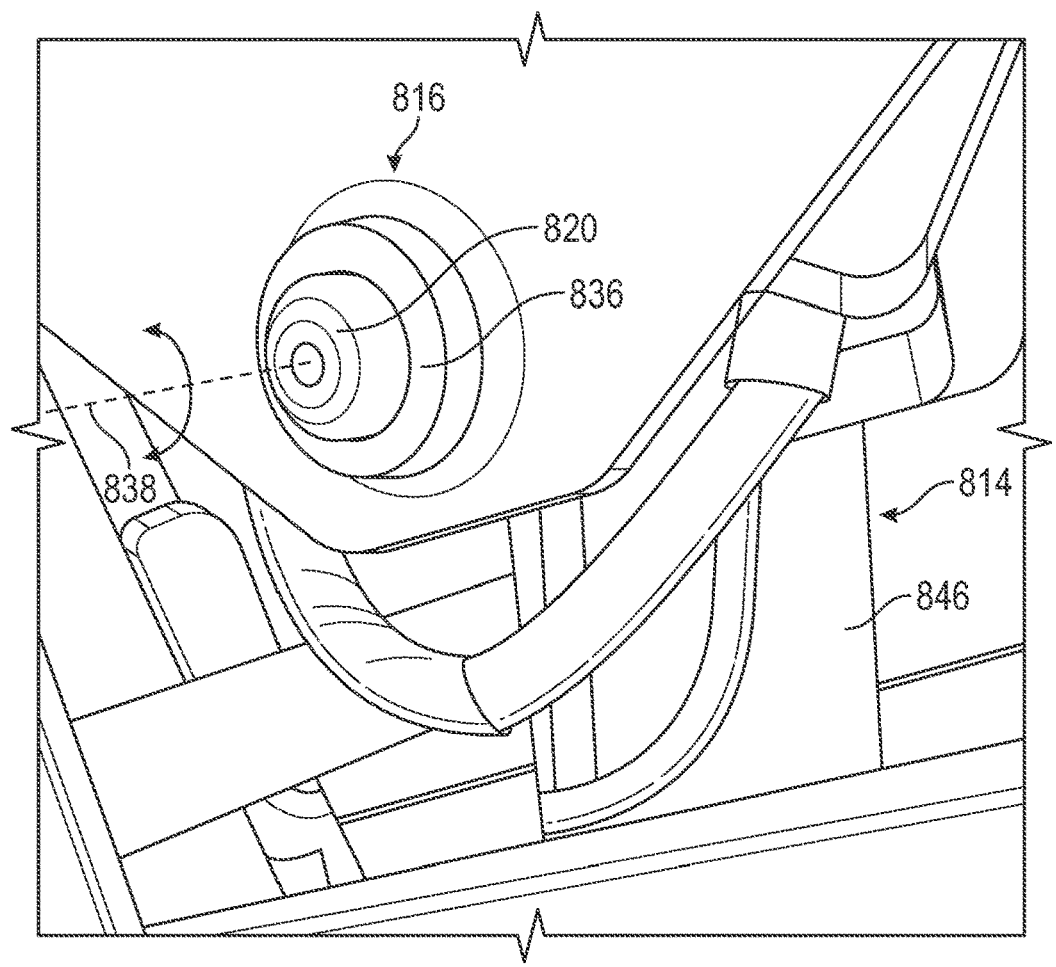
FIG. 29 is a perspective view of a trunnion mount of an electric linear actuator of the boom arm of FIG. 24, according to an exemplary embodiment.
Figure 30:
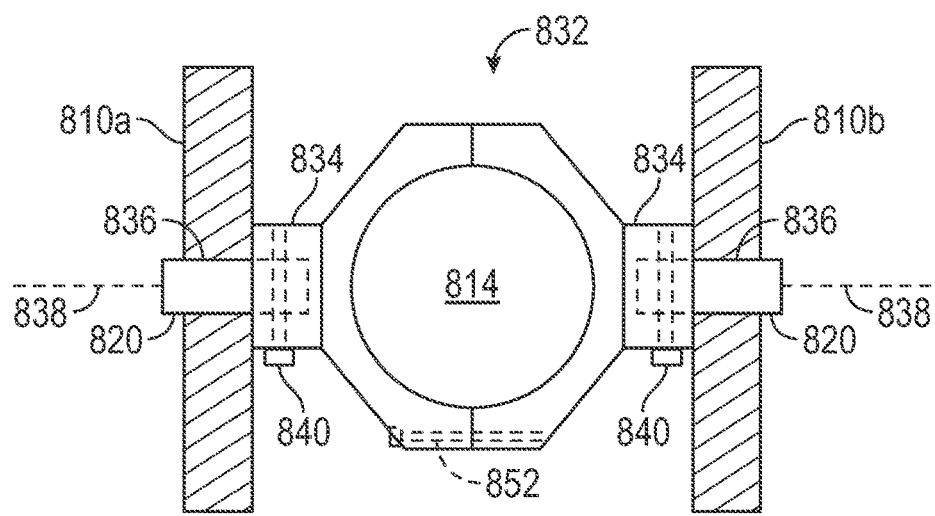
FIG. 30 is a sectional view of the trunnion mount of the electric linear actuator of FIGS. 26-29, according to an exemplary embodiment.
Figure 31:
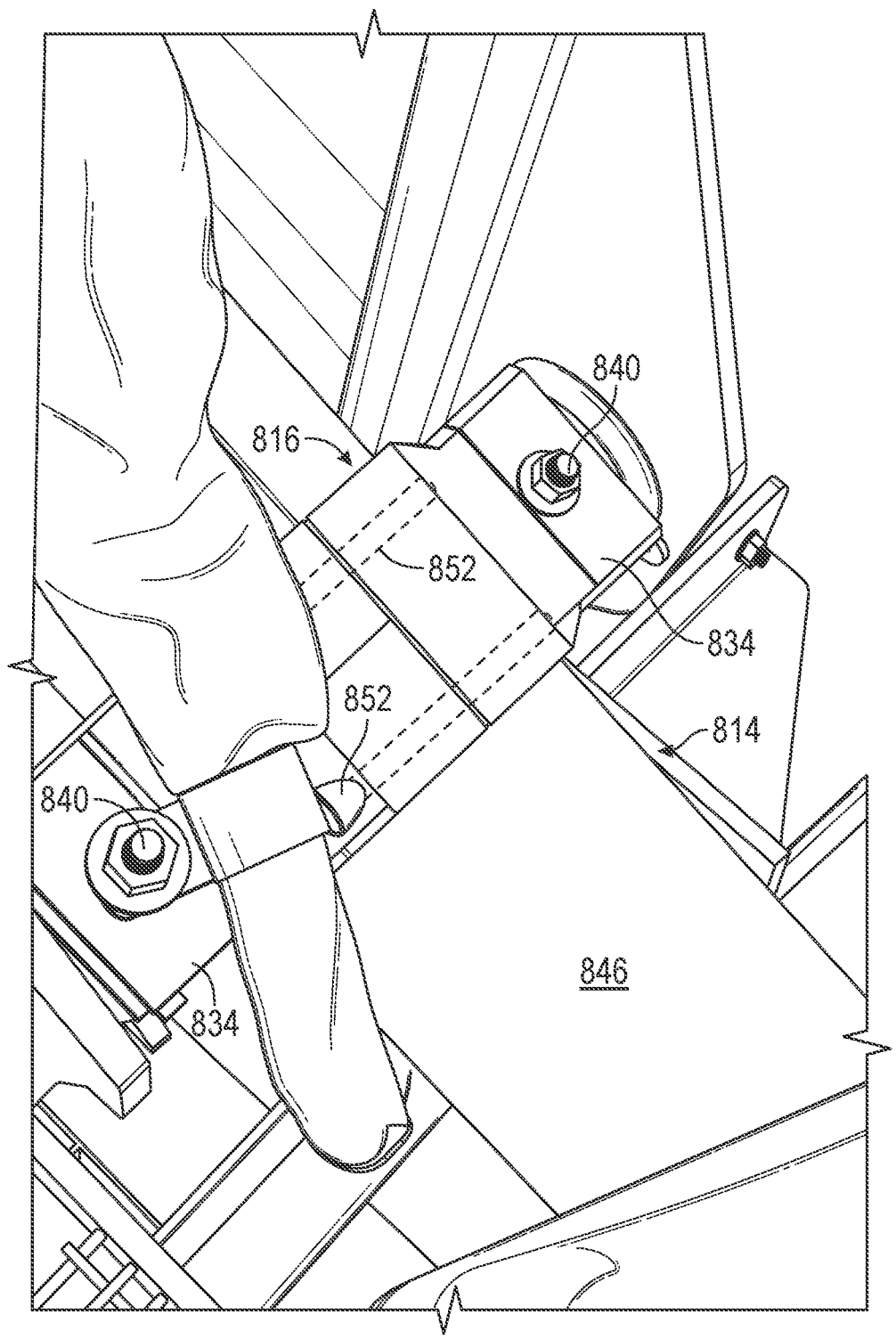
FIG. 31 is a perspective view of the trunnion mount of FIG. 29.

Referring now to FIGS. 25-27, the boom of lift assembly 14 is shown in greater detail, according to an exemplary embodiment. Each of members 806-812 includes a pair of parallel bars, beams, members, etc., spaced a distance apart. For example, lower member 806 includes lower member 806a and lower member 806b. Lower member 806a and lower member 806b are parallel to each other and are spaced a distance apart. Lower member 806 includes support beams, structural members, etc., shown as cross members 842. Cross members 842 extend between lower member 806a and 806b and provide structural support between lower member 806a and lower member 806b. Cross members 842 can be spaced a distance apart along substantially an entire overall length of lower member 806. Cross members 842, lower member 806a and lower member 806b can all be integrally formed with each other (or welded, or fastened, etc.). Each of members 806-812 can be constructed similarly to lower member 806.

Referring now to FIGS. 28-31, trunnion mount 816 includes a collar, band, connector, etc., shown as collar 832. Collar 832 surrounds substantially an entire outer surface, periphery, etc., of electric actuator 814. Collar 832 can be clamped to the outer surface of electric actuator 814. In other embodiments, collar 832 interlocks with the outer surface of electric actuator 814, or can be frictionally interfaced with the outer surface of electric actuator 814. In some embodiments, collar 832 is a clamping collar and is clamped to electric actuator 814 with fasteners 852. Adjusting fasteners 852 increases clamping force provided by collar 832 to the outer surface of electric actuator 814.

Collar 832 can have an inner bore, hole, inner periphery, aperture, volume, etc., that receives electric actuator 814 therewithin. The aperture of collar 832 corresponds to the outer surface of outer cylinder 846. In some embodiments, collar 832 is a one-piece clamping collar that is clamped to electric actuator 814 with fasteners 852. In other embodiments, collar 832 is a two-piece clamping collar and is clamped to outer cylinder 846 with two sets of fasteners 852 (e.g., disposed at opposite sides of collar 832). The two sets of fasteners 852 can be tightened to clamp the two pieces of collar 832 to outer cylinder 846 of electric actuator 814.

Collar 832 can include protrusions 834 that extend (e.g., radially outwards) from opposite ends of collar 832. Protrusions 834 can be integrally formed with collar 832. Protrusions 834 include pins, cylinders, protrusions, etc., shown as cylindrical protrusions 820. Cylindrical protrusions 820 extend from either side of collar 832 and are configured to rotatably/pivotally couple with corresponding openings, apertures, holes, bores, etc., shown as apertures 836 of upper member 810. When collar 832 is clamped with outer cylinder 846 of electric actuator 814, electric actuator 814 can rotate/pivot about axis 838 of cylindrical protrusions 820 relative to upper member 810.

Protrusions 834 can be integrally formed with cylindrical protrusions 820. In other embodiments, protrusions 834 of collar 832 are removably coupled with cylindrical protrusions 820 with fasteners 840. Each of fasteners 840 can extend through a corresponding one of protrusions 834 and threadingly couple with a bore, aperture, hole, periphery, etc., of the corresponding protrusion 834. Fasteners 840 can extend through a corresponding hole, aperture, opening, bore, etc., of a corresponding one of cylindrical protrusions 820 to removably couple cylindrical protrusion 820 with protrusion 834.

Figure 33:
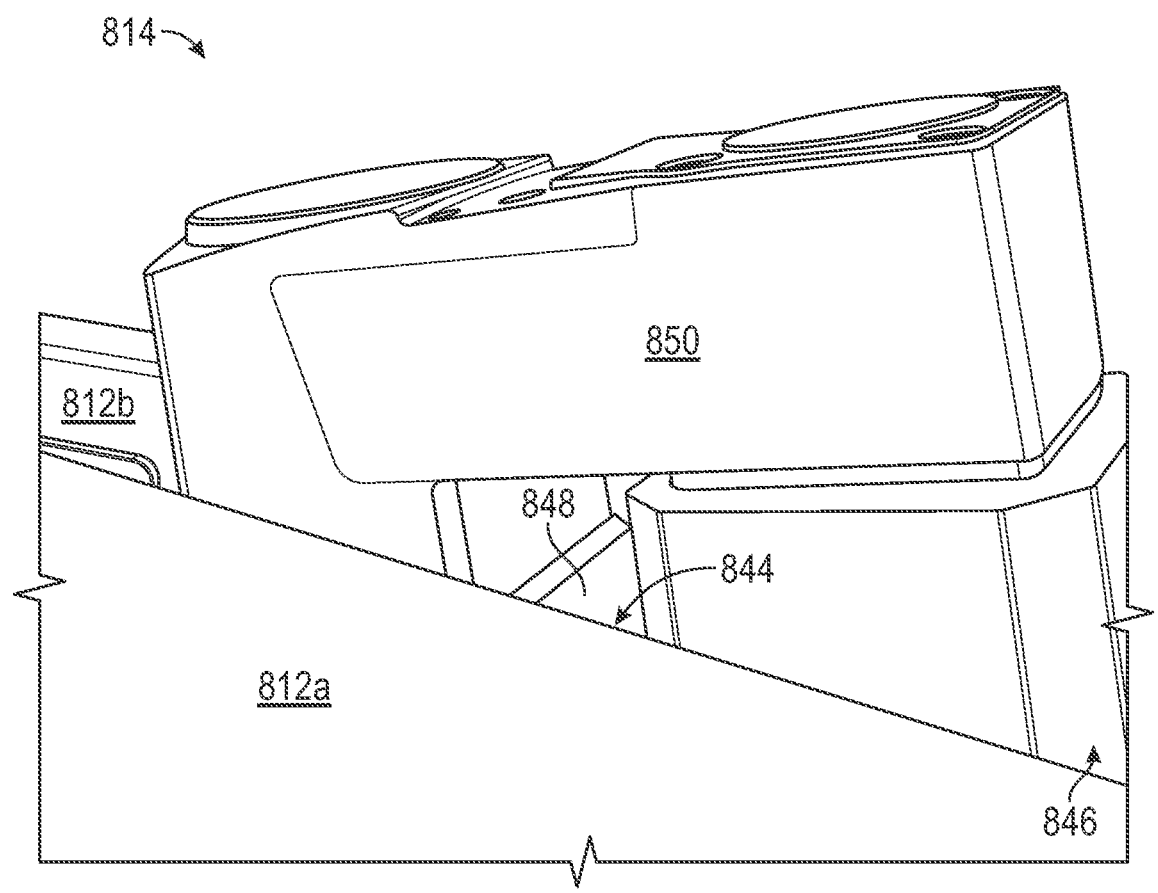
FIG. 33 is a perspective view of the electric linear actuator of FIGS. 28-29 and 31, according to an exemplary embodiment.
Figure 34:
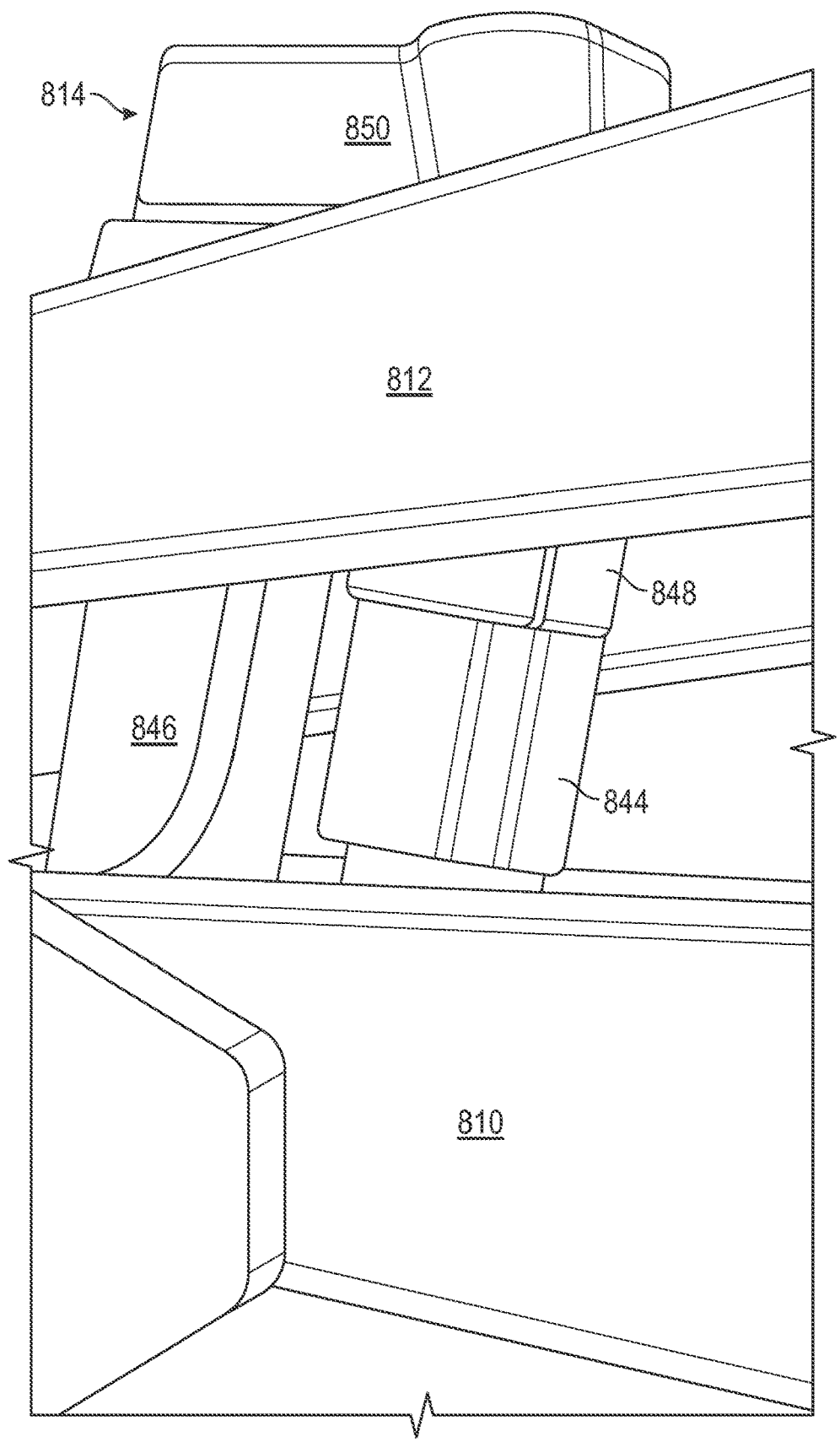
FIG. 34 is a perspective view of the electric linear actuator of FIGS. 28-29 and 31, according to an exemplary embodiment.
Figure 36:
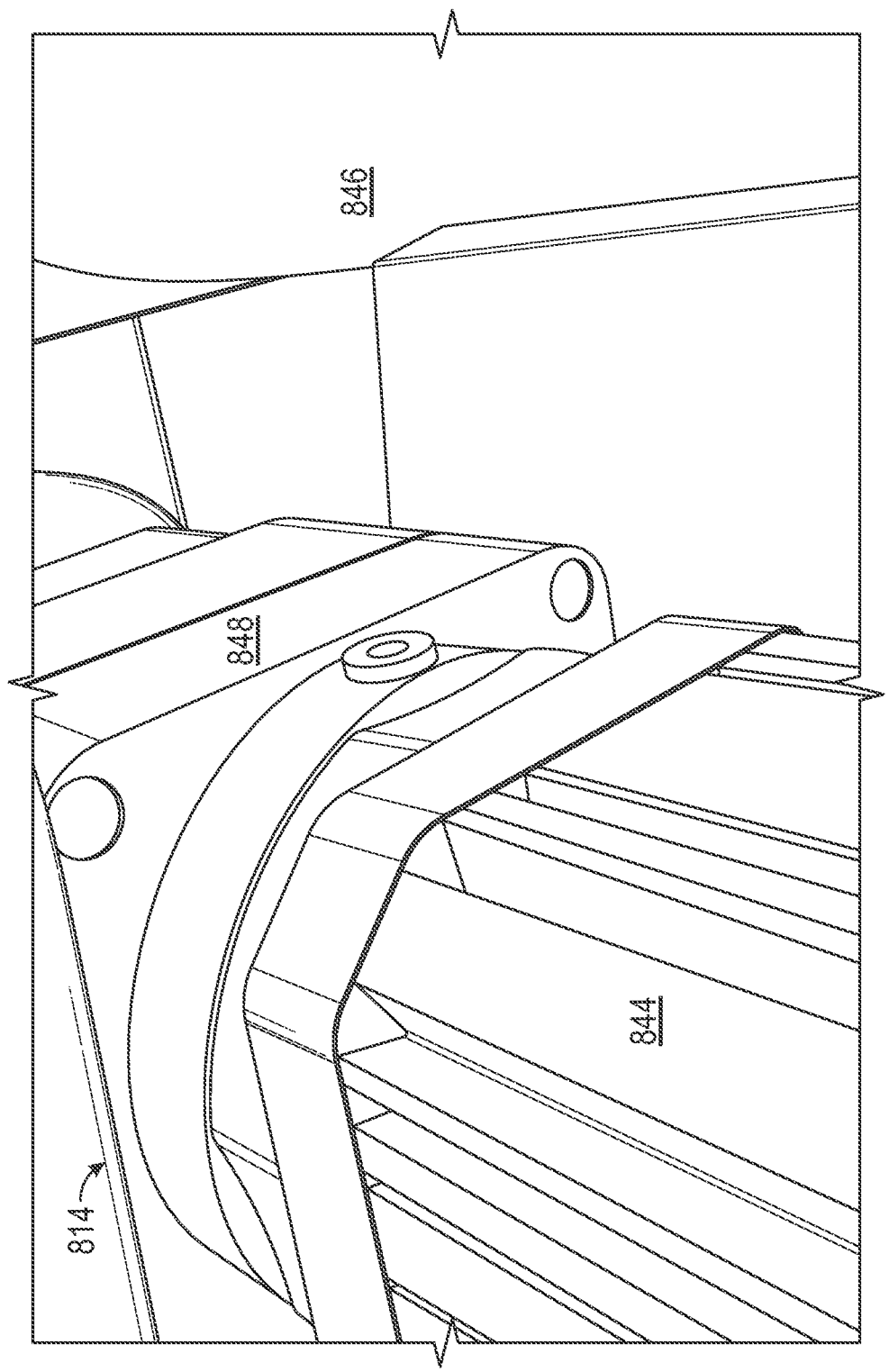
FIG. 36 is a perspective view of the electric linear actuator of FIGS. 28-29.

Referring now to FIGS. 33, 34, and 36, electric actuator 814 includes an electric motor 844, a brake 848, and a gear box 850. Electric motor 844 is configured to drive inner cylinder 828 of electric actuator 814 to extend or retract relative to outer cylinder 846 (and vice versa) by gear box 850. Brake 848 is positioned between electric motor 844 and gear box 850. Brake 848 is configured to lock electric motor 844 in response to receiving a control signal from controller 38. Brake 848 can be any of a drum brake, an electromagnetic brake, etc.

Electric motor 844 receives electrical power from batteries 64 and control signals from controller 38. Electric motor 844 operates to extend or retract electric actuator 814 (e.g., to drive outer cylinder 846 and inner cylinder 828 to translate relative to each other). As electric actuator 814 extends or retracts to raise and lower lift assembly 14, electric actuator 814 can pivot about axis 838 of trunnion mount 816.

Figure 32:
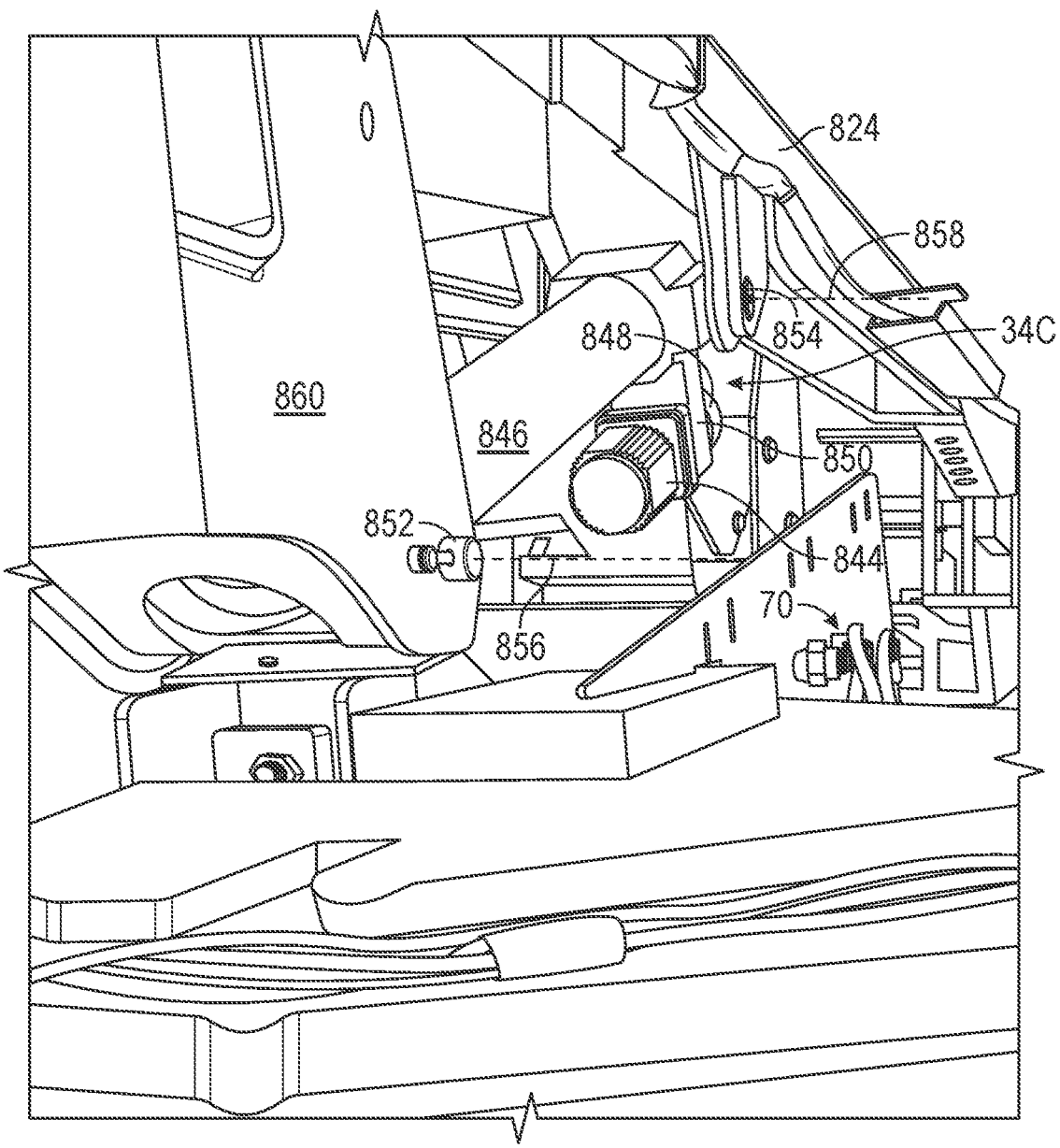
FIG. 32 is a perspective view of a jib arm of the fully electric boom of FIG. 1, according to an exemplary embodiment.
Figure 35:
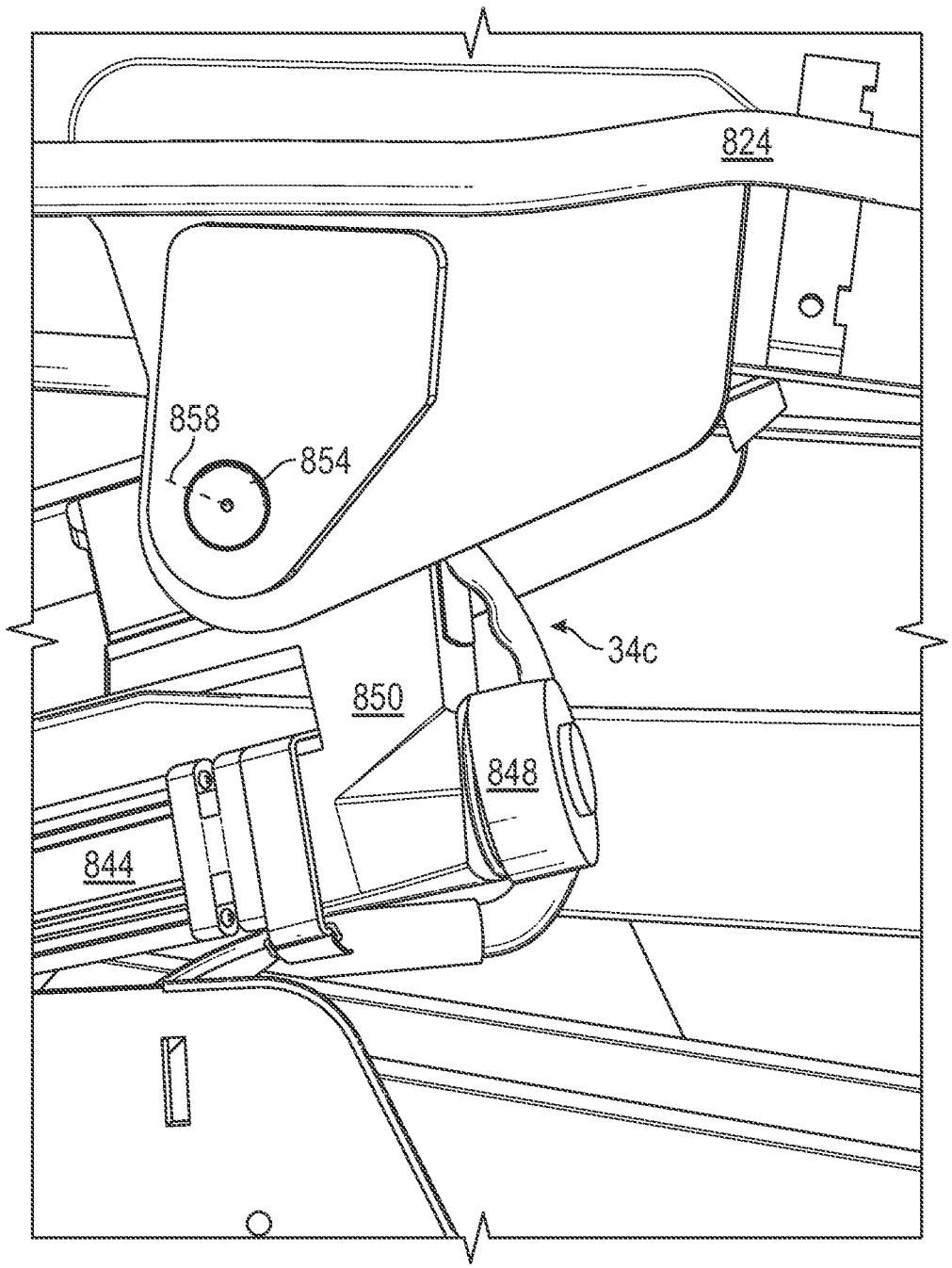
FIG. 35 is a perspective view of an electric linear actuator that drives the jib arm of FIG. 32, according to an exemplary embodiment.

Referring now to FIGS. 32 and 35, jib arm 824 is driven to rotate by electric actuator 34c. Electric actuator 34c can be the same as or similar to electric actuator 814. Jib arm 824 is pivotally or rotatably coupled at one end with a member, support beam, structural member, etc., shown as upright member 860. Upright member 860 is coupled with upright member 804. Upright member 860 may be fixedly and/or removably coupled with upright member 804. Upright member 860 is configured to raise/lower with upright member 804 as electric actuator 814 is operated to extend or retract.

Electric actuator 34c is pivotally coupled at one end with upright member 860. Electric actuator 34c can be pivotally or rotatably coupled with upright member 860 with pin 825. Electric actuator 34c is configured to rotate/pivot about axis 856 in either direction (e.g., either clockwise or counterclockwise) as electric actuator 34c extends or retracts to raise and lower jib arm 824. Electric actuator 34c is rotatably or pivotally coupled at an opposite end with jib arm 824. Electric actuator 34c can be rotatably or pivotally coupled at the opposite end with jib arm 824 with pin 854. Electric actuator 34c is configured to pivot or rotate about axis 858 as electric actuator 34c extends or retracts to raise/lower jib arm 824.

Electric actuator 34c can include an outer cylinder 846 and an inner cylinder 828 (not shown). Outer cylinder 846 and inner cylinder 828 are driven to translate relative to each other as electric motor 844 of electric actuator 34c is operated. Electric actuator 34c includes a brake 848. Brake 848 is configured to lock electric motor 844 of electric actuator 34c. Brake 848 of electric actuator 34c can be the same as or similar to brake 848 of electric actuator 814. Brake 848 is configured to lock an output driveshaft of electric motor 844 of electric actuator 34c. Electric actuator 34c includes a gear box 850. Gear box 850 of electric actuator 34c is configured to receive rotational kinetic energy from electric motor 844 of electric actuator 34c and drive outer electric actuator 34c to extend or retract (e.g., to drive outer cylinder 846 and inner cylinder 828 of electric actuator 34c to translate relative to each other). Gear box 850 of electric actuator 34c and gear box 850 of electric actuator 814 may be the same as or similar to each other. Gear box 850 of electric actuator 34c and gear box 850 of electric actuator 814 can be reduction gear boxes (e.g., gear boxes that receive input rotational kinetic energy at a first speed and a first torque, and output rotational kinetic energy at a second speed and a second torque, where the second speed is less than the first speed, and the second torque is greater than the first torque).

Advantageously, lift assembly 14 can be operated to raise and lower platform assembly 16 using fully electric actuators (e.g., electric actuator 814, electric actuator 34c, and optionally another electric actuator similar to electric actuator 814 that drives lower members 806 and 808 to rotate/pivot relative to turntable member 72). Trunnion mount 816 facilitates using an electric actuator with a longer stroke length.

Axle Lock Out System

Referring again to FIGS. 2 and 3, electric boom 10 includes a levelling system, axle oscillation control system, axle orientation control system, or axle position control system, shown as axle lock out system 1000. Axle lock out system 1000 is configured to control the orientation of lateral frame members 110 relative to chassis 54 according to one or more modes of operation. Axle lock out system 1000 may limit a range of motion of each lateral frame member 110 or set (e.g., lock) the orientation of lateral frame members 110 in specific orientations (e.g., a level orientation).

Figure 37:
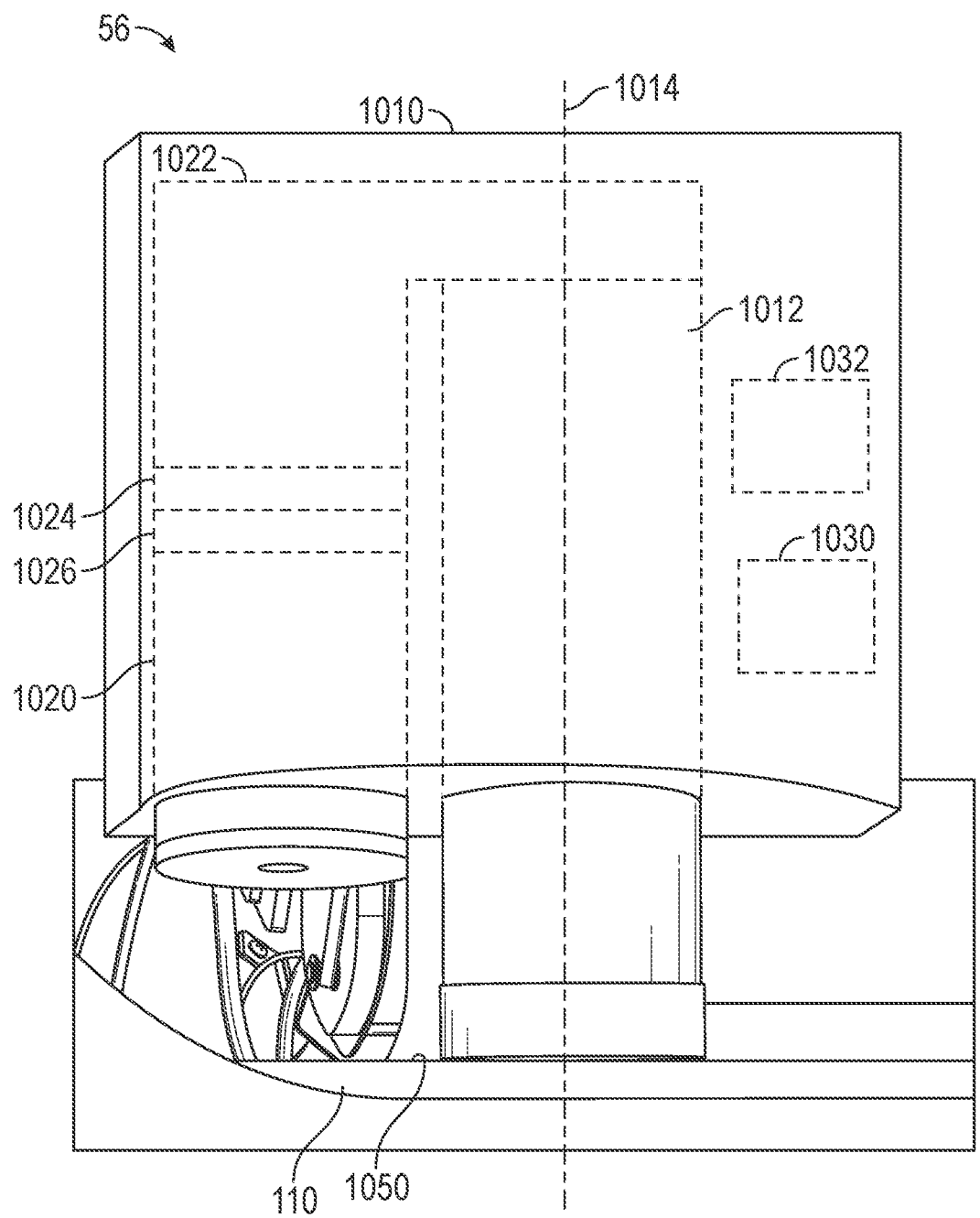
FIG. 37 is a perspective view of an axle actuator of the fully electric boom of FIG. 1, according to an exemplary embodiment.

Referring to FIG. 37, each axle actuator 56 includes an actuator body, housing, main body, or outer portion, shown as body 1010, and a rod, manipulator, interface, or inner portion, shown as rod 1012. Rod 1012 is received at least partially within body 1010 and is slidably coupled to body 1010. Rod 1012 translates relative to body 1010 along an axis, shown as actuation axis 1014. As rod 1012 translates, an overall length of axle actuator 56 varies.

An electric motor, shown as motor 1020, is configured to consume electrical energy and provide mechanical energy (e.g., rotational mechanical energy, torque on a shaft, etc.) to extend and retract rod 1012 relative to body 1010 (i.e., translate rod 1012 along actuation axis 1014). In some embodiments, motor 1020 is configured to provide rotational mechanical energy. Motor 1020 is coupled to a power transmission (e.g., gearbox, a gear drive, a belt drive, a leadscrew, etc.), shown as transmission 1022, that is configured to transfer mechanical energy from motor 1020 to rod 1012 to move rod 1012 relative to body 1010. Transmission 1022 may be configured to convert rotational mechanical energy to translational mechanical energy. In some embodiments, transmission 1022 is configured to have a mechanical advantage that facilitates moving rod 1012 with motor 1020 (e.g., with the torque output of motor 1020). Transmission 1022 can include gearboxes, belts, screws, frame members, and/or any other components that facilitate the transfer and/or conversion (e.g., from rotation to translation) of mechanical energy. In some embodiments, transmission 1022 can be backdriven. By way of example, transmission 1022 may be configured to permit rotation of motor 1020 in response to a threshold compressive or tensile force on axle actuator 56. In other embodiments, transmission 1022 cannot be backdriven. By way of example, transmission 1022 may include a mechanism, such as a worm gear drive or a ratchet, that only permits transmission of mechanical energy in one direction. In other embodiments, motor 1020 and/or transmission 1022 are omitted, and rod 1012 is actuated by motion of lateral frame member 110 relative to chassis 54.

As shown in FIG. 37, motor 1020 is coupled to rod 1012 through a selective disconnect device or coupler, shown as clutch 1024. Although clutch 1024 is shown positioned between motor 1020 and transmission 1022, clutch 1024 may be positioned anywhere in axle actuator 56. Clutch 1024 is configured to selectively couple motor 1020 to rod 1012. Accordingly, when clutch 1024 is disengaged (e.g., deactivated, decoupled, disconnected, etc.), rod 1012 is free to move independent of operation (e.g., rotation) of motor 1020. In the configuration shown in FIG. 37, rod 1012 may fall freely downward when clutch 1024 is disengaged (e.g., unless brake 1026 is engaged, until hitting a mechanical limit, etc.). In other embodiments, clutch 1024 is omitted, and motor 1020 is constantly coupled to rod 1012.

Referring again to FIG. 37, axle actuator 56 further includes a brake 1026. Brake 1026 is configured to limit or prevent movement of at least one of rod 1012, motor 1020, and transmission 1022 (e.g., relative to body 1010). Although brake 1026 is shown positioned between clutch 1024 and transmission 1022, brake 1026 may be positioned anywhere in axle actuator 56. Brake 1026 may impart resistive forces (e.g., friction) onto one or more components (e.g., by pressing a brake material against a surface) while still permitting movement if the resistive forces are overcome. Additionally or alternatively, brake 1026 may prevent movement of one or more components (e.g., entirely prevent, prevent movement past a certain point, by mechanically locking two or more components, etc.). Brake 1026 may act on any component of axle actuator 56. By way of example, if brake 1026 is positioned downstream of clutch 1024, brake 1026 may selectively prevent or limit movement of rod 1012 even when clutch 1024 is disengaged. In other embodiments, brake 1026 is omitted. In embodiments where transmission 1022 can be backdriven, brake 1026 may selectively prevent movement of rod 1012, even under large external loading.

In some embodiments, axle actuator 56 further includes a sensor 1030. Sensor 1030 may be configured to provide an indication of a current extended length of axle actuator 56 and/or a distance between axle actuator 56 and lateral frame member 110. Sensor 1030 may include one or more limit switches, potentiometers, encoders, ultrasonic sensors, LIDAR sensors, linear variable differential transformers, or other types of sensors. Sensor 1030 may be used for closed loop control over the position of rod 1012.

In some embodiments, axle actuator 56 further includes a motor controller (e.g., a voltage or current regulator, a motor driver, etc.), shown as motor controller 1032. Motor controller 1032 may be operatively coupled to controller 38 and batteries 64. Motor controller 1032 is configured to receive control signals from controller 38. Based on the received control signals, motor controller 1032 is configured to provide electrical energy to motor 1020 at a desired voltage and/or current to control operation of axle actuator 56. Motor controller 1032 may additionally provide feedback signals to controller 38 indicating an operational state of motor 1020. By way of example, feedback signals may indicate a voltage, current, or frequency of the electrical energy supplied to motor 1020.

Figure 38:
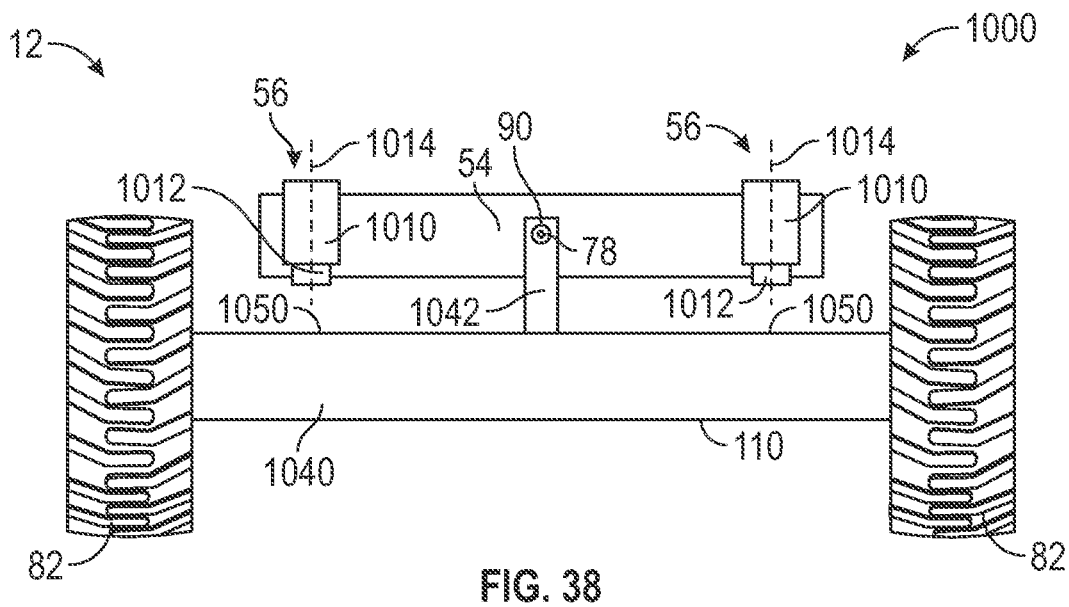
FIG. 38 is a front view of the base assembly of FIG. 2, according to an exemplary embodiment.

Referring to FIGS. 2, 3, and 38, base assembly 12 includes four axle actuators 56: two configured to control the front lateral frame member 110 and two configured to control the rear lateral frame member 110. Although FIG. 38 illustrates only one lateral frame member 110, it should be understood that this may represent the front lateral frame member 110, the rear lateral frame member 110, or both lateral frame members 110. Each lateral frame member 110 includes a first portion, shown as main portion 1040, and a second portion, shown as attachment portion 1042. Main portion 1040 extends laterally below chassis 54 and rotatably couples to two tractive elements 82. Attachment portion 1042 is approximately laterally centered relative to main portion 1040 and extends upward from main portion 1040 to receive pin 90. Axle actuators 56 are positioned on opposite sides of pin 90 (and accordingly longitudinal axis 78) and above main portion 1044.

Figure 39:
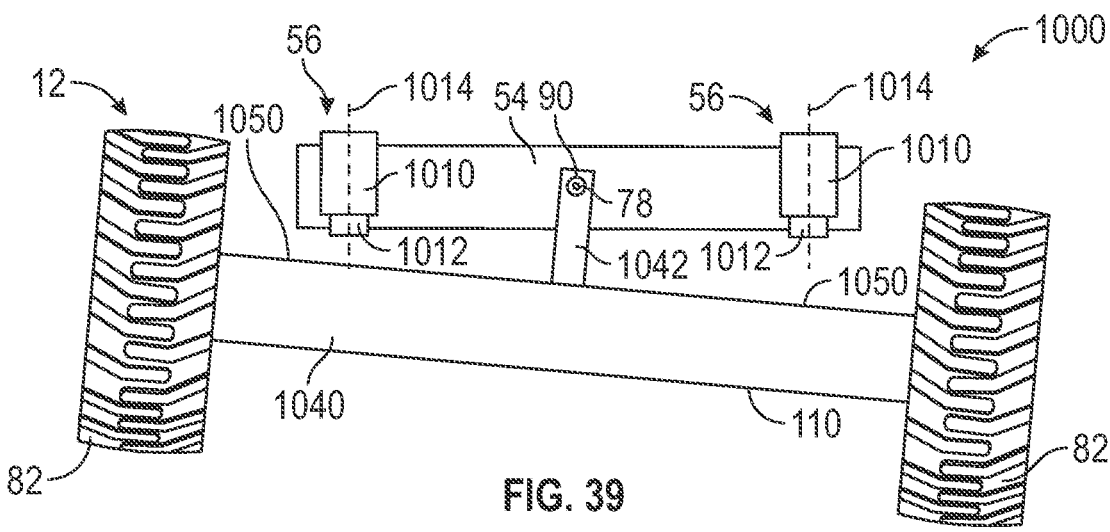
FIG. 39 is a front view of the base assembly of FIG. 2, according to an exemplary embodiment.
Figure 40:
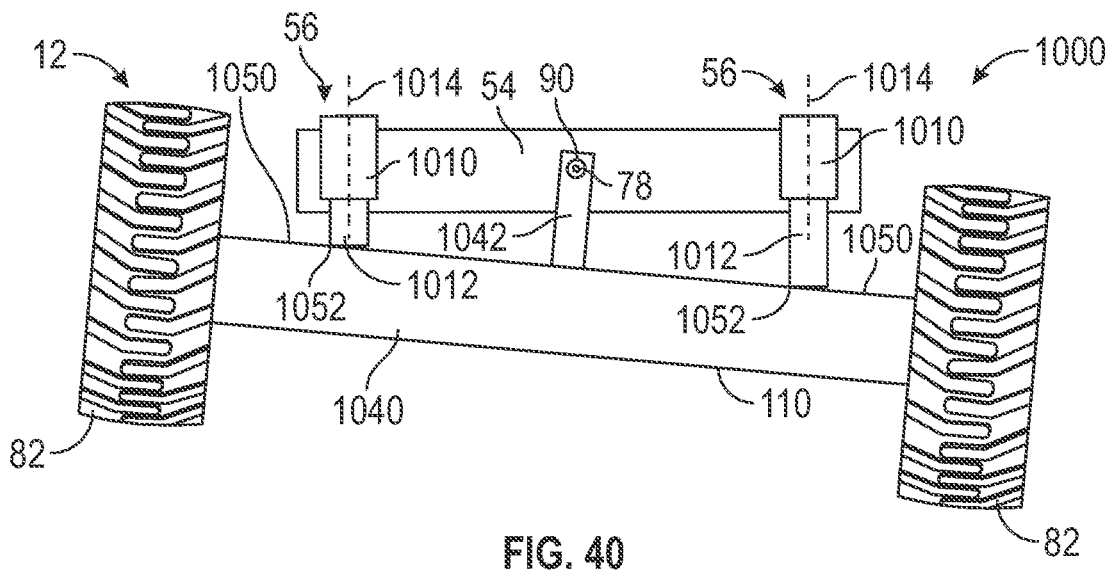
FIG. 40 is a front view of the base assembly of FIG. 2, according to an exemplary embodiment.

Referring to FIGS. 38-40, axle lock out system 1000 is shown according to an exemplary embodiment. In this embodiment, bodies 1010 are fixedly coupled to chassis 54. In other embodiments, rods 1012 are coupled to chassis 54. In some embodiments, bodies 1010 or rods 1012 are coupled to lateral frame member 110. Axle actuators 56 are symmetrically located about longitudinal axis 78. Actuation axes 1014 of axle actuators 56 are substantially vertical. Rods 1012 have ends that are substantially cylindrical and not coupled to lateral frame member 110. When rods 1012 are extended, the end of rods 1012 move toward a pair of surfaces, shown as engagement surfaces 1050, defined along a top surface of main portion 1044 of lateral frame member 110. When rods 1012 engage engagement surfaces 1050 and clutch 1024 and/or brake 1026 are activated, rods 1012 limit rotation of lateral frame member 110. Specifically, one of axle actuators 56 limits rotation of lateral frame member 110 about longitudinal axis 78 in a first direction, and the other axle actuator 56 limits rotation of lateral frame member 110 about longitudinal axis 78 in a second direction opposite the first direction. In other embodiments, bodies 1010 are fixedly coupled to lateral frame member 110, and chassis 54 defines engagement surfaces 1050.

Figure 6:
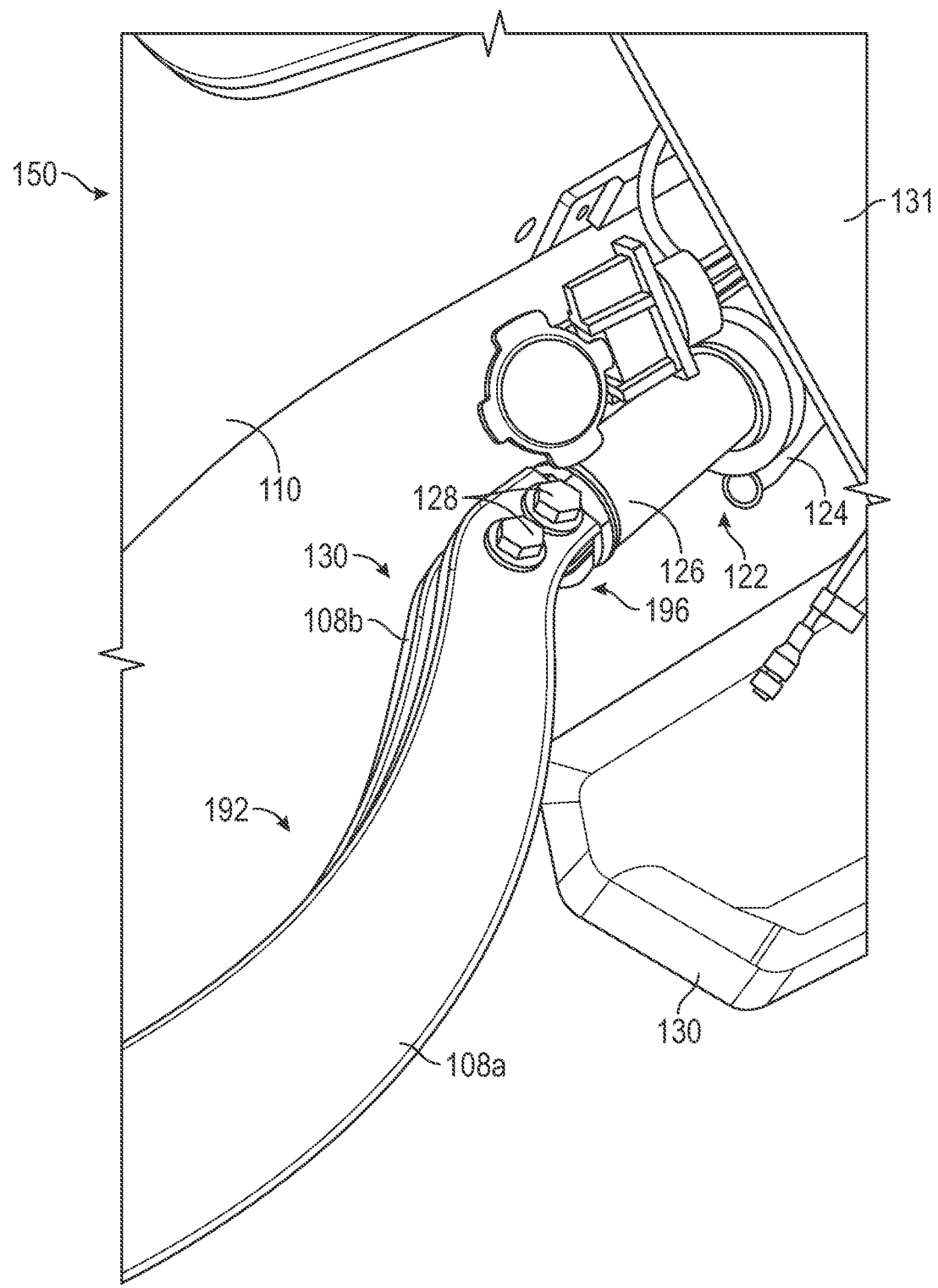
FIG. 6 is a perspective view of the steering system of the fully electric boom of FIG. 1, according to an exemplary embodiment.
Figure 7:
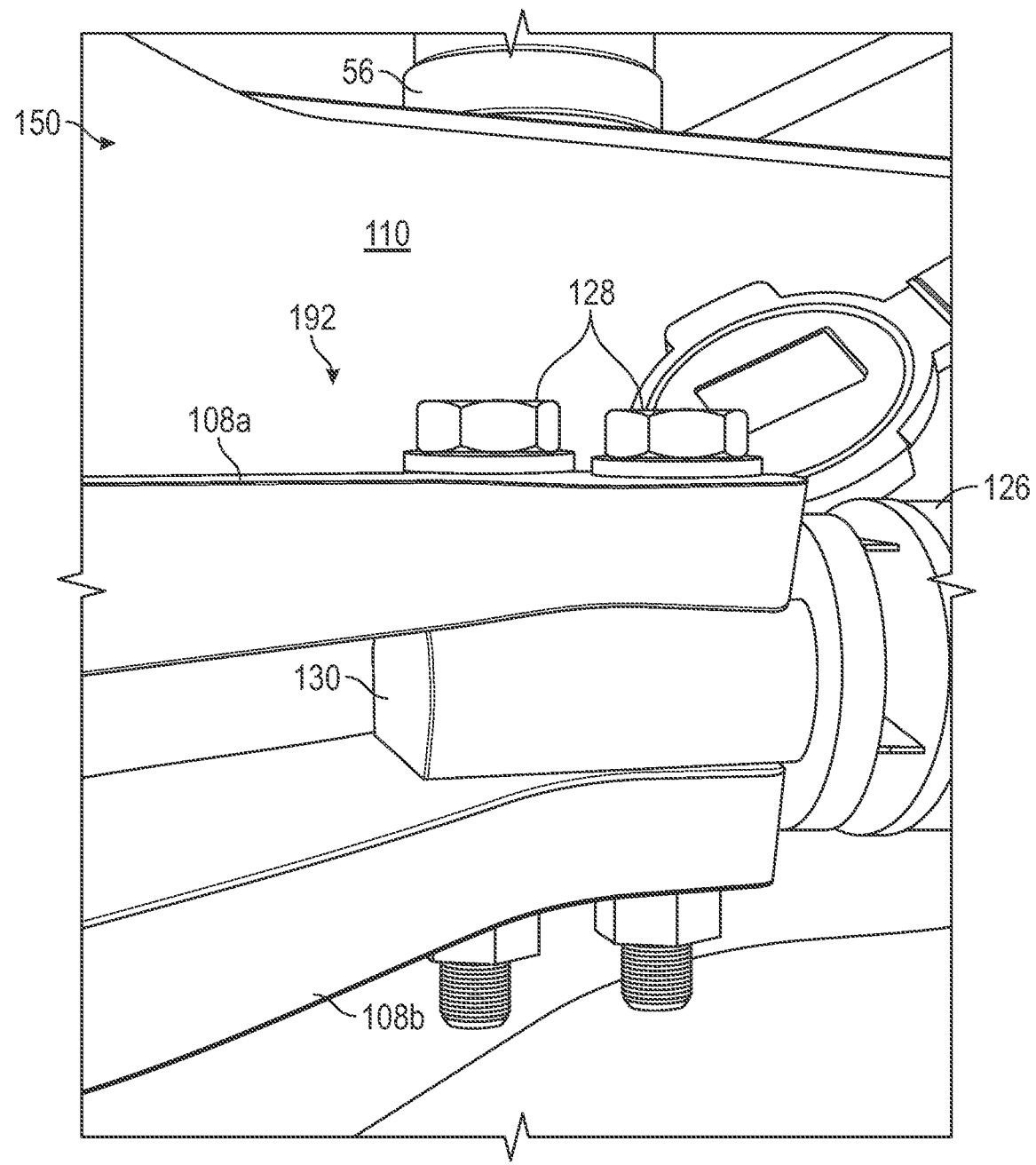
FIG. 7 is a perspective view of a portion of the steering system of the fully electric boom of FIG. 1, according to an exemplary embodiment.

In FIGS. 38 and 39, axle actuators 56 are shown in a fully retracted configuration. In this configuration, lateral frame member 110 has a maximum range of motion (i.e., an angle within which lateral frame member 110 is permitted to rotate). As rods 1012 extend, the range of motion is restricted. As shown in FIG. 6, when both axle actuators 56 are contacting the respective engagement surfaces 1050, the range of motion includes only a single position, and motion of lateral frame member 110 is prevented. A portion of rod 1012, shown as engagement area 1052, contacts lateral frame member 110. The end of rod 1012 is cylindrical and has a fixed orientation. Accordingly, engagement area 1052 may be relatively small (e.g., a single point, smaller than the end of rod 1012) in this embodiment, unless lateral frame member 110 is near the central position shown in FIG. 38.

Figure 42:
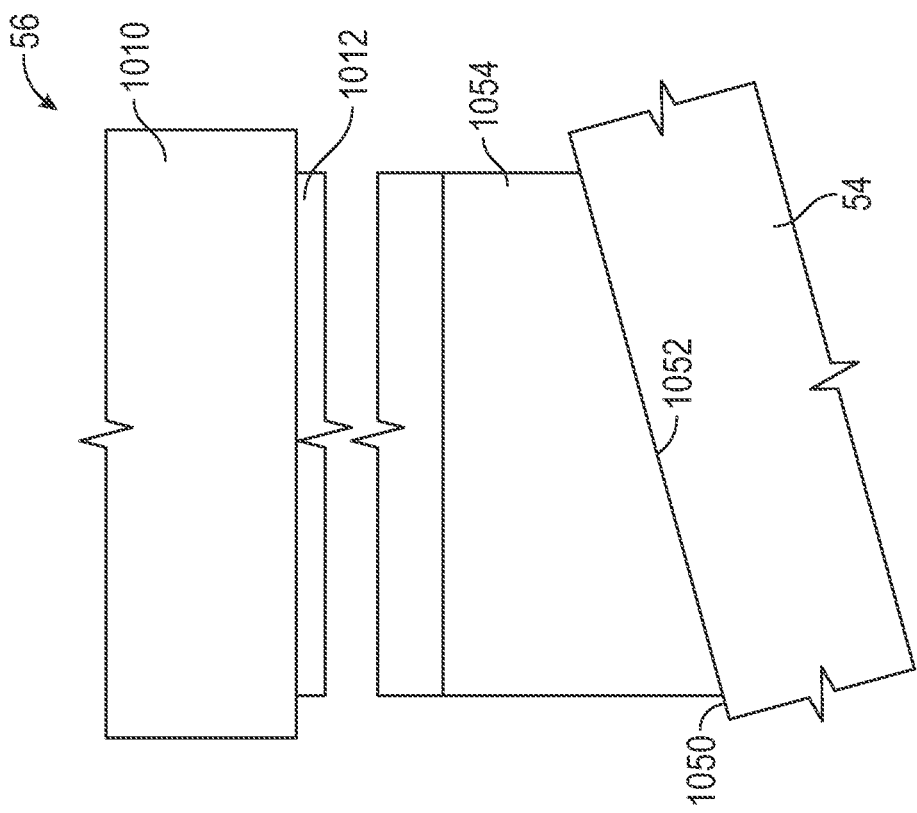
FIG. 42 is a front view of an axle actuator of a fully electric boom, according to an exemplary embodiment.
Figure 41:
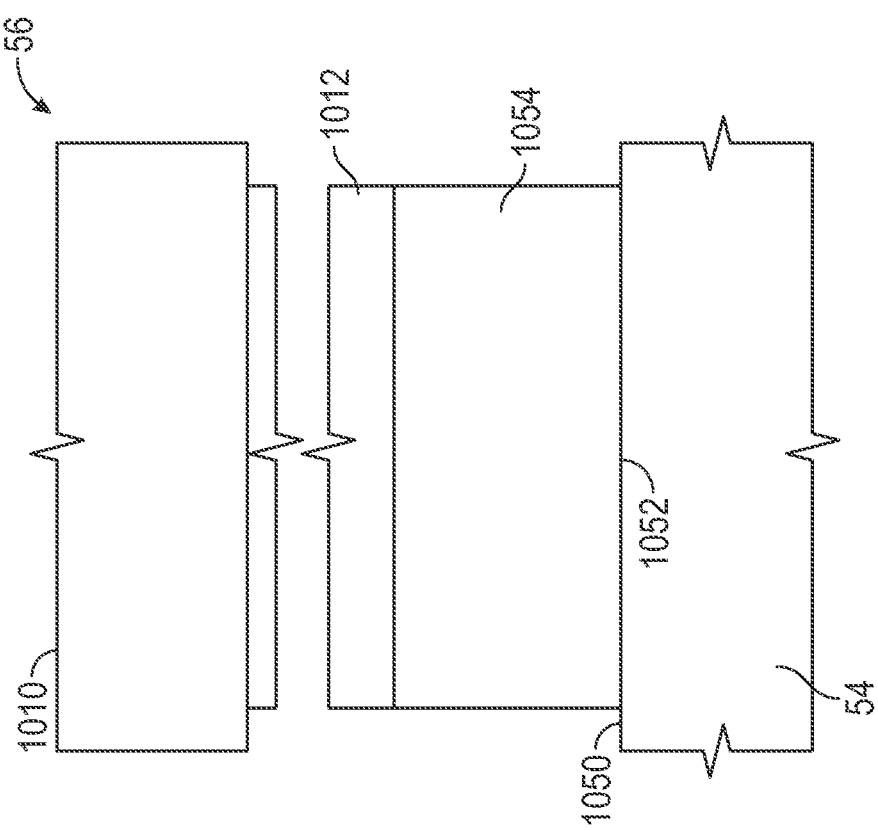
FIG. 41 is a front view of an axle actuator of a fully electric boom, according to an exemplary embodiment.

In some embodiments, such as the alternative embodiment shown in FIGS. 41 and 42, an adapter, foot, or swivel, shown as foot 1054, is coupled to an end of rod 1012. The foot 1054 has a bottom surface that can rotate freely relative to the rod 1012. When foot 1054 engages engagement surface 1050, the bottom surface of foot 1054 rotates to maximize engagement area 1052, reducing the pressure on engagement area 1052. Foot 1054 may include swivels, hinges, compliant materials (e.g., rubber, plastic, etc.), or other mechanisms that facilitate such rotation.

Figure 43:
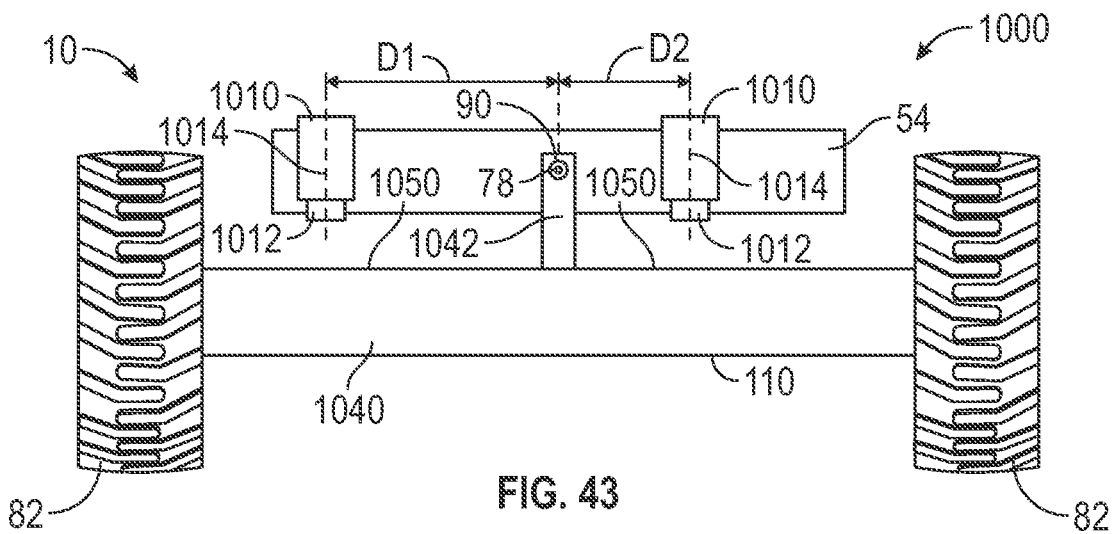
FIG. 43 is a front view of a base assembly of a fully electric boom including an axle lock out assembly, according to an exemplary embodiment.

Referring to FIG. 43, the axle lock out system 1000 is shown according to an alternative embodiment. A first horizontal distance Di extends between the center of one of the axle actuators 56 and longitudinal axis 78. A second horizontal distance Da extends between the center of the other axle actuator 56 and longitudinal axis 78. In this embodiment, distance Di is less than distance Dz. Accordingly, the moment effect of rod 1012 on lateral frame member 110 is different between the two axle actuators 56. In other embodiments, distance Di and/or distance Da vary. In other embodiments, one of axle actuators 56 is omitted.

Figure 44:
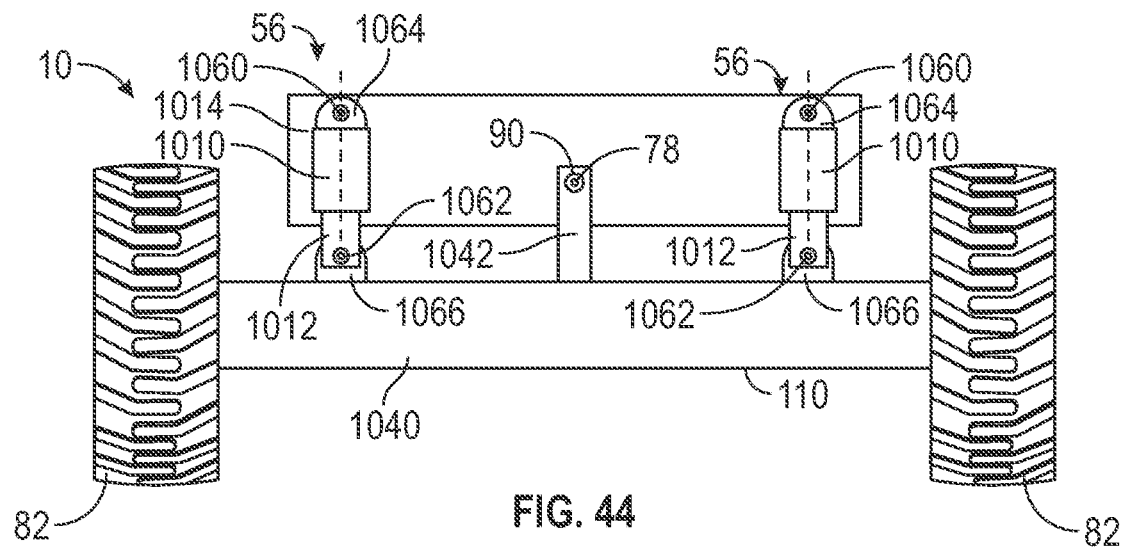
FIG. 44 is a front view of a base assembly of a fully electric boom including an axle lock out assembly, according to an exemplary embodiment.
Figure 45:
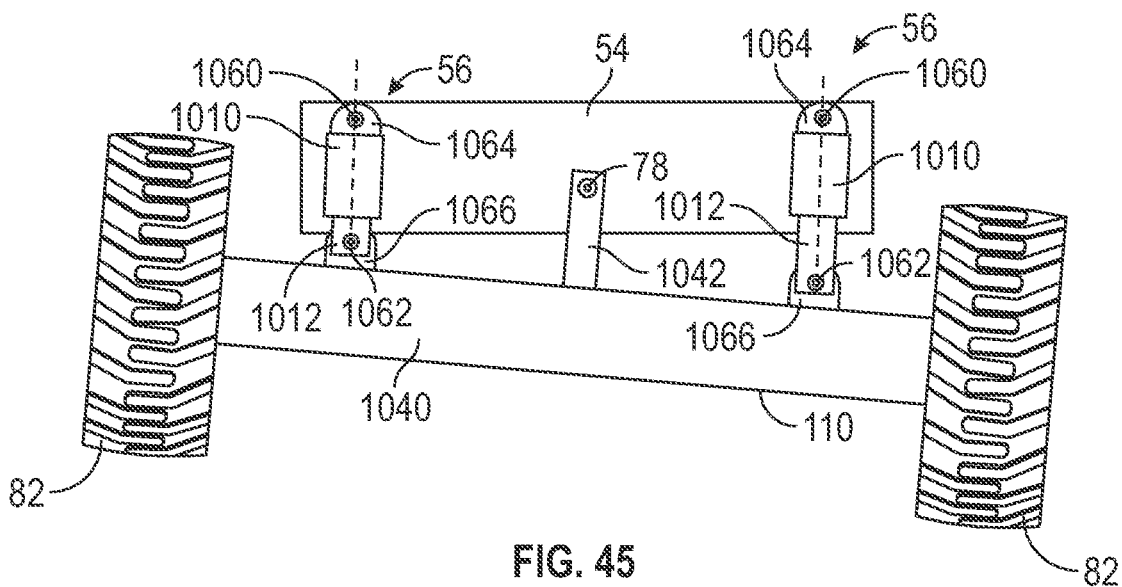
FIG. 45 is a front view of a base assembly of a fully electric boom including an axle lock out assembly, according to an exemplary embodiment.

Referring to FIG. 44 and FIG. 45, the axle lock out system 1000 is shown according to an alternative embodiment. In this embodiment, axle actuators 56 are pivotally coupled to chassis 54 and lateral frame member 110 such that axle actuators 56 rotate about longitudinal axes 1060 and 1062. Specifically, body 1010 includes a protrusion, shown as clevis 1064, that defines an aperture configured to receive a pin to pivotally couple clevis 1064 to chassis 54. Lateral frame member 110 includes a protrusion, shown as clevis 1066, that defines an aperture. The aperture of clevis 1066 is aligned with a corresponding aperture defined by rod 1012 such that a pin can extend between both apertures to pivotally couple rod 1012 to clevis 1066. In other embodiments, bodies 1010 are pivotally coupled to lateral frame member 110, and rods 1012 are pivotally coupled to chassis 54.

When lateral frame member 110 rotates relative to chassis 54, axle actuators 56 extend or retract and rotate about longitudinal axes 1060 and 1062. Due to the coupling of devises 1064 and 1066 to chassis 54 and lateral frame member 110, any rotation of lateral frame member 110 relative to chassis 54 has a corresponding rotation and change in length of axle actuators 56.

Controller 38 is configured to control axle actuators 56 to control an orientation of each lateral frame member 110 relative to chassis 54. Controller may 38 provide control signals to motor controllers 1032 to control the flow of electrical energy supplied to each axle actuator 56, thereby controlling the length of each axle actuator 56. Controller 38 may utilize feedback from sensor 1030 and/or motor controller 1032 to determine a current orientation of lateral frame members 110 and/or a current length of each axle actuator 56. Controller 38 may control each lateral frame member 110 independently, such that the ranges of motion of each lateral frame member 110 may differ.

In some embodiments, axle lock out system 1000 is selectively reconfigurable between a first mode of operation (e.g., a driving mode, a movement mode, etc.) in which one or both lateral frame members 110 are permitted to rotate relative to chassis 54 and a second mode of operation (e.g., a stationary mode, an operating mode, an extended mode, a usage mode, etc.) in which rotation of one or both lateral frame members 110 is limited (e.g., prevented, reduced, etc.) relative to chassis 54. In some embodiments, axle lock out system 1000 is further operable in a third mode of operation (e.g., a levelling mode, a leaning mode, etc.) in which lateral frame members 110 are brought into a specific orientation relative to chassis 54. Controller 38 may change the current mode of operation automatically and/or in response to an operator input (e.g., through HMI 20 or HMI 21, etc.).

In some embodiments, it is desirable to operate axle lock out system 1000 in the driving mode while electric boom 10 is moving between different locations. The driving mode facilitates rotation of lateral frame members 110 based on the topography, shape, or contour of the terrain or support surface that electric boom 10 is traveling across. This facilitates retaining chassis 54 in a consistent orientation relative to the direction of gravity, smoothing the ride for the chassis 54 and/or operators of electric boom 10. If both lateral frame members 110 were held stationary relative to chassis 54 while driving, lift assembly 14 and platform assembly 16 could experience rapid and/or large vertical movement based on the shape of the terrain.

In the embodiment of axle lock out system 1000 shown in FIGS. 38-40, axle actuators 56 may be retained in a retracted position (e.g., a partially retracted position, a fully retracted position, etc.) in the driving mode. In the retracted position, there may be space between one or both of rods 1012 and engagement surfaces 1050, such that lateral frame member 110 has a first range of motion. The ends of the range of motion may be defined when one of engagement surfaces 1050 contacts rod 1012. Alternatively, the range of motion may be defined by one or more other physical limits of lateral frame member 110 (e.g., contact between lateral frame member 110 and chassis 54). Rods 1012 may be retained in the retracted position by brake 1026, transmission 1022 (e.g., friction within transmission 1022), and/or motor 1020. By way of example, to brake the axle actuator 56 with motor 1020, the leads of motor 1020 may be electrically coupled by a resistor such that motor 1020 resists rotation.

In the embodiments of axle lock out system 1000 shown in FIGS. 38-40 and 44 and 11, rods 1012 may be configured to travel freely with lateral frame member 110 in the driving mode. By way of example, motor 1020 may actively control rods 1012 to travel with the lateral frame member 110. In such embodiments, motor 1020 may utilize feedback signals from sensor 1030 to determine a current length of each axle actuator 56 and/or an orientation of lateral frame member 110 relative to chassis 54 and control the length of axle actuators 56 to match the current orientation of lateral frame member 110 as lateral frame member 110 rotates. By way of another example, clutches 1024 may be disengaged such that rods 1012 travel freely relative to bodies 1010. Rods 1012 may rest upon engagement surfaces 1050 or devises 1066 and be supported by lateral frame member 110. Alternatively, transmission 1022 and/or motor 1020 may permit axle actuators 56 to be backdriven as lateral frame member 110 rotates.

In some embodiments, it is desirable to operate axle lock out system 1000 in the operating mode while lift assembly 14 is being utilized. The operating mode may limit or prevent rotation of lateral frame members 110 relative to chassis 54 (e.g., once a desired orientation is achieved). This facilitates retaining chassis 54 in a consistent orientation relative to the direction of gravity, regardless of the operation of lift assembly 14. If lateral frame members 110 were permitted to move freely relative to chassis 54 while lift assembly 14 moved, the change in location of the center of gravity of lift assembly 14 as the lift assembly 14 is operated (e.g., to manipulate a load such as an implement or work platform holding an operator) could cause the orientation of chassis 54 to shift.

In the operating mode, controller 38 may control axle actuators 56 to reduce the range of motion of lateral frame member 110 relative to the range of motion in the driving mode. The range of motion of lateral frame member 110 in the operating mode may include one position (i.e., the lateral frame member 110 is fixed) or multiple positions (i.e., lateral frame member 110 is movable). In some embodiments, the range of motion in the driving mode includes the range of motion in the operating configuration. In other embodiments, the range of motion of lateral frame member 110 in the operating mode extends outside of the range of motion of lateral frame member 110 in the driving configuration.

In the embodiment of axle lock out system 1000 shown in FIGS. 38-40, when changing to the operating mode, controller 38 may first extend rods 1012 until rods 1012 reach an extended position. In some embodiments, the extended position corresponds to the position where rods 1012 contact engagement surfaces 1050 of lateral frame member 110. In some embodiments, controller 38 operates motor 1020 in an extension direction and monitors the flow of electrical energy (e.g., the current, the voltage, the frequency, etc.) to motor 1020 (e.g., using motor controller 1032). Controller 38 may determine that rod 1012 has contacted engagement surface 1050 based on a variation in the flow of electrical energy to the corresponding motor 1020. By way of example, controller 38 may determine that rod 1012 has contacted engagement surface 1050 when the current drawn by motor 1020 exceeds a threshold current. In other embodiments, controller 38 utilizes data from sensor 1030 to determine when rod 1012 has contacted engagement surface 1050. In yet other embodiments, controller 38 controls motor 1020 to extend axle actuators 56 for a predetermined period of time. In other embodiments, the rods 1012 are partially extended in the extended position, but not so much that rods 1012 contact engagement surfaces 1050. This reduces the range of motion of lateral frame member 110 but permits some movement.

In embodiments where rods 1012 are held in the retracted position during the driving mode, extension actuators 56 are held at a fixed length (e.g., locked) once rods 1012 reach the extended position. In embodiments where rods 1012 travel freely with lateral frame member 110 during the driving mode, extension actuators 56 are held at a fixed length as soon as axle lock out system 1000 enters operating mode. By way of example, controller 38 may engage clutch 1024 and/or brake 1026 to limit movement of rod 1012. By way of another example, controller 38 may control motor 1020 to limit movement of rod 1012 (e.g., by electrically coupling the leads of motor 1020 through a resistor).

In some embodiments, it is desirable to operate axle lock out system 1000 in the levelling mode prior to utilizing lift assembly 14. While in levelling mode, controller 38 may operate axle actuators 56 to reorient lateral frame members 110 such that one or more elements of electric boom 10 (e.g., chassis 54, turntable 70, etc.) are in a desired orientation, such as substantially level (e.g., oriented substantially perpendicular to the direction of gravity). Once the levelling mode has succeeded in achieving the desired orientation, axle lock out system 1000 may be reconfigured into the operating mode to retain the chassis 54 or other element in the desired orientation.

Control System

Figure 46:
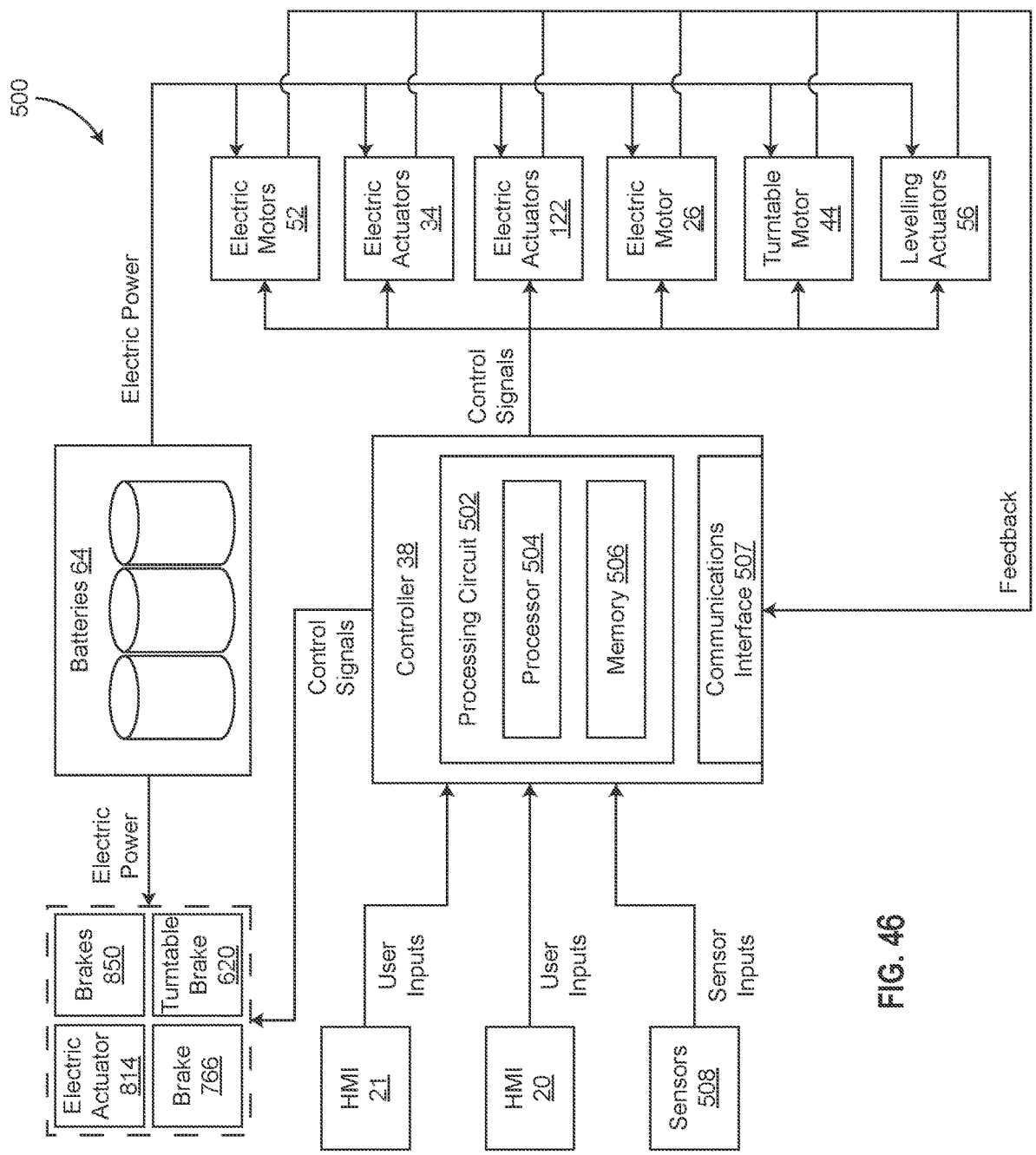
FIG. 46 is a block diagram of a control system for operating a fully electric boom, according to an exemplary embodiment.

Referring now to FIG. 46, a control system 500 for operating electric boom 10 is shown, according to some embodiments. Control system 500 includes controller 38, batteries 64 (e.g., energy storage devices), and the various controllable elements of electric boom 10. The controllable elements of electric boom 10 include but are not limited to electric motors 52, electric actuators 34, electric actuators 122 (e.g., steering actuators), electric motor 26, turntable motor 44, and axle actuators 56. The controllable elements of electric boom 10 can also include electrical lighting, sound emitting devices, etc.

Controller 38 can receive user inputs from HMI 21 and/or HMI 20 and operate any of electric motors 52, electric actuators 34, electric actuators 122, electric motor 26, turntable motor 44, and axle actuators 56 to operate electric boom 10. For example, controller 38 may receive a user input from HMI 21 or HMI 20 to elevate platform assembly 16 and may operate electric actuators 34 to raise or lower platform assembly 16. Likewise, controller 38 can receive a user input from HMI 21 or HMI 20 to rotate turntable 70 about axis 42 relative to base 36 and can operate turntable motor 44 to rotate turntable 70 based on the user input. Controller 38 can also receive a user input from HMI 21 or HMI 20 to drive or steer electric boom 10 and can operate electric motors 52 and electric actuator(s) 122 to drive and steer tractive elements 82. Controller 38 operates any of electric motors 52, electric actuators 34, electric actuators 122, electric motor 26, and turntable motor 44 by generating control signals and providing the control signals to the various controllable elements to perform requested operations of electric boom 10.

Controller 38 can receive sensor inputs from sensors 510 of electric boom 10. Sensors 510 can include proximity sensors, distance sensors, position sensors, etc. Sensors 510 can include any safety sensors that measure relative distance between electric boom 10 and objects. Sensors 510 can include sensors that monitor an approximate elevation of lift assembly 14. In other embodiments, sensors 510 include temperature sensors configured to measure a temperature of batteries 64 to determine a condition of batteries 64. Controller 38 can also receive feedback from any of electric motors 52, electric actuators 34, electric actuators 122, electric motor 26, turntable motor 44, and axle actuators 56. In some embodiments, the feedback information includes voltage or current indicative of a position (e.g., linear position, degree of extension, angular position, etc.) of any of the controllable elements, a speed (e.g., a speed of extension, a speed of rotation, etc.) of any of the controllable elements, etc.

For example, the feedback received from turntable motor 44 can indicate a current angular position of turntable motor 44. Controller 38 can use any of the feedback from electric motors 52, electric actuators 34, electric actuators 122, electric motor 26, turntable motor 44, and axle actuators 56 to track, monitor, etc., angular or linear position of any of the controllable elements. In some embodiments, the feedback is received from a sensor associated with each of the controllable elements. For example, a position sensor can be mounted to each of electric actuators 34 to monitor a degree of extension or retraction of electric actuators 34. Controller 38 can use any of the feedback information to monitor operations of electric boom 10 and to generate control signals for the controllable elements.

Controller 38 can monitor whether any of the controllable elements of electric boom 10 are operating properly based on the feedback received from the controllable elements. For example, controller 38 may receive feedback from any of the controllable elements (e.g., linear electric actuators of lift assembly 14, turntable motor 44, platform rotator 30, etc.) and detect failure of any of the controllable elements based on the received feedback. In some embodiments, controller 38 notifies an operator regarding any failed controllable elements. For example, if controller 38 determines that electric actuator 34*a* is not operating properly, controller 38 can notify the operator by providing a message to the operator through HMI 20 and/or HMI 21.

Controller 38 can also monitor sensory information measured by sensors 510 to determine if any of the controllable elements (e.g., electric actuators 122) are not operating properly. For example, if the sensory information from sensors 510 indicates that a particular one of electric actuators 122 (or any of the controllable elements) has not extended an expected amount, controller 38 can determine that the particular one of electric actuators 122 is not operating properly. Controller 38 can provide a notification to the operator through HMI 20 and/or HMI 21 regarding any detected failures of the controllable elements (e.g., any of the electric motors, any of the electric actuators, etc.).

Electric boom 10 can also include one or more weight sensors configured to measure a load applied to platform assembly 16 (or forks, lifting apparatus, buckets, etc., if electric boom 10 is a telehandler). Controller 38 can receive sensor measurements from the weight sensors indicating the load applied to platform assembly 16. Controller 38 can generate control signals for any of the controllable elements (e.g., electric actuators, electric motors, electric rotary actuators, etc.) of electric boom 10 based on the load applied to platform assembly 16. For example, if the load applied to platform assembly 16 is greater than a threshold value, controller 38 can restrict operation of lift assembly 14.

Controller 38 can include a communications interface 508. Communications interface 508 may facilitate communications between controller 38 and external systems, devices, sensors, etc. (e.g., sensors 510, HMI 20, HMI 21, electric motors 52, electric actuators 34, electric actuators 122, electric motor 26, turntable motor 44, axle actuators 56, etc.) for allowing user control, monitoring, and adjustment to any of the communicably connected devices, sensors, systems, primary movers, etc. Communications interface 508 may also facilitate communications between controller 38 and HMI 21 and/or HMI 20 (e.g., a touch screen, a display screen, a personal computer, etc.) or with a network.

Communications interface 508 can be or include wired or wireless communications interfaces (e.g., jacks, antennas, transmitters, receivers, transceivers, wire terminals, etc.) for conducting data communications with sensors, devices, systems, etc., of electric boom 10 or other external systems or devices (e.g., an administrative device). In various embodiments, communications via communications interface 508 can be direct (e.g., local wired or wireless communications) or via a communications network (e.g., a WAN, the Internet, a cellular network, etc.). For example, communications interface 508 can include an Ethernet card and port for sending and receiving data via an Ethernet-based communications link or network. In another example, the communications interface can include a Wi-Fi transceiver for communicating via a wireless communications network. In some embodiments, communications interface 508 is or includes a power line communications interface. In other embodiments, communications interface 508 is or includes an Ethernet interface, a USB interface, a serial communications interface, a parallel communications interface, etc.

Controller 38 includes a processing circuit 502, a processor 504, and memory 506. Processing circuit 502 can be communicably connected to communications interface 508 such that processing circuit 502 and the various components thereof can send and receive data via communications interface 508. Processor 504 can be implemented as a general purpose processor, an application specific integrated circuit (ASIC), one or more field programmable gate arrays (FPGAs), a group of processing components, or other suitable electronic processing components.

Memory 506 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 506 can be or include volatile memory or non-volatile memory. Memory 506 can include database components, object code components, script components, or any other type of information structure for supporting the various activities and information structures described in the present application. According to some embodiments, memory 506 is communicably connected to processor 504 via processing circuit 502 and includes computer code for executing (e.g., by processing circuit 502 and/or processor 504) one or more processes described herein.

Electric motors 52, electric actuators 34, electric actuators 122, electric motor 26, turntable motor 44, and axle actuators 56 can receive electrical power from batteries 64 to perform any of their respective operations. Controller 38 is configured to generate control signals for any of the controllable elements to perform their respective operation in response to receiving a user input from HMI 21 and/or HMI 20. When the controllable elements receive the control signals from controller 38, the controllable elements use the electrical power provided by batteries 64 to perform their respective operations.

Controller 38 can receive a user input from HMI 21 and/or HMI 20 to raise or lower platform assembly 16 and generates control signals to cause electric actuators 34 to raise or lower platform assembly 16 (e.g., to raise or lower platform assembly 16 the amount desired/input by the user/operator). Likewise, controller 38 can receive a user input from HMI 21 and/or HMI 20 to rotate turntable 70 and can generate control signals for turntable motor 44 to rotate turntable 70 (e.g., to rotate turntable 70 the desired amount as input by the user/operator).

Controller 38 can also generate and provide control signals to turntable brake 620 to restrict rotation of turntable 70. Turntable brake 620 receives electric power from batteries 64 and actuates between an activated state and a deactivated state to restrict and allow rotation of ring gear 608, respectively. Controller 38 may operate turntable motor 44 in response to receiving a user input from HMI 20 and/or HMI 21. Controller 38 can receive feedback from turntable motor 44 indicating an angular position of turntable motor 44 or an angular speed of turntable motor 44. In some embodiments, controller 38 receives sensory information from a turntable sensor that indicates an angular position of turntable 70. In some embodiments, the user input received from HMI 20 and/or HMI 21 indicate a desired direction of rotation of turntable 70. Controller 38 generates control signals and provides the control signals to turntable motor 44 to operate turntable motor 44 to rotate turntable 70 in the desired direction of rotation.

Controller 38 can also provide control signals to electric actuator 814 to raise/lower the boom arm of lift assembly 14. Electric actuator 814 is configured to use electric power from batteries 64 to operate electric motor 844. Controller 38 can operate electric actuator 814 to extend or retract by operating electric motor 844 to operate in a forwards direction or a backwards direction. Controller 38 can operate electric motor 844 to cause electric actuator 814 to extend in response to receiving a user input from HMI 20 and/or HMI 21 to raise platform assembly 16. Likewise, controller 38 can operate electric motor 844 to cause electric actuator 814 to retract in response to receiving a user input from HMI 20 and/or HMI 21 to lower platform assembly 16.

Controller 38 can also generate and provide control signals to electric motor 26 and/or brake 766. Controller 38 can generate and provide the control signals to electric motor 26 to operate electric motor 26 in either direction, thereby pivoting platform assembly 16 about axis 28 in either direction. Controller 38 can operate electric motor 26 in response to receiving user inputs from an of HMI 20 and/or HMI 21. For example, an operator can provide controller 38 with a user input to pivot/rotate platform assembly 16 in a clockwise direction at HMI 20 and/or HMI 21 (e.g., by pressing a button, pulling a lever, moving a joy-stick, etc.). Controller 38 can operate electric motor 26 as long as the user input from HMI 20 and/or HMI 21 is received. In some embodiments, controller 38 can receive a user input from HMI 20 and/or HMI 21 to lock platform assembly 16 at a current angular position. Controller 38 can generate and provide control signals to brake 766 to lock platform assembly 16 (e.g., to activate brake 766) at a current angular position in response to receiving the user input from HMI 20 and/or HMI 21. Likewise, controller 38 can receive a user input from HMI 20 and/or HMI 21 to de-activate brake 766. Controller 38 can generate and provide control signals to brake 766 to transition brake 766 into the de-activated state in response to receiving a user input from HMI 20 and/or HMI 21.

Advantageously, electric boom 10 is a fully-electric lifting device. All of the electric actuators and electric motors of electric boom 10 can be configured to perform their respective operations without requiring any hydraulic systems, hydraulic fluids, engine systems, etc. Other booms do not use a fully-electric system and require regular maintenance to ensure that the various hydraulic systems are operating properly. Electric boom 10 uses electric motors and electric actuators without requiring combustible fuels (e.g., gasoline, diesel), or hydraulic fluids. Electric boom 10 is powered by batteries 64 that can be re-charged when necessary.

Configuration of Exemplary Embodiments

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:
1. A lift device comprising:
   a chassis;
   a battery coupled to the chassis;
   a lift assembly coupled to the chassis and configured to selectively raise and lower a load relative to the chassis;
   a front axle assembly pivotally coupled to the lift assembly and configured to rotate about a longitudinal axis relative to the chassis and a rear axle assembly pivotally coupled to the lift assembly and configured to rotate about the longitudinal axis relative to the chassis; and a controller configured to control operation of a front electric linear actuator and a rear electric linear actuator according to a first mode of operation and a second mode of operation;

wherein in the first mode of operation, the controller is configured to control the front electric linear actuator and the rear electric linear actuator to permit rotation of the front axle assembly and the rear axle assembly relative to the chassis through a first range of motion, and wherein in the second mode of operation, the controller is configured to control the front electric linear actuator and the rear electric linear actuator to limit rotation of the front axle assembly and the rear axle assembly relative to the chassis to a second range of motion.

2. The lift device of claim 1, wherein the front electric linear actuator and the rear electric linear actuator each include a body slidably coupled to a rod and an electric motor that controls movement of the rod relative to the body, and wherein in the second mode of operation, the controller is configured to control the electric motor to extend the front electric linear actuator or the rear electric linear actuator until the front electric linear actuator or the rear electric linear actuator engages the front axle assembly or the rear axle assembly.

3. The lift device of claim 2, wherein the front electric linear actuator and the rear electric linear actuator each include a motor controller that monitors a flow of electrical energy supplied to the electric motor, and wherein the controller is configured to determine that the front electric linear actuator or the rear electric linear actuator has engaged the front axle assembly or the rear axle assembly when a current supplied to the electric motor exceeds a threshold current.

4. The lift device of claim 1, wherein in the first mode of operation, the front electric linear actuator and the rear electric linear actuator are configured to extend and retract freely as the front axle assembly and the rear axle assembly rotate relative to the chassis, and wherein in the second mode of operation, the controller limits extension and retraction of the front electric linear actuator and the rear electric linear actuator.

5. The lift device of claim 4, wherein the front electric linear actuator and the rear electric linear actuator each include a body slidably coupled to a rod and an electric motor that controls movement of the rod relative to the body, wherein the body is coupled to one of the front axle assembly or the rear axle assembly and the chassis, and wherein the rod is coupled to the other of the front axle assembly or the rear axle assembly and the chassis.

6. The lift device of claim 1, wherein the lift assembly is a boom assembly including at least one arm and at least one linear actuator configured to rotate the at least one arm relative to the chassis to selectively raise and lower the load.

7. The lift device of claim 1, wherein the lift device is a telehandler, and wherein the load is an implement.

8. The lift device of claim 1, wherein the lift device is a boom lift, and wherein the load is a work platform configured to support an operator.

9. The lift device of claim 1, wherein the first mode of operation is a transportation mode for when the lift device transports, and the second mode of operation is a usage mode for when the lift device does not transport and operates to raise and lower the load.

* * * * *